United States Patent
Soji et al.

(10) Patent No.: US 10,440,149 B2
(45) Date of Patent: Oct. 8, 2019

(54) WIRELESS SYSTEM, WIRELESS DEVICE, STORAGE MEDIUM HAVING STORED THEREIN COMMUNICATION PROGRAM, AND COMMUNICATION METHOD

(71) Applicant: NINTENDO CO., LTD., Kyoto (JP)

(72) Inventors: Hiroki Soji, Kyoto (JP); Hiroyuki Takeuchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 152 days.

(21) Appl. No.: 15/378,351

(22) Filed: Dec. 14, 2016

(65) Prior Publication Data

US 2017/0187828 A1    Jun. 29, 2017

(30) Foreign Application Priority Data

Dec. 25, 2015 (JP) ................................. 2015-253630

(51) Int. Cl.
*H04L 29/08* (2006.01)
*H04W 52/02* (2009.01)
(Continued)

(52) U.S. Cl.
CPC .......... *H04L 67/325* (2013.01); *A63F 13/327* (2014.09); *G06F 1/3278* (2013.01);
(Continued)

(58) Field of Classification Search
CPC ...... H04L 67/325; H04W 76/02; H04W 84/18
See application file for complete search history.

(56) References Cited

U.S. PATENT DOCUMENTS

2004/0019804 A1 * 1/2004 St Pierre ................. H04L 63/02
709/227
2004/0113890 A1   6/2004 Ranta
(Continued)

FOREIGN PATENT DOCUMENTS

JP   2013-248108   12/2013
JP   2014-017989   1/2014
(Continued)

OTHER PUBLICATIONS

Extended European Search Report dated May 17, 2017 issued in corresponding European Application No. 16203336.9 (8 pgs.).
(Continued)

*Primary Examiner* — El Hadji M Sall
(74) *Attorney, Agent, or Firm* — Nixon & Vanderhye P.C.

(57) ABSTRACT

An example communication system includes a mobile terminal and a BLE terminal. The mobile terminal and the BLE terminal establish a connection therebetween and perform communication with each other at a predetermined time interval. The mobile terminal transmits representation data to the BLE terminal, and the BLE terminal performs a first representation on the basis of the representation data. After the first representation ends, when a button operation is performed in the BLE terminal, operation result information indicating the button operation is accumulated in the BLE terminal. The accumulated operation result information is transmitted from the BLE terminal to the mobile terminal at a timing at which communication between the mobile terminal and the BLE terminal is performed next. The mobile terminal performs, for example, a game process on the basis of the operation result information from the BLE terminal.

21 Claims, 20 Drawing Sheets

(51) Int. Cl.
*A63F 13/327* (2014.01)
*H04W 76/10* (2018.01)
*G06F 1/3234* (2019.01)
*H04W 84/18* (2009.01)
*H04W 4/80* (2018.01)

(52) U.S. Cl.
CPC ....... *H04W 52/0254* (2013.01); *H04W 76/10* (2018.02); *H04W 4/80* (2018.02); *H04W 84/18* (2013.01); *Y02D 10/157* (2018.01); *Y02D 70/142* (2018.01); *Y02D 70/144* (2018.01); *Y02D 70/164* (2018.01)

(56) References Cited

U.S. PATENT DOCUMENTS

| | | |
|---|---|---|
| 2007/0135178 A1 | 6/2007 | Albulet et al. |
| 2009/0189860 A1 | 7/2009 | Su et al. |
| 2013/0314340 A1 | 11/2013 | Shimohata |
| 2013/0324238 A1 | 12/2013 | Akifusa |
| 2016/0112947 A1* | 4/2016 | Sahoo ............... H04W 28/0221 370/311 |

FOREIGN PATENT DOCUMENTS

| | | |
|---|---|---|
| JP | 2014-039862 | 3/2014 |
| WO | 2013/175631 | 11/2013 |

OTHER PUBLICATIONS

Townsend, et al. "Getting Started with Bluetooth Low Energy" first edition, Feb. 25, 2015, first version, pp. 11-12, 25-27 with pp. 1-24 of English edition.

Japanese Notice of Reasons for Refusal for Japanese Patent Application No. 2015-253630 with English machine translation, 11 pages, dated Jul. 31, 2019.

\* cited by examiner

FIG. 10

| D → REPRESENTATION DATA | | | |
|---|---|---|---|
| DA — BASIC INFORMATION (4 OCTETS) | BUTTON RECEPTION TIME (OPERATION CONDITION) | 8 bits (256 LEVELS × 50 ms) | |
| | SECOND REPRESENTATION INFORMATION (REPRESENTATION AT TIME OF BUTTON OPERATION) | LED | 4 bits (16 LEVELS) × THREE COLORS |
| | | VIBRATION | 3 bits (8 LEVELS) |
| | | padding | 1 bit |
| | PRIORITY | 3 bits | |
| | NUMBER OF REPRESENTATIONS | 5 bits (0~30) | |
| DB1 — REPRESENTATION INFORMATION SET 1 (3 OCTETS) | LED | 4 bits (16 LEVELS) × THREE COLORS | |
| | VIBRATION | 3 bits (8 LEVELS) | |
| | REPRESENTATION TIME | 8 bits (256 LEVELS × 50 ms) | |
| DB2 — REPRESENTATION INFORMATION SET 2 (3 OCTETS) | LED | 4 bits (16 LEVELS) × THREE COLORS | |
| | VIBRATION | 3 bits (8 LEVELS) | |
| | REPRESENTATION TIME | 8 bits (256 LEVELS × 50 ms) | |
| ⋮ | | | |
| DB30 — REPRESENTATION INFORMATION SET 30 (3 OCTETS) | LED | 4 bits (16 LEVELS) × THREE COLORS | |
| | VIBRATION | 3 bits (8 LEVELS) | |
| | REPRESENTATION TIME | 8 bits (256 LEVELS × 50 ms) | |

F I G. 1 4
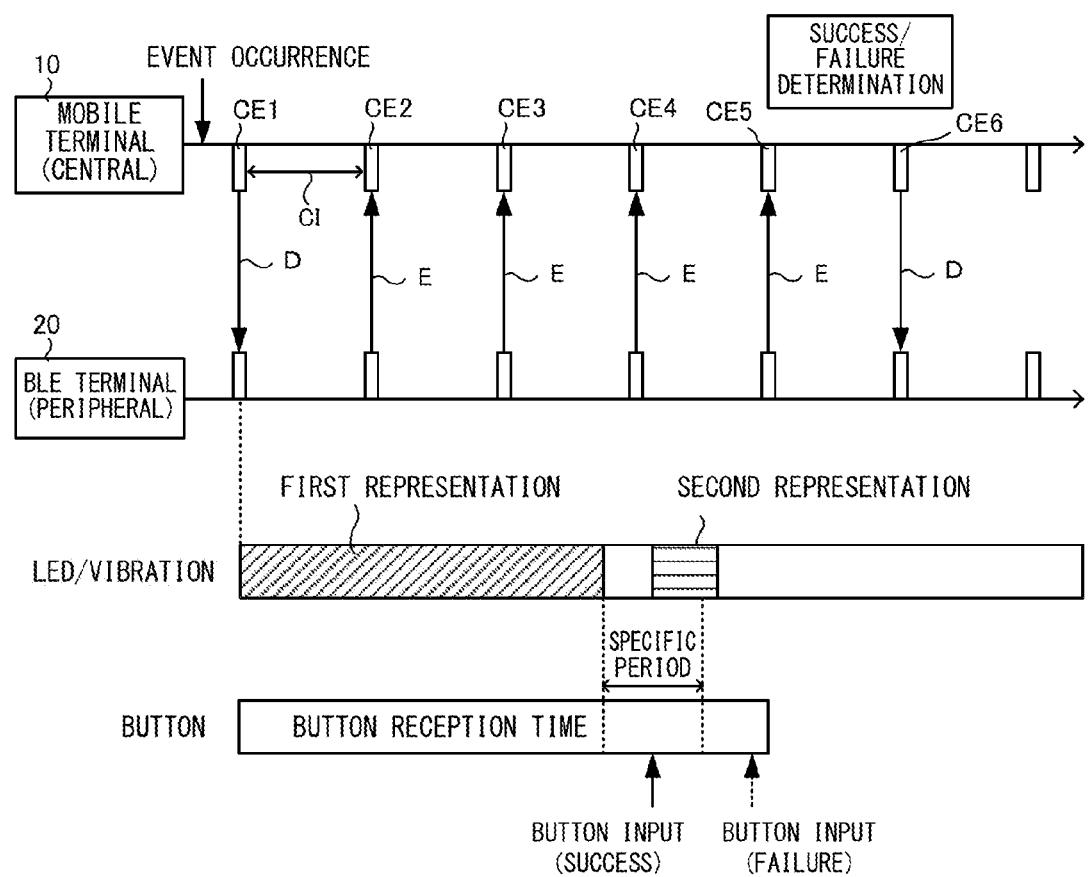

F I G. 2 4
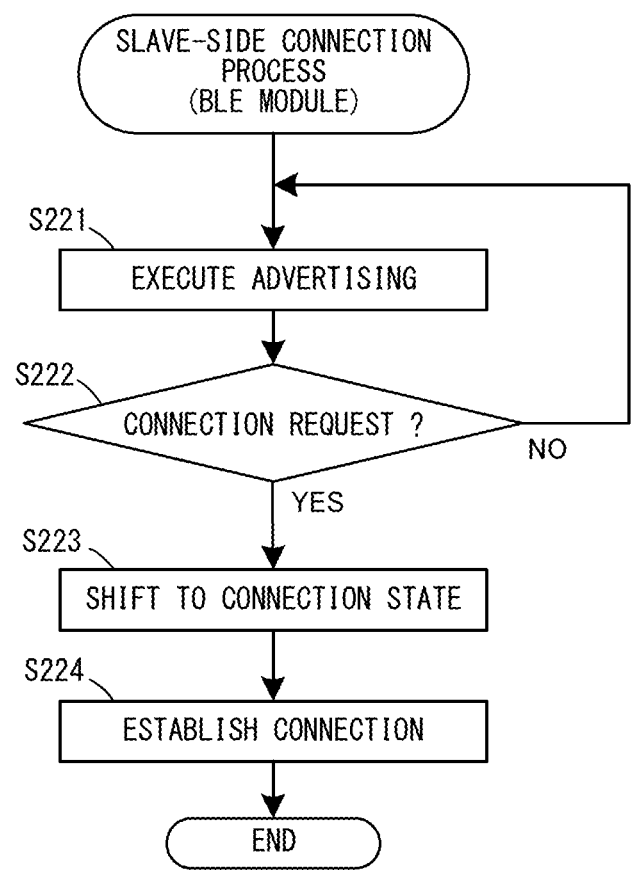

WIRELESS SYSTEM, WIRELESS DEVICE, STORAGE MEDIUM HAVING STORED THEREIN COMMUNICATION PROGRAM, AND COMMUNICATION METHOD

CROSS REFERENCE TO RELATED APPLICATION

The disclosures of Japanese Patent Application No. 2015-253630, filed on Dec. 25, 2015, are incorporated herein by reference.

FIELD

The technology herein relates to a wireless system, a wireless device, a storage medium having stored therein a communication program, and a communication method which enable communication with a plurality of devices to be performed.

BACKGROUND AND SUMMARY

Conventionally, there has been a device that performs wireless communication in a short range. For example, in communication based on the Bluetooth (registered trademark) standard, a network is established with a certain device as a master and another device as a slave, and communication is performed.

However, in conventional wireless communication, there is room for improvement in efficiently (including reducing power consumption) transmitting information about an operation performed on one device, to another device.

Therefore, an object of the exemplary embodiments is to provide a technique that enables information about an operation performed on one device, to be efficiently (including reducing power consumption) transmitted to another device.

To achieve the above object, the exemplary embodiment employs the following configurations.

An embodiment is directed to a wireless system including a plurality of devices capable of performing wireless communication, and the wireless system includes a first device and a second device. The first device includes connection establishing means, operation means for being operated by a user, accumulating means, and transmitting means. The connection establishing means establishes a connection with the second device. The accumulating means accumulates a plurality of operations performed on the operation means. The transmitting means wirelessly transmits operation result information indicating the plurality of operations accumulated by the accumulating means, to the second device in a state where the first device is connected to the second device.

According to the above, the first device can accumulate a plurality of operations performed on the operation means and can transmit operation result information indicating the plurality of operations accumulated, to the second device. Accordingly, for example, even when communication is not frequently performed between the first device and the second device, a plurality of operations performed in the first device can be collectively transmitted to the second device, so that power consumption can be reduced.

In the above embodiment, the accumulating means may accumulate a plurality of operations including an operation performed at a first timing and an operation performed at a second timing different from the first timing.

According to the above, the first device can accumulate a plurality of operations performed on the operation means at different timings, and can transmit operation result information indicating the plurality of operations accumulated, to the second device. Accordingly, for example, even when communication is not frequently performed between the first device and the second device, a plurality of operations performed in the first device at different timings can be collectively transmitted to the second device, so that power consumption can be reduced.

Moreover, according to the above embodiment, the second device can accurately know the timing of each operation performed in the first device. That is, a delay occurs before information from the first device reaches the second device, and there are variations in the delay. Thus, for example, when, each time an operation is performed on the operation means, information about this operation is transmitted to the second device, the second device cannot accurately know the timing of each operation performed in the first device, due to variations in a delay before the information about the operation reaches the second device. However, in the above embodiment, since information about the operation performed at the first timing and the operation performed at the second timing is transmitted to the second device, the second device can accurately know the time lag between the operation at the first timing and the operation at the second timing.

In the above embodiment, at least either one of the first device and the second device may include interval setting means for setting a time interval of communication between the first device and the second device. The first device and the second device perform wireless communication with each other at the time interval set by the interval setting means in a state where the first device and the second device are connected to each other. The transmitting means of the first device transmits the operation result information to the second device in the communication performed at the time interval set by the interval setting means.

According to the above, the first device and the second device perform communication with each other at the set predetermined time interval. The first device can accumulate a plurality of operations, and can transmit the plurality of operations accumulated, to the second device in the communication performed at the predetermined time interval. Accordingly, power consumption can be reduced as compared to the case where, each time an operation is performed in the first device, information about this operation is transmitted to the second device. In addition, a plurality of operations performed in the first device can be transmitted to the second device.

In the above embodiment, the interval setting means may set the time interval when the connection between the first device and the second device is established.

According to the above, the time interval can be set when a connection is established, and, for example, a time interval when a connection is established at a certain timing and an time interval when a connection is established at another timing can be made different from each other.

In the above embodiment, the interval setting means may set the time interval within a predetermined range.

According to the above, the time interval can be set within the predetermined range. Accordingly, the time interval can be shortened or lengthened as necessary.

In the above embodiment, the interval setting means may change the time interval from a first time interval to a second time interval different from the first time interval.

According to the above, the time interval can be changed.

In the above embodiment, the interval setting means may change the time interval while the first device and the second device are connected to each other.

According to the above, the time interval can be changed during the connection, and an appropriate time interval can be set as necessary and communication between the first device and the second device can be performed.

In the above embodiment, at least either one of the first device and the second device may include application executing means for executing a predetermined application. The interval setting means may set the time interval in accordance with a type of the application to be executed by the application executing means and/or a status of execution of the application.

According to the above, for example, the time interval can be made different depending on the type of the application to be executed. In addition, the time interval can be made different depending on the status of execution of the application. Here, the status of execution of the application may be an elapsed time from start of execution of the application and a state of the application based on an operation of the user. For example, in the case of a game application, the status of execution may be a scene, a stage, an area, a mission, or the like being currently executed, whether the application is in a pause state, etc.

In the above embodiment, the interval setting means may change the time interval in accordance with a type of the application to be executed by the application executing means and/or a status of execution of the application.

According to the above, the already set time interval can be changed in accordance with the type of the application and/or the status of execution of the application, and can be changed to an appropriate time interval in accordance with the type of or the status of execution of the application.

In the above embodiment, the predetermined application may include a plurality of portions, and the interval setting means may change the time interval in accordance with the portion of the application to be executed.

According to the above, the time interval can be changed in accordance with the portion of the application. For example, when a game application is executed, the time interval can be changed in accordance with a scene of the game.

In the above embodiment, the interval setting means may change the time interval when a shift is made from a state where the predetermined application is being executed to a pause state.

According to the above, when the application shifts to a pause state, the time interval can be set. For example, when the application enters a pause state, the time interval can be lengthened, and power consumption can be reduced in the pause state.

In the above embodiment, the interval setting means may set the time interval in accordance with a frequency of operation on the operation means of the first device.

According to the above, the time interval can be set in accordance with the frequency of operation on the operation means. For example, when the operation means is frequently operated, the time interval can be shortened, and a delay with respect to the operation can be suppressed.

In the above embodiment, the second device may include operation means. The interval setting means may set the time interval in accordance with a frequency of operation on at least either one of the operation means of the first device and the operation means of the second device.

According to the above, the time interval of communication between the first device and the second device can be set in accordance with the frequency of operation on the operation means of the first device and/or the second device.

In the above embodiment, the first device may have a plurality of types having different functions, and the interval setting means may set the time interval in accordance with the type of the first device.

According to the above, the time interval can be made different depending on the type of the first device to be connected to the second device. For example, the time interval can be made different depending on the function of the first device.

In the above embodiment, the second device may have a plurality of types having different functions, and the interval setting means may set the time interval in accordance with the type of the second device.

According to the above, the time interval of communication between the first device and the second device can be different depending on the type of the second device.

In the above embodiment, at least either one of the first device and the second device may include application executing means for executing a predetermined application. The predetermined application may be executed by using a plurality of devices, and the interval setting means may set the time interval in accordance with the number of the devices with which the predetermined application is executed.

According to the above, when an application is executed by using a plurality of devices, the time interval can be set in accordance with the number of the devices. For example, when a game is performed by using a plurality of devices, the time interval can be set in accordance with the number of players who participate in the game.

In the above embodiment, the wireless system may include a third device different from the first device and the second device. The second device may perform communication with the third device. The interval setting means may set the time interval in the communication between the first device and the second device in accordance with a status of the communication between the second device and the third device.

According to the above, the time interval of communication between the first device and the second device can be set in accordance with the status of the communication between the second device and the third device. Here, the "status of the communication between the second device and the third device" may be presence/absence of the communication between the second device and the third device, the frequency of the communication between the second device and the third device, the amount of data transmitted and received between the second device and the third device, etc.

In the above embodiment, a connection between the first device and the second device may be established with the second device as a master and the first device as a slave, and the second device operating as the master may include the interval setting means.

According to the above, the second device operating as the master can set the time interval.

In the above embodiment, at least either one of the first device and the second device may include allowable period setting means for setting an allowable period in the connection between the first device and the second device. The second device transmits a predetermined packet to the first device at a predetermined time interval in a state where the second device is connected to the first device. The first device determines whether to return a response to the predetermined packet from the second device, to the second device, on the basis of the allowable period in a state where the first device is connected to the second device.

According to the above, the allowable period is set in the connection between the first device and the second device. The first device can determine whether to transmit a response to the second device. Accordingly, the first device can omit wasted communication to reduce the power consumption. Here, the allowable period may be determined, for example, as the number of times of communication between the first device and the second device performed at a predetermined time interval such as a slave latency described later (e.g., the number of connection events), or as a time.

In the above embodiment, the first device may include the operation result information in a response to the predetermined packet and may transmit the response.

According to the above, the first device can include the operation result information in a response to a predetermined packet and can transmit the response. Accordingly, the first device can transmit the operation result information to the second device, and can also return a response to the second device.

In the above embodiment, the first device may determine whether to include the operation result information in the response and transmit the response to the second device, in accordance with presence/absence of an operation on the operation means, and may determine to transmit the response including the operation result information to the second device, when an operation on the operation means has been performed. In addition, the first device may determine to transmit the response to the second device, on the basis of the allowable period and a period in which the response is not transmitted, even when an operation on the operation means has not been performed.

According to the above, when an operation on the operation means has been performed, operation result information corresponding to this operation can be included in the response and transmitted to the second device. In addition, for example, even when an operation on the operation means has not been performed, if a period in which the response is not transmitted exceeds the allowable period, the response can be transmitted to the second device. Accordingly, the first device can transmit the operation result information to the second device as necessary with the power consumption reduced, while maintaining the connection with the second device.

In the above embodiment, at least either one of the first device and the second device may include application executing means for executing a predetermined application. The allowable period setting means may set the allowable period in accordance with a type of the application to be executed by the application executing means and/or a status of execution of the application.

According to the above, for example, the allowable period can be made different depending on the type of the application to be executed. In addition, the allowable period can be made different depending on the status of execution of the application.

At least either one of the first device and the second device may include connection maintaining period setting means for setting a connection maintaining period in the connection between the first device and the second device. In a state where the second device is connected to the first device, the second device transmits a predetermined packet to the first device at a predetermined time interval. In addition, in the state where the second device is connected to the first device, the second device determines whether to terminate the connection with the first device, on the basis of the connection maintaining period and a period in which a response, to the predetermined packet, from the first device is not present.

According to the above, the second device can determine whether to maintain or terminate the connection with the first device, on the basis of the connection maintaining period and the period in which the response from the first device is not present. For example, when the period in which the response from the first device is not present exceeds the connection maintaining period, the second device may determine to terminate the connection with the first device (i.e., the first device and the second device may shift from a connection state to a non-connected state). The connection maintaining period may be determined, for example, as a time such as a connection supervision timeout described later, or as the number of times of communication between the first device and the second device performed at a predetermined time interval (e.g., the number of connection events).

In the above embodiment, communication between the first device and the second device may be performed at a fourth timing at which the time interval set by the interval setting means comes after communication between the first device and the second device is performed at a third timing. The accumulating means may accumulate a plurality of operations (an operation at a first timing and an operation at a second timing) performed on the operation means in a period from the third timing to the fourth timing. In the communication performed at the fourth timing, the transmitting means of the first device may transmit operation result information indicating the plurality of operations accumulated by the accumulating means, to the second device.

According to the above, operations from the third timing to the fourth timing can be accumulated, and operation result information indicating the accumulated operations can be transmitted to the second device at the fourth timing.

In the above embodiment, the second device may execute a predetermined process on the basis of the operation result information transmitted by the transmitting means of the first device.

According to the above, the second device can perform the predetermined process on the basis of an operation performed in the first device. For example, on the basis of an operation performed in the first device, the second device can perform a game process or a determination as to this operation.

In the above embodiment, the first device may further include output means for performing output to the user. The second device may transmit a result of execution of the predetermined process to the first device. The first device may receive the result of execution of the predetermined process and may perform output corresponding to the result of execution by using the output means.

According to the above, the first device can perform the output to the user in accordance with the result of execution of the predetermined process performed in the second device. For example, as the output means for performing output to the user, a display device for displaying letters or an image, a light-emitting device such as an LED, a loudspeaker for outputting a sound, a vibrator for generating vibration, etc. may be used.

In the above embodiment, the second device may include output means for performing output to the user, and may perform output corresponding to a result of execution of the predetermined process, by using the output means.

According to the above, the second device can output, for example, an image or a sound on the basis of an operation performed in the first device.

In the above embodiment, the first device and the second device may perform wireless communication with each other at a predetermined time interval in a state where the first device and the second device are connected to each other. The second device may transmit a result of execution of the predetermined process to the first device in the communication performed at the predetermined time interval.

According to the above, the second device can transmit the result of execution of the predetermined process to the first device in the communication performed at the predetermined time interval.

In the above embodiment, the second device may transmit first representation information to the first device. The first device may include: receiving means for receiving the first representation information from the second device; and first representation executing means for executing a first representation on the basis of the first representation information received by the receiving means.

According to the above, the first device can execute the first representation on the basis of the first representation information being received from the second device.

In the above embodiment, the accumulating means may accumulate the plurality of operations performed in accordance with the first representation.

According to the above, the user of the first device can perform an operation corresponding to the first representation, and a plurality of operations corresponding to the first representation can be accumulated in the first device.

In the above embodiment, the second device may include the first representation information in a predetermined packet, for maintaining connection, to be transmitted to the first device at a predetermined time interval, and may transmit the predetermined packet. The first device may include the operation result information in a response to the predetermined packet, and may transmit the response to the second device.

According to the above, the predetermined packet for maintaining connection is transmitted from the second device to the first device at the predetermined time interval. The second device can include the first representation information in the predetermined packet, and can transmit the predetermined packet. Accordingly, the second device can maintain the connection with the first device only by transmitting the predetermined packet, and can transmit the first representation information to the first device.

In the above embodiment, the second device may include operation determining means and processing means. The operation determining means determines whether an operation corresponding to the first representation has been performed in the first device, on the basis of the operation result information. The processing means performs a predetermined process on the basis of a result of the determination by the operation determining means.

According to the above, the first representation information is transmitted from the second device to the first device, and the first representation based on the first representation information is performed in the first device. On the basis of whether an operation corresponding to the first representation has been performed in the first device, the second device performs the predetermined process. Accordingly, for example, an interactive application for which the first device and the second device are used can be executed.

In the above embodiment, the first device and the second device may perform wireless communication with each other at a predetermined time interval in a state where the first device and the second device are connected to each other. The second device may transmit the first representation information to the first device in the communication performed at the predetermined time interval. The first device may execute the first representation based on the first representation information beyond the predetermined time interval.

According to the above, the communication between the first device and the second device is performed at the predetermined time interval, and the first device performs the first representation beyond the predetermined time interval. Accordingly, the first device can be caused to perform a representation longer than the time interval of the communication between the first device and the second device.

In the above embodiment, priority may be set in the first representation information. The first device may execute a representation based on the first representation information having high priority preferentially over a representation based on the first representation information having low priority.

According to the above, priority can be set in the first representation information transmitted from the second device.

In the above embodiment, the second device may transmit an operation condition and second representation information to the first device. The first device may include: receiving means for receiving the operation condition and the second representation information; and second representation executing means for executing a second representation on the basis of the second representation information when an operation that satisfies the operation condition is performed by using the operation means.

According to the above, the operation condition and the second representation information can be simultaneously transmitted from the second device to the first device, and the first device can perform the second representation on the basis of the second representation information when an operation that satisfies the operation condition is performed.

In the above embodiment, the first device and the second device may perform wireless communication with each other at a predetermined time interval in a state where the first device and the second device are connected to each other. The second device may transmit the operation condition to the first device in the communication performed at the predetermined time interval. The operation condition may be a condition that is satisfied beyond the predetermined time interval.

According to the above, the communication between the first device and the second device is performed at the predetermined time interval, and the operation condition is a condition that is satisfied beyond the predetermined time interval. Accordingly, in a period longer than the time interval of the communication between the first device and the second device, it can be determined whether an operation that satisfies the operation condition has been performed.

In the above embodiment, priority may be set in the second representation information. The first device may execute a representation based on the second representation information having high priority preferentially over a representation based on a representation based on the second representation information having low priority.

According to the above, priority can be set in the second representation information transmitted from the second device.

In the above embodiment, the first device may perform the representation by using at least any one of vibration, light, and a sound.

According to the above, the first device can be caused to perform the representation with relatively small data.

In the above embodiment, the operation means may be an operation button. The accumulating means may accumulate a plurality of operations performed on the operation button. The transmitting means may transmit operation result information indicating the plurality of operations performed on the operation button, to the second device.

According to the above, a plurality of operations on the operation button can be accumulated in the first device, and operation result information indicating the plurality of operations can be transmitted to the second device.

In the above embodiment, the operation means may be a touch panel. The accumulating means may accumulate a first operation performed on the touch panel and a second operation performed on the touch panel at a timing different from that of the first operation. The transmitting means may transmit operation result information indicating the first operation and the second operation performed on the touch panel, to the second device.

According to the above, a plurality of operations performed on the touch panel of the first device can be accumulated and transmitted to the second device. Here, the first operation on the touch panel may be, for example, a series of operations from touch-on to touch-off on the touch panel, and is detected as a plurality of touch positions. In addition, the second operation on the touch panel is a series of operations performed at a timing different from that of the first operation, and is detected as a plurality of touch positions. For example, when the user draws a straight line in a transverse direction on the touch panel (screen) and subsequently draws a circle thereon, the straight line in the transverse direction corresponds to the "first operation on the touch panel", and the circle corresponds to the "second operation on the touch panel". Such a plurality of operations performed on the touch panel are accumulated in the first device, and the plurality of operations accumulated are collectively transmitted to the second device.

In the above embodiment, any one device of the first device and the second device may include broadcast means for transmitting data for establishing a connection by broadcast. In accordance with the other device of the first device and the second device receiving the data transmitted by broadcast, a connection between the one device and the other device may be established.

According to the above, by transmitting the data for establishing a connection from the one device by broadcast, a connection with the other device can be established.

In the above embodiment, the first device may include the broadcast means. The connection establishing means may establish a connection with the second device, with the second device as a master and the first device as a slave.

According to the above, the data for establishing a connection can be transmitted by broadcast from the first device operating as the slave.

In the above embodiment, the second device may include the interval setting means. The interval setting means of the second device may set the time interval in accordance with reception of the data transmitted by broadcast from the first device, and may notify the first device of the set time interval.

According to the above, the second device operating as the master can set the time interval.

In the above embodiment, the first device and the second device may perform communication with each other at a predetermined time interval in a state where the first device and the second device are connected to each other. The first device may receive time accuracy information of the second device when establishing a connection with the second device, and may attempt to receive data from the second device, on the basis of the predetermined time interval and the time accuracy information, when receiving data from the second device.

According to the above, the first device can receive the time accuracy information of the second device, and can receive data from the second device on the basis of the time accuracy information.

In the above embodiment, the first device and the second device may perform the wireless communication with each other while switching a frequency of radio waves.

According to the above, even when a device transmitting radio waves is present in the surrounding area, interference of radio waves can be avoided.

In the above embodiment, a standard for the communication between the first device and the second device may be Bluetooth Low Energy.

According to the above, the power consumption of the first device and the second device can be reduced by using the BLE standard.

Another embodiment is directed to a wireless device capable of performing wireless communication, the wireless device including operation means for being operated by a user, accumulating means, and transmitting means. The accumulating means accumulates a plurality of operations including an operation performed on the operation means at a first timing and an operation performed on the operation means at a second timing different from the first timing. The transmitting means wirelessly transmit operation result information indicating the plurality of operations accumulated by the accumulating means, to another device.

Another embodiment is directed to a wireless device capable of performing wireless communication. The wireless device include: operation means for being operated by a user; accumulating means for accumulating a plurality of operations performed on the operation means; and transmitting means for wirelessly transmitting operation result information indicating the plurality of operations accumulated by the accumulating means, to another device.

Another embodiment is directed to a wireless system configured to perform a predetermined game process by establishing a connection between a plurality of devices, the wireless system including a first device and a second device. The second device includes interval setting means, allowable period setting means, connection maintaining period setting means, second transmitting means, second receiving means, second control means, and determining means. The interval setting means sets a predetermined time interval. The allowable period setting means sets a predetermined allowable period. The connection maintaining period setting means sets a predetermined connection maintaining period. The second transmitting means transmits a predetermined packet to the first device at the predetermined time interval set by the interval setting means in a state where the second device is connected to the first device. The second receiving means receives, from the first device, a response packet to the predetermined packet. The second control means controls the game process on the basis of the response packet. The determining means determines whether to maintain the connection with the first device or terminate the connection with the first device, on the basis of the connection maintaining period and a period in which the response packet has not been received from the first device. The first device includes first receiving means, first control means, response determining means, and first transmitting means. The first receiving means receives, from the second device, the predetermined packet transmitted at the predetermined time interval. The first control means controls the game process on the basis of the predetermined packet. The response determining means determines whether to transmit the response packet to the second device, in accordance with a status of execution of the game process. The first transmitting means transmits the response packet to the second device when the response determining means determines to transmit the response packet. At least any one of the predetermined time interval, the predetermined allowable period, and the predetermined connection maintaining period is set in accordance with the game process.

According to the above, the first device and the second device establish a connection with each other, and the game process is performed between the first device and the second device. Specifically, the first device and the second device perform communication with each other on the basis of the set predetermined time interval, the set predetermined allowable period, and the set predetermined connection maintaining period (these are referred to as connection parameters). In addition, the game process is performed on the basis of the predetermined packet from the second device and the response packet from the first device. In accordance with the game process, at least any one of the three connection parameters (the predetermined time interval, the predetermined allowable period, the predetermined connection maintaining period) is set. Accordingly, the connection parameters can be set in accordance with the game process, and parameters corresponding to the game can be set.

Here, "setting" the connection parameter may mean both setting newly a parameter in establishing a new connection and changing the parameter to a new value in a state of being connected. In addition, the "predetermined allowable period" may be determined as a time, or may be determined as the number of times of communication between the first device and the second device performed at the predetermined time interval, such as a slave latency described later. Moreover, the "predetermined connection maintaining period" may be determined as a time such as a connection supervision timeout described later, or may be determined as the number of times of communication between the first device and the second device performed at the predetermined time interval. That is, the "period" used here conceptually includes not only a time but also the number of times of communication.

In the above embodiment, in a state where the first device and the second device are connected to each other, the second device may be a master, and the first device may be a slave.

According to the above, with the second device as a master and the first device as a slave, the two devices can be connected to each other, and the game process can be performed through communication between the master and the slave.

In the above embodiment, in a state where the first device and the second device are connected to each other, the response determining means of the first device may determine whether to transmit the response packet to the second device, on the basis of the allowable period.

According to the above, the first device can determine whether to transmit the response packet to the second device, on the basis of the allowable period in addition to the status of execution of the game process. For example, when data to be transmitted to the second device is present depending on the status of execution of the game process, the first device can include the data in the response packet and can transmit the response packet to the second device. In addition, even when data to be transmitted is not present, if a period in which the response packet is not transmitted to the second device exceeds the allowable period, the first device can determine to transmit the response packet to the second device. Accordingly, the game process can be advanced, and the power consumption of the first device can be reduced.

In the above embodiment, the first device and the second device may perform wireless communication with each other while changing a frequency of radio waves.

According to the above, the first device and the second device can execute the game process by performing wireless communication while switching the frequency of radio waves. Thus, for example, even when noise occurs at a specific frequency, the frequency of radio waves can be switched to another frequency and communication can be performed, so that the game process can be advanced.

In the above embodiment, the second transmitting means may be capable of including predetermined information in the predetermined packet and transmitting the predetermined packet to the first device. In addition, the first device may further include operation means for performing an operation based on the predetermined information included in the predetermined packet received by the first receiving means. The first transmitting means may be capable of including operation result information indicating an operation performed on the operation means, in the response packet, and transmitting the response packet to the second device.

According to the above, the game process can be executed between the first device and the second device through an operation using the operation means of the first device. Thus, an interactive game can be performed between the two devices.

In the above embodiment, the first device may further include output means for performing output to the user. The second transmitting means may transmit a result of the game process performed by game processing means to the first device, and the first device may perform output based on the result of the game process by using the output means.

Another embodiment is directed to a wireless device included in a wireless system configured to perform a predetermined game process by establishing a connection between a plurality of devices. The wireless device includes: interval setting means for setting a predetermined time interval; an allowable period setting means for setting a predetermined allowable period; connection maintaining period setting means for setting a predetermined connection maintaining period; transmitting means for transmitting a predetermined packet to another device included in the wireless system at the predetermined time interval set by the interval setting means in a state where the wireless device is connected to the other device; receiving means for receiving, from the other device, a response packet to the predetermined packet; control means for controlling the game process on the basis of the response packet; and determining means for determining whether to maintain the connection with the other device or terminate the connection with the other device, on the basis of the connection maintaining period and a period in which the response packet has not been received from the other device. At least any one of the predetermined time interval, the predetermined allowable period, and the predetermined connection maintaining period is set in accordance with the game process.

Another embodiment is directed to a wireless device included in a wireless system configured to perform a predetermined game process by establishing a connection between a plurality of devices. The wireless device includes: interval setting means for setting a predetermined time interval; an allowable period setting means for setting a predetermined allowable period; connection maintaining period setting means for setting a predetermined connection maintaining period; receiving means for receiving a predetermined packet transmitted at the predetermined time interval from another device included in the wireless system; control means for controlling the game process on the basis of the predetermined packet; determining means for determining whether to maintain a connection with the other device or terminate the connection with the other device, on the basis of the connection maintaining period and a period in which the predetermined packet has not been received from the other device; response determining means for determining whether to transmit a response packet to the predetermined packet to the other device, in accordance with a status of execution of the game process; and transmitting means for transmitting the response packet to the other device when the response determining means determines to transmit the response packet. The response determining means determines whether to transmit the response packet to the other device, on the basis of the allowable period. In addition, at least any one of the predetermined time interval, the predetermined allowable period, and the predetermined connection maintaining period is set in accordance with the game process.

According to the above, a result of the game process in the second device can be transmitted to the first device, and output based on the result of the game process can be performed in the first device. As the output means for performing output to the user, a display device for displaying letters or an image, a light-emitting device such as an LED, a loudspeaker for outputting a sound, a vibrator for generating vibration, etc. may be used.

Another embodiment is directed to a wireless device capable of performing wireless communication with another device including operation means. The wireless device includes interval setting means, connection establishing means, and transmitting means. The interval setting means sets a predetermined time interval. The connection establishing means establishes a connection with the other device. The transmitting means transmits a predetermined packet to the other device at the predetermined time interval set by the interval setting means, after the connection is established by the connection establishing means. The transmitting means includes, in the predetermined packet, an operation condition regarding an operation on the operation means and representation information indicating a content of a representation to be performed in the other device when the operation condition is satisfied, and transmits the predetermined packet.

According to the above, the wireless device can collectively transmit the operation condition and the representation information indicating the representation to be executed when an operation that satisfies the operation condition is performed, to the other device.

In the above embodiment, priority indicating which of a representation based on representation information transmitted at a certain timing and a representation based on representation information transmitted at another timing is caused to be preferentially performed by the other device, may be set in the representation information.

In the above embodiment, the operation condition may include a period for receiving an operation on the operation means.

In the above embodiment, the representation information may be information indicating a pattern of a representation to be performed in the other device.

In the above embodiment, the operation condition may be a condition that is satisfied beyond the predetermined time interval.

In the above embodiment, the representation based on the representation information may be at least any one of vibration, light emission, and a sound.

In the above embodiment, the wireless device may include: receiving means for receiving operation result information indicating a plurality of operations performed on the operation means of the other device, from the other device; and executing means for executing a predetermined process on the basis of the operation result information received by the receiving means.

In the above embodiment, the connection establishing means may establish the connection with the other device in accordance with reception of data, for establishing a connection, transmitted from the other device by broadcast.

In the above embodiment, the wireless device and the other device may perform the wireless communication while switching a frequency of radio waves.

In the above embodiment, a standard for the wireless communication between the wireless device and the other device may be Bluetooth Low Energy.

Another embodiment is directed to a communication method to be executed in a wireless system including a plurality of devices capable of performing wireless communication, the wireless system including a first device and a second device, the communication method comprising causing the first device to execute: establishing a connection with the second device; accumulating a plurality of operations performed on an operation section configured to be operated by a user; and wirelessly transmitting operation result information indicating the plurality of operations accumulated, to the second device in a state where the first device is connected to the second device.

Another embodiment is directed to a wireless system configured to perform wireless communication between a first device and a second device, the wireless system being configured to execute a predetermined game process on the basis of an operation on operation means of the first device or the second device. The second device includes interval setting means, allowable period setting means, connection maintaining period setting means, second transmitting means, second receiving means, second control means, and determining means. The interval setting means sets a predetermined time interval. The allowable period setting means sets a predetermined allowable period. The connection maintaining period setting means sets a predetermined connection maintaining period. The second transmitting means transmits a predetermined packet to the first device at the predetermined time interval set by the interval setting means. The second receiving means receives, from the first device, a response packet to the predetermined packet. The second control means controls the game process on the basis of the response packet. The determining means determines whether to maintain a connection with the first device or terminate the connection with the first device, on the basis of the connection maintaining period and a period in which the response packet has not been received from the first device. The first device includes first receiving means, first control means, response determining means, and first transmitting means. The first receiving means receives, from the second device, the predetermined packet transmitted at the predetermined time interval. The first control means controls the game process on the basis of the predetermined packet. The response determining means determines whether to transmit the response packet to the second device, on the basis of the allowable period. The first transmitting means transmits the response packet to the second device when the response determining means determines to transmit the response packet. At least any one of the predetermined time interval, the predetermined allowable period, and the predetermined connection maintaining period is set on the basis of at least any one of: a type of a game and/or the status of execution of the game process; a frequency of operation on the operation means of the first device or the second device; a type of the first device or the second device; and the number of devices included in the wireless system.

According to the above, at least any one of the time interval, the allowable period, and the connection maintaining period (these are referred to as connection parameters) can be set on the basis of various states such as the status of execution of the game process, the type of the game, the frequency of operation on the operation means, the type of the device, and the number of the devices. "Setting" the connection parameter may mean both setting newly a parameter in establishing a new connection and changing the parameter to a new value in a state of being connected. In addition, the "period" used here conceptually includes not only a time but also the number of times of communication.

Another embodiment is directed to a communication method to be executed in a wireless system configured to perform wireless communication between a first device and a second device. The wireless system is configured to execute a predetermined game process on the basis of an operation on operation means of the first device or the second device. The second device executes: an interval setting step of setting a predetermined time interval; an allowable period setting step of setting a predetermined allowable period; a connection maintaining period setting step of setting a predetermined connection maintaining period; a second transmitting step of transmitting a predetermined packet to the first device at the predetermined time interval set in the interval setting step; a second receiving step of receiving, from the first device, a response packet to the predetermined packet; a second control step of controlling the game process on the basis of the response packet; and a determining step of determining whether to maintain a connection with the first device or terminate the connection with the first device, on the basis of the connection maintaining period and a period in which the response packet has not been received from the first device. The first device executes: a first receiving step of receiving, from the second device, the predetermined packet transmitted at the predetermined time interval; a first control step of controlling the game process on the basis of the predetermined packet; a response determining step of determining whether to transmit the response packet to the second device, on the basis of the allowable period; and a first transmitting step of transmitting the response packet to the second device when it is determined in the response determining step to transmit the response packet. At least any one of the predetermined time interval, the predetermined allowable period, and the predetermined connection maintaining period is set on the basis of at least any one of: a type of a game and/or the status of execution of the game process; a frequency of operation on the operation means of the first device or the second device; a type of the first device or the second device; and the number of devices included in the wireless system.

Another embodiment is directed to a wireless device configured to perform wireless communication with at least another device. The wireless device includes: interval setting means for setting a predetermined time interval; allowable period setting means for setting a predetermined allowable period; connection maintaining period setting means for setting a predetermined connection maintaining period; transmitting means for transmitting a predetermined packet to the other device at the predetermined time interval set by the interval setting means; receiving means for receiving, from the other device, a response packet to the predetermined packet; game processing means for executing a game process on the basis of the response packet; and determining means for determining whether to maintain a connection with the other device or terminate the connection with the other device, on the basis of the connection maintaining period and a period in which the response packet has not been received from the other device. The response packet is transmitted from the other device before the allowable period elapses. At least any one of the predetermined time interval, the predetermined allowable period, and the predetermined connection maintaining period is set on the basis of at least any one of: a type of a game and/or a status of execution of the game process; a frequency of operation on operation means of the other device or the wireless device; a type of the other device or the wireless device; and the number of other devices performing communication with the wireless device.

Another embodiment is directed to each device included in the above wireless device (wireless system), or a program to be executed by each device. The above embodiment is directed to a communication method to be executed in the above wireless device (wireless system).

According to the present embodiment, communication can be performed while power consumption is reduced.

These and other objects, features, aspects and advantages of the exemplary embodiment will become more apparent from the following detailed description when taken in conjunction with the accompanying drawings.

BRIEF DESCRIPTION OF THE DRAWINGS

FIG. 10 is an example non-limiting diagram showing an example of the structure of representation data D transmitted from the mobile terminal 10 to the BLE terminal 20 in a connection event CE1 in FIG. 9;

FIG. 14 is an example non-limiting diagram showing an example of a game for which the mobile terminal 10 and the BLE terminal 20 are used;

FIG. 24 is an example non-limiting flowchart showing the details of a slave-side connection process performed by a BLE communication module 25 of the BLE terminal 20.

DETAILED DESCRIPTION OF NON-LIMITING EXAMPLE EMBODIMENTS

Hereinafter, a wireless communication system according to an exemplary embodiment will be described with reference to the drawings. The wireless communication system according to the exemplary embodiment is a system including a plurality of devices capable of performing wireless communication, and each device performs communication based on, for example, the Bluetooth Low Energy (Bluetooth 4.x, hereinafter abbreviated as "BLE") standard. First, an outline of the BLE standard will be described.

(Outline of BLE)

The BLE standard is a communication standard designed such that power consumption is lower than that in classic Bluetooth (registered trademark) (Ver.1.x-3.x). In BLE, the maximum transmission power is reduced so as to be lower than that in classic Bluetooth, and the operating time of wireless communication and the number of times of operation thereof are decreased so as to be lower than those in classic Bluetooth, thereby reducing power consumption. In BLE, the time interval of communication is longer than that in classic Bluetooth, and this time interval can be changed. Further, similarly to classic Bluetooth, BLE employs a star network topology in which a plurality of slaves can connect to a single master.

Figure 1:
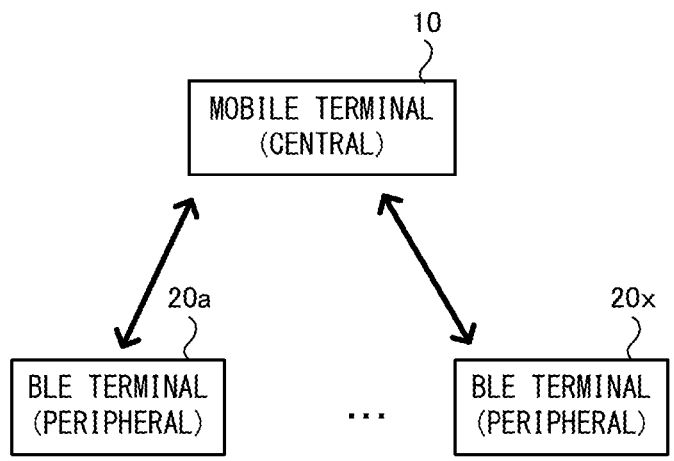
FIG. 1 is an example non-limiting diagram showing an example of a general BLE network including a mobile terminal 10 and BLE terminals 20.
Figure 2:
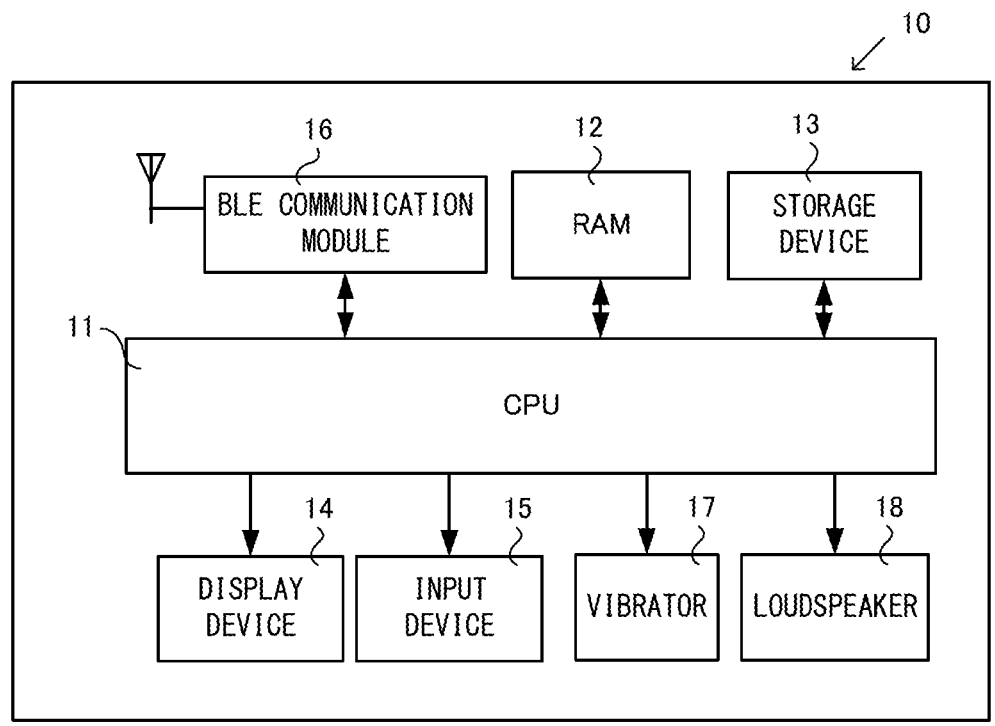
FIG. 2 is an example non-limiting block diagram showing an example of the internal configuration of the mobile terminal 10.
Figure 3:
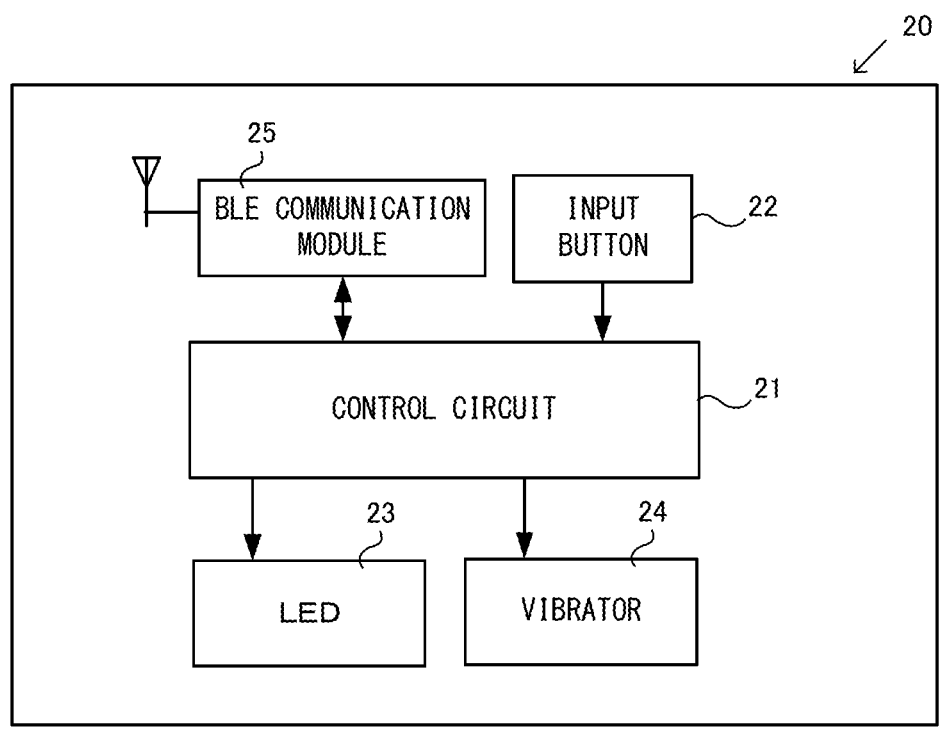
FIG. 3 is an example non-limiting block diagram showing an example of the internal configuration of the BLE terminal 20.

FIG. 1 is a diagram showing an example of a general BLE network including a mobile terminal 10 and BLE terminals 20. FIG. 2 is a block diagram showing an example of the internal configuration of the mobile terminal 10. FIG. 3 is a block diagram showing an example of the internal configuration of the BLE terminal 20.

As shown in FIG. 1, the mobile terminal 10 and the BLE terminals 20 are present in the range where communication can be performed, and form a network. In BLE, the range where communication can be performed is, for example, a range within several to several tens of meters.

The mobile terminal 10 is, for example, a mobile information processing apparatus capable of executing a predetermined application, such as a mobile phone, a smartphone, or a tablet terminal. As shown in FIG. 2, the mobile terminal 10 includes, for example, a CPU (or/and another processor) 11, a RAM 12, a storage device (a non-volatile memory, a hard disk, or the like) 13, a display device (a liquid crystal display device, an organic EL display device, or the like) 14, an input device 15, a BLE communication module 16 for performing communication based on the BLE standard, a vibrator 17, and a loudspeaker 18. The mobile terminal 10 also includes a battery that is not shown. The CPU 11 of the mobile terminal 10a can cooperate with the RAM 12 to execute various application programs stored in the storage device 13 (or acquired via the network). For example, the mobile terminal 10 can execute, as a predetermined application, various application programs such as an application capable of reproducing a moving image and a still image, a message application, a browser application, a game application, and an application for processing data acquired from the BLE terminal 20. The mobile terminal 10 may include, as the input device 15, for example, an input button, a touch panel, inertial sensors such as an acceleration sensor and an angular velocity sensor, a camera, a microphone, etc. The mobile terminal 10 also may include a GPS (Global Positioning System) function. The mobile terminal 10 can perform information processing more advanced than that of the BLE terminal 20, and therefore has power consumption higher than that of the BLE terminal 20.

The BLE terminal 20 is, for example, a mobile device and is typically a device smaller than the mobile terminal 10. Typically, the BLE terminal 20 may only have a function more limited than that of the mobile terminal 10, and may be a device for performing relatively simple processing. The BLE terminal 20 may be a device capable of executing advanced information processing (application) similar to that of the mobile terminal 10.

As shown in FIG. 3, the BLE terminal 20 includes, for example, a control circuit 21, an input button 22, an LED 23, a vibrator 24, and a BLE communication module 25. The BLE terminal 20 is a relatively small mobile device and is a device having low power consumption. For example, the BLE terminal 20 can operate for a relatively long period (several months to several years) by a button battery. The respective components of the BLE terminal 20 may be mounted on the control circuit 21. For example, the BLE terminal 20 receives data transmitted from the mobile terminal 10, by using the BLE communication module 25, cause the LED 23 to emit light, and vibrates the vibrator 24. In addition, the BLE terminal 20 transmits data corresponding to an operation performed on the input button 22, to the mobile terminal 10 by using the BLE communication module 25. The BLE terminal 20 may include a CPU or/and another processor for executing any application program. In addition, the BLE terminal 20 may include a display device, a loudspeaker, a microphone, a camera, etc. For example, the BLE terminal 20 may exchange data regarding an image and a sound with the mobile terminal 10 via the BLE communication module 25. Furthermore, the BLE terminal 20 may include, as input means for receiving an input from a user, a touch panel, various sensors (acceleration sensor, an angular velocity sensor, etc.), etc. in addition to the input button.

As shown in FIG. 1, the mobile terminal 10 functions as a central (referred to also as "master") in the BLE network, and the BLE terminal 20 functions as a peripheral (referred to also as "slave") in the BLE network. The mobile terminal 10 can establish connections with a plurality of BLE terminals 20 (20a, . . . , 20x) and serves as a central in each connection. The central manages participation of a peripheral in the network and sets various parameters for a connection with a peripheral.

Here, in the BLE standard, radio waves in the 2.4 GHz band are used. Specifically, communication is performed using 40 channels. In the BLE standard, among the 40 channels, three channels 37 to 39 are advertising channels, and the other channels 0 to 36 are data channels. Each advertising channel is a channel used to find or connect a device, used to notify another device of the presence of the device itself, or used to exchange data without establishing a connection with another device as described later. Each data channel is a channel used in a connection state (a state of being connected) and is used by two devices in a connection state to transmit and receive data to and from each other. In classic Bluetooth, 79 channels are included, and 32 channels among the 79 channels are channels for finding.

Figure 4:
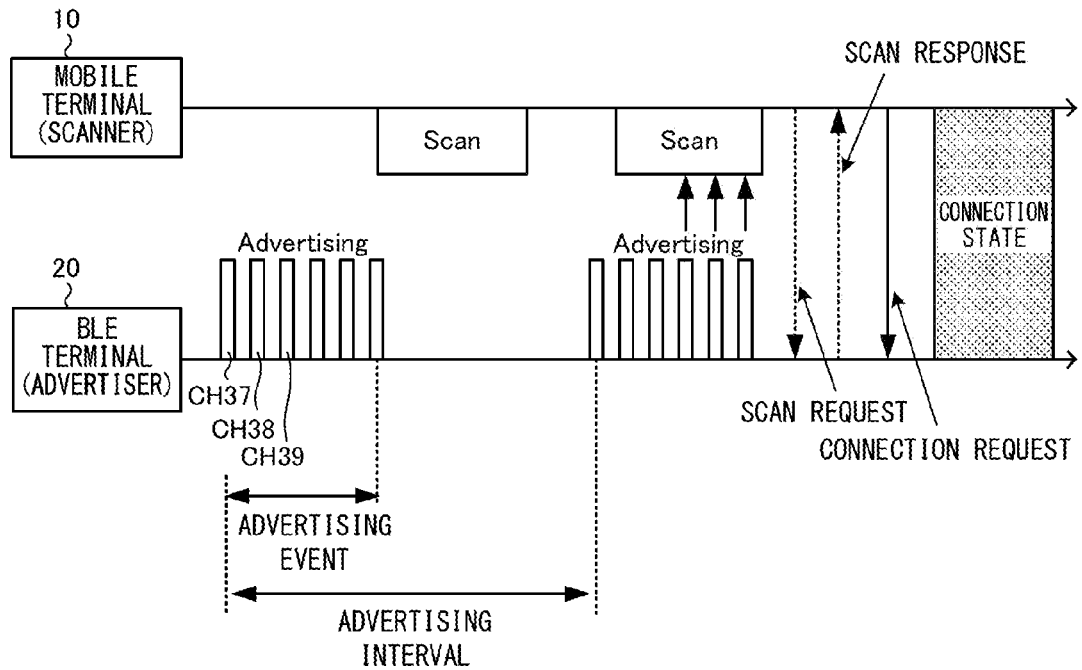
FIG. 4 is an example non-limiting diagram showing an example of flow of communication from a state where the mobile terminal 10 and the BLE terminal 20 are not connected to each other to a state where the mobile terminal 10 and the BLE terminal 20 are connected to each other.

FIG. 4 is a diagram showing an example of flow of communication from a state where the mobile terminal 10 and the BLE terminal 20 are not connected to each other to a state where the mobile terminal 10 and the BLE terminal 20 are connected to each other.

Each device changes its state in the period from a state of not being connected (a non-connected state) to a connection state. Specifically, as shown in FIG. 4, the mobile terminal 10 repeats a scan at a predetermined time interval. The state of performing a scan is referred to as "scanning state", and the device in this state is referred to as "scanner". Specifically, the mobile terminal 10 repeats a scan and a pause state, and during execution of a scan, activates a reception circuit, thereby attempting to receive an advertising packet (an advertising PDU (protocol data unit)) from another device. The mobile terminal 10 may execute a scan while changing a period of the scan and/or a period of the pause state.

Meanwhile, the BLE terminal 20 repeats advertising at an advertising interval. The state of performing advertising is referred to as "advertising state", and the device in this state is referred to as "advertiser". Specifically, in a single round of advertising (a single advertising event), the BLE terminal 20a transmits an advertising packet while switching between the three channels 37 to 39. As described above, an advertising packet is transmitted while the frequency of radio waves is switched. The switching of the frequency of radio waves is referred to as "hopping".

As shown in FIG. 4, if the timing of a scan of the mobile terminal 10 and the timing of advertising of the BLE terminal 20 coincide with each other, the mobile terminal 10 receives an advertising packet from the BLE terminal 20. Upon reception of the advertising packet from the BLE terminal 20, the mobile terminal 10 transmits a scan request to the BLE terminal 20. In response to the scan request, the BLE terminal 20 returns a scan response. The scan request and the scan response are also transmitted using the advertising channels. The method of a scan includes an "active scan and a "passive scan", and FIG. 4 shows an example of the "active scan". In the "passive scan", a "scan request" and a "scan response" that are shown in FIG. 4 are not made. That is, in the passive scan, upon reception of the advertising packet from the BLE terminal 20, the mobile terminal 10 transmits a connection request to the BLE terminal 20 without transmitting a scan request.

In connecting to a device that has transmitted an advertising packet, the mobile terminal 10 transmits a connection request to the BLE terminal 20 that has transmitted the advertising packet. When the mobile terminal 10 transmits the connection request to the BLE terminal 20, a connection between the mobile terminal 10 and the BLE terminal 20 is established (each of the mobile terminal 10 and the BLE terminal 20 shifts to a "connection state"). Specifically, with the mobile terminal 10 as a master (a central) and the BLE terminal 20 as a slave (a peripheral), the two devices enter a connection state. Here, the phrase "a connection is established" means that two devices have shifted to a connection state. For example, when the mobile terminal 10 transmits a connection request to the BLE terminal 20, the mobile terminal 10 shifts to a connection state. Here, if the BLE terminal 20 cannot receive the connection request, the BLE terminal 20 does not shift to a connection state. If the BLE terminal 20 has not shifted to a connection state, the mobile terminal 10 cannot receive a response to a data packet in a subsequent connection event from the BLE terminal 20. Therefore, in this case, the mobile terminal 10 shifts from the connection state to a non-connected state.

The connection request transmitted from the mobile terminal 10 includes a plurality of parameters for a connection. Specifically, the connection request includes the address of the mobile terminal 10, the address of the BLE terminal 20, an access address, a connection interval, a slave latency, information about hopping (the number of hops and information about the channels to be used), a connection supervision timeout, etc. The access address is randomly determined for identifying the connection. In transmitting a packet (data packet) to a connection partner by using the data channel, each device includes the access address in the packet and transmits the packet. On the basis of the access address, each device can determine whether a data packet is from a connection partner. Further, the connection interval, the slave latency, and the connection supervision timeout will be described later. Moreover, after the connection request is made, pairing and bonding for exchanging cryptographic keys in the connection may be performed. In the pairing, temporary cryptographic keys for use in this connection are generated and exchanged. In the bonding, permanent cryptographic keys are generated and exchanged after the pairing. The permanent cryptographic key is stored in a non-volatile memory or the like in each device.

Figure 5:
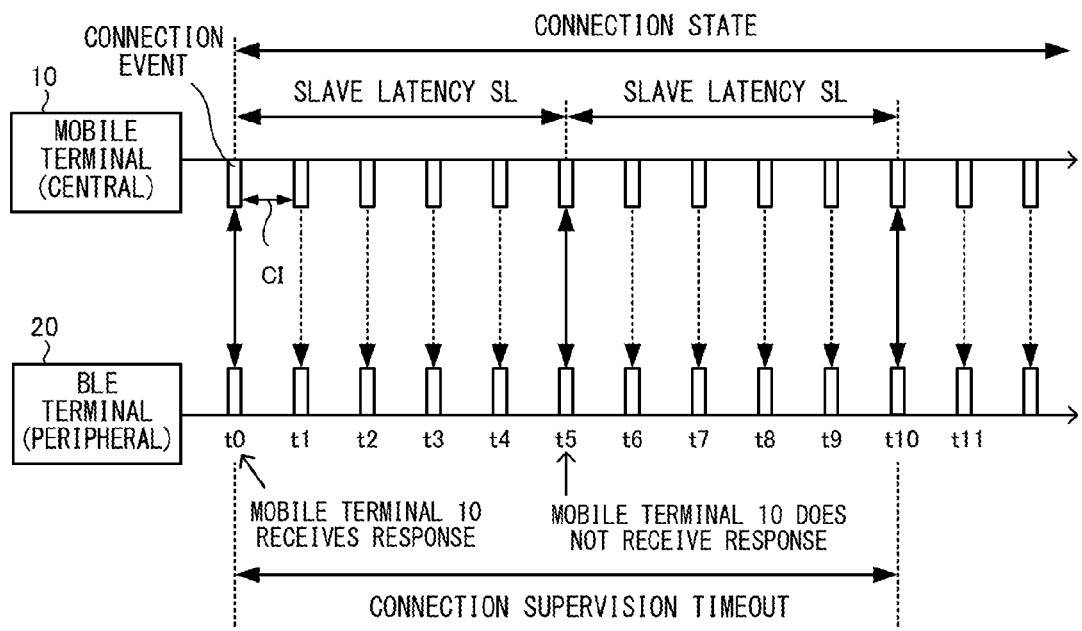
FIG. 5 is an example non-limiting diagram showing an example of communication between the mobile terminal 10 and the BLE terminal 20 in a connection state.

FIG. 5 is a diagram showing an example of communication between the mobile terminal 10 and the BLE terminal 20 in a connection state. As shown in FIG. 5, if two devices are in a connection state, synchronized communication (synchronous communication) called a connection event is performed between the two devices at a predetermined time interval. The interval of the connection event is referred to as "connection interval (CI)". The connection interval is set by a master when the connection is established. The connection interval in the connection between the mobile terminal 10 and the BLE terminal 20 is, for example, 500 milliseconds. The connection interval may be set in the range of 7.5 milliseconds to 4 seconds.

In a single connection event, the mobile terminal 10 and the BLE terminal 20 transmit and receive data to and from each other using a single data channel (for example, the channel 1). In a connection event next to a certain connection event, the frequency is hopped. For example, when the channel 1 is used in a certain connection event, the channel 3 is used in the next connection event. The number of channels to be hopped every connection event is referred to as "the number of hops". The number of hops is set when the connection between the mobile terminal 10 and the BLE terminal 20 is established.

Specifically, when the connection interval (CI) elapses from the timing of the last connection event, the mobile terminal 10 transmits a packet to the BLE terminal 20. Then, in this connection event, the BLE terminal 20 transmits a response packet to the mobile terminal 10. In a period other than the timing of the connection event, the mobile terminal 10 and the BLE terminal 20 pause wireless communication and do not transmit and receive data to and from each other. Here, an error in measurement of time occurs in each device, and therefore, the BLE terminal 20, taking this error into account, attempts to receive a data packet from the mobile terminal 10 for a predetermined period including the timing of a connection event. Time accuracy information of the mobile terminal 10 (a master) is included in the above connection request and transmitted from the mobile terminal 10 to the BLE terminal 20. On the basis of the received time accuracy information of the mobile terminal 10 and time accuracy information of the BLE terminal 20 itself, the BLE terminal 20 calculates the timing at which a reception circuit is to be activated.

Also in classic Bluetooth, frequency hopping is performed. In classic Bluetooth, frequency hopping is performed every time slot of 0.625 milliseconds. In classic Bluetooth, in a time slot of 0.625 milliseconds, for example, a master transmits a packet to a slave. At this time, the master transmits the packet to the slave by using a certain channel, and the slave attempts to receive the packet from the master by using the same channel in synchronization with this. In the next time slot (after 0.625 milliseconds), the slave returns a response to the master by using another channel.

On the other hand, in BLE, as described above, in a single connection event, a packet is transmitted from a master to a slave, and a response packet is transmitted from the slave to the master. In addition, the interval (CI) of the connection event is variable, and is different depending on, for example, the type of an application to be executed in the mobile terminal 10 and/or the BLE terminal 20.

Here, as shown in FIG. 5, slave latency is set for the connection between the mobile terminal 10 and the BLE terminal 20. The slave latency is the number of connection events that the BLE terminal 20 (slave) can ignore (skip). Normally, in each connection event, the mobile terminal 10 transmits a data packet to the BLE terminal 20, and the BLE terminal 20 returns a response packet in accordance with reception of the data packet. Accordingly, application data is exchanged. However, if there is no data to be transmitted, the BLE terminal 20 does not have to return a response packet in a period determined by the slave latency. Accordingly, the power consumption of the BLE terminal 20 can be reduced.

In the example shown in FIG. 5, slave latency SL is set to "4". As shown in FIG. 5, in a connection event at a time t0, a packet is transmitted from the mobile terminal 10 to the BLE terminal 20, and, in accordance with the packet, a response packet is transmitted from the BLE terminal 20 to the mobile terminal 10. In a connection event at a time t1 at which the CI elapses, the mobile terminal 10 transmits a packet to the BLE terminal 20, but the BLE terminal 20 does not have to transmit a response packet to the mobile terminal 10. Furthermore, also at next times t2, t3, and t4, the BLE terminal 20 does not have to transmit a response packet to the mobile terminal 10. On the other hand, in a connection event at a time t5 at which the CI elapses from the time t4, the BLE terminal 20 transmits a response packet to the mobile terminal 10. Moreover, in connection events at subsequent times t6 to t9, the BLE terminal 20 does not have to transmit a response packet to the mobile terminal 10, but in a connection event at a time t10, the BLE terminal 20 transmits a response packet to the mobile terminal 10. In the connection events at the times t1 to t4 and t6 to t9, the BLE terminal 20 may transmit a response packet to the mobile terminal 10. That is, the slave latency is the maximum number of times the BLE terminal 20 as a slave can successively ignore a connection event.

When communication has not been performed between the mobile terminal 10 and the BLE terminal 20 in a predetermined period, the connection between the two devices is terminated (the two devices shift from the connection state to the non-connected state). Whether the connection between the two devices is to be terminated is determined on the basis of the connection supervision timeout. Specifically, when an elapsed time from the last communication exceeds the connection supervision timeout, the connection between the mobile terminal 10 and the BLE terminal 20 is terminated. Here, for example, the connection supervision timeout is set to a value greater than the slave latency SL. Thus, for example, in FIG. 5, even when the mobile terminal 10 does not receive a response packet from the BLE terminal 20 in the fifth connection event (t5), the mobile terminal 10 and the BLE terminal 20 does not immediately shift to the non-connected state. This is because it is assumed that, for example, in the case where the slave latency is set to "4", even when the BLE terminal 20 ignores four connection events (the connection events at t1 to t4) and transmits a response packet to the mobile terminal 10 in the fifth connection event (t5), the mobile terminal 10 cannot receive the response packet, depending on the status of communication. If the connection between the mobile terminal 10 and the BLE terminal 20 is terminated when the mobile terminal 10 cannot receive, in the fifth connection event, the response packet transmitted by the BLE terminal 20, the connection is terminated frequently. In order to prevent this, the connection supervision timeout is set to a value greater than the slave latency SL, and when a period in which communication is not performed exceeds the connection supervision timeout, the two devices shift from the connection state to the non-connected state (the connection between the two devices is terminated).

Specifically, the mobile terminal 10 measures an elapsed time from reception of a response packet, and shifts from the connection state to the non-connected state when a period in which a response packet is not received from the BLE terminal 20 exceeds the connection supervision timeout (or reaches the connection supervision timeout). In addition, when a period in which a data packet is not received from the mobile terminal 10 exceeds the connection supervision timeout (or reaches the connection supervision timeout), the BLE terminal 20 shifts from the connection state to the non-connected state (alternatively, the BLE terminal 20 may measure an elapsed time from transmission of a response packet to the mobile terminal 10, and may shift from the connection state to the non-connected state when a period in which a response packet is not transmitted to the mobile terminal 10 exceeds the connection supervision timeout). That is, each of the mobile terminal 10 and the BLE terminal 20 shifts from the connection state to the non-connected state when a period in which a packet is not received from the connection destination exceeds (or reaches) the connection supervision timeout.

An elapsed time from the last communication is measured, and when a period in which communication from the connection destination cannot be confirmed in the connection event exceed (or reaches) the connection supervision timeout, the mobile terminal 10 or the BLE terminal 20 may not shift from the connection state to the non-connected state and may determine that the connection has been suspended. For example, when it is determined that the connection has been suspended, the mobile terminal 10 and/or the BLE terminal 20 may shift to another state with the connection state maintained. For example, when the BLE terminal 20 determines that the connection has been suspended, the BLE terminal 20 may shift to a state where the BLE terminal 20 attempts to receive a packet from the mobile terminal 10 but does not return a response to the received packet. The timing of attempting to receive a packet may be, for example, an interval equal to the connection interval in the connection state, may be an interval longer or shorter than the connection interval, or may be random. Alternatively, when the BLE terminal 20 determines that the connection has been suspended, the BLE terminal 20 may shift to a state where the BLE terminal 20 does not attempt to receive a packet from the mobile terminal 10 and transmits a packet to the mobile terminal 10 periodically or at a random timing. Moreover, when the mobile terminal 10 determines that the connection has been suspended, for example, the mobile terminal 10 may transmit a packet to the BLE terminal 20 at an interval equal to or different from the connection interval that is set in the connection state, or may transmit a packet to the BLE terminal 20 at a randomly determined timing. Alternatively, when the mobile terminal 10 determines that the connection has been suspended, the mobile terminal 10 may not transmit a packet to the BLE terminal 20 and may attempt to receive a packet from the BLE terminal 20. Then, each of the two devices that have shifted to the other states with the connection state maintained may return to a connection state again on the basis of reception of a packet from the partner (even when the connection supervision timeout is exceeded (or reached).

The connection supervision timeout is set to a value that is equal to or greater than twice "(SL+1)×connection interval". For example, in the case where the connection interval is set to 500 milliseconds and the slave latency is set to 4, 500 milliseconds×(4+1)×2=5 may be set as the connection supervision timeout. The connection supervision timeout may be determined as a time or as the number of connection events. For example, in the case where the connection interval is set to 500 milliseconds and the slave latency is set to 4, "(4+1)×2=10" may be set as the connection supervision timeout. In this case, when the connection supervision timeout is converted into time, the connection supervision timeout is "5 seconds". In this case, for example, in FIG. 5, even when the mobile terminal 10 does not receive a response packet from the BLE terminal 20 in the fifth connection event (t5), the connection events at t6 to t10 are executed (in this period, the connection between the two devices is maintained). When the mobile terminal 10 receives a response packet from the BLE terminal 20 in the connection event at the time t10, the connection between the two devices is maintained. On the other hand, when the mobile terminal 10 does not receive a response packet from the BLE terminal 20 in the fifth connection event (t5), if the mobile terminal 10 does not receive a response packet from the BLE terminal 20 also in the connection event at the time t10 (that is, the mobile terminal 10 does not receive a response packet in all the connection events at t1 and thereafter), the connection between the two devices is terminated. The connection supervision timeout may be determined within the range of, for example, 100 milliseconds to 32 seconds.

The range where the slave latency is defined is, for example, 0 to 499. However, the BLE standard employs time synchronization type communication, and thus the two devices need to be synchronized before a cumulative error of clocks of the two devices exceeds a certain value. A required communication interval that takes the cumulative error of the clocks into account is referred to as effective connection interval. The effective connection interval is represented by "(SL+1)×connection interval", and has to be set to a value that is equal to or less than half the above connection supervision timeout. Thus, the maximum value of the slave latency is limited by the connection supervision timeout.

Whether to terminate the connection between the mobile terminal 10 and the BLE terminal 20 may be determined on the basis of the slave latency. For example, the mobile terminal 10 may terminate the connection with the BLE terminal 20 when a period in which a response packet from the BLE terminal 20 is not present exceeds the slave latency.

As described above, the BLE terminal 20 does not have to transmit a response packet in response to a data packet from the mobile terminal 10 in a predetermined allowable period (in the number of connection events indicated by the slave latency). Accordingly, the BLE terminal 20 can reduce the power consumption. The allowable period may be represented by the number of connection events as described above, or may be represented by time.

If the mobile terminal 10 and the BLE terminal 20 perform communication with each other within a period determined by the connection supervision timeout, the mobile terminal 10 and the BLE terminal 20 maintain the connection state. On the other hand, if a period in which communication has not been performed exceeds (or reached) the period determined by the connection supervision timeout, the mobile terminal 10 and the BLE terminal 20 shift to a non-connected state.

As described above, when a connection between the two devices is established, a connection request is made (parameters for the connection are exchanged), and the two devices enter a connection state. When the two devices are in the connection state, communication is performed between the two devices at the connection interval.

As described above, the mobile terminal 10 can establish connections with a plurality of the BLE terminals 20. For example, in a state where the mobile terminal 10 is connected to the BLE terminal 20a, the mobile terminal 10 establishes a connection also with the BLE terminal 20b (the mobile terminal 10 and the BLE terminal 20b enter a connection state). The connection interval in the connection between the mobile terminal 10 and the BLE terminal 20a and the connection interval in the connection between the mobile terminal 10 and the BLE terminal 20b may be different from each other or the same, but the mobile terminal 10 determines a timing of the first connection event such that connection events of the respective connections do not temporally overlap each other.

The mobile terminal 10 may perform communication with another device (a mobile terminal 10 or another BLE terminal) without establishing a connection.

Figure 6:
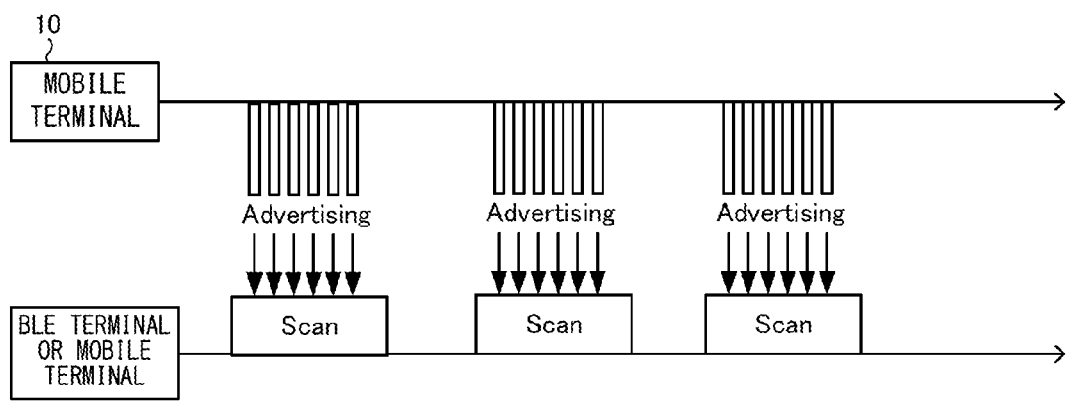
FIG. 6 is an example non-limiting diagram showing a state where the mobile terminal 10 transmits data by repeating advertising without connecting to another device.

FIG. 6 is a diagram showing a state where the mobile terminal 10 transmits data by repeating advertising, without connecting to another device. As shown in FIG. 6, the mobile terminal 10 repeatedly executes advertising. Advertising packets include an advertising packet for connection, and an advertising packet for transmitting data to another device. In the example shown in FIG. 6, an advertising packet for transmitting data to another device is transmitted. This advertising packet includes data to be used by an application. Accordingly, the mobile terminal 10 can broadcast data to unspecified other devices that are present around the mobile terminal 10.

Figure 7:
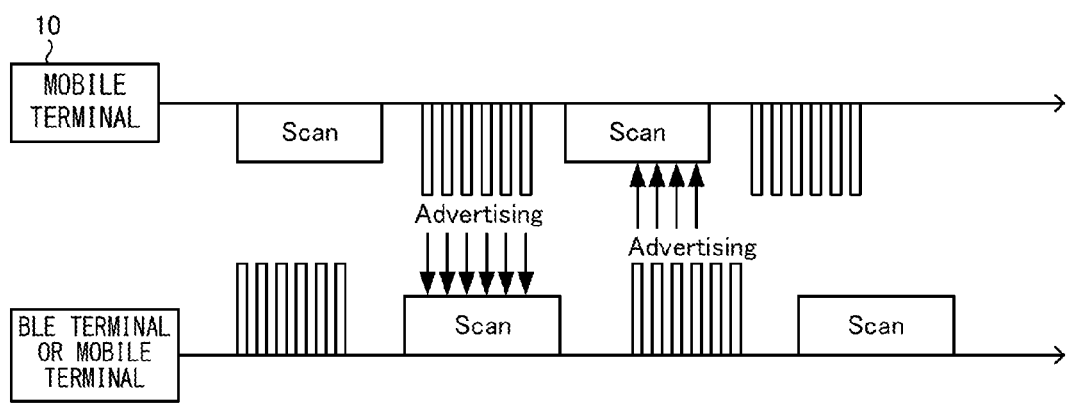
FIG. 7 is an example non-limiting diagram showing a state where the mobile terminal 10 and another device perform communication with each other by repeating a scan and advertising without connecting to each other.

FIG. 7 is a diagram showing a state where the mobile terminal 10 and another device perform communication by repeating a scan and advertising, without connecting to each other. As shown in FIG. 7, the mobile terminal 10 repeatedly executes a scan and advertising. Between a scan and advertising, there is a pause period in which both a scan and advertising are not performed. In addition, similarly, the other device also repeatedly executes a scan and advertising. If the scan of the mobile terminal 10 and the advertising of the other device temporally overlap each other, the mobile terminal 10 can receive data from the other device. In addition, if the advertising of the mobile terminal 10 and the scan of the other device temporally overlap each other, the mobile terminal 10 can transmit data to the other device.

As described above, the mobile terminal 10 can transmit and receive data to and from the other device by transmitting an advertising packet, even without connecting to the other device.

Figure 8:
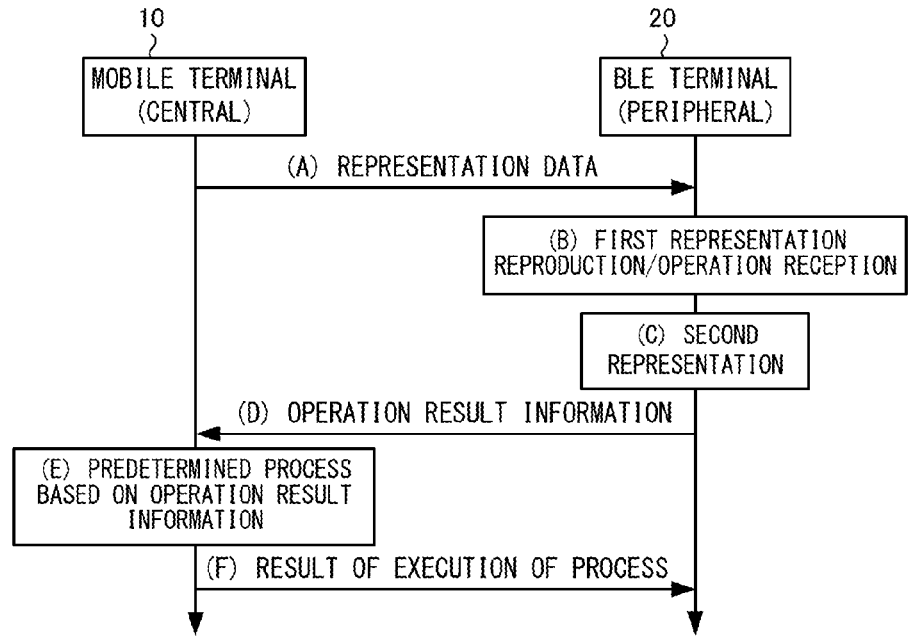
FIG. 8 is an example non-limiting diagram showing an outline of a process performed when an interactive application is executed by using the mobile terminal 10 and the BLE terminal 20 in the present embodiment.

Next, an interactive application to be executed by using the mobile terminal 10 and the BLE terminal 20 in the present embodiment will be described. FIG. 8 is a diagram showing an outline of a process performed when the interactive application is executed by using the mobile terminal 10 and the BLE terminal 20 in the present embodiment.

As shown in FIG. 8, in a state where the mobile terminal 10 and the BLE terminal 20 are connected to each other, representation data is transmitted from the mobile terminal 10 to the BLE terminal 20 (A). This representation data includes representation information indicating the contents of a representation to be executed in the BLE terminal 20.

In accordance with reception of the representation data from the mobile terminal 10, the BLE terminal 20 performs a first representation and also receives an operation on the input button 22 (B). When the input button 22 is operated during reception of an operation on the input button 22, the BLE terminal 20 executes a representation corresponding to the operation (a second representation).

Next, operation result information indicating presence/absence of an operation on the input button 22 is transmitted from the BLE terminal 20 to the mobile terminal 10 (D). Here, information about one or a plurality of operations performed in a predetermined period is transmitted from the BLE terminal 20 to the mobile terminal 10. Then, on the basis of the operation result information from the BLE terminal 20, the mobile terminal 10 executes a predetermined process (E). For example, the mobile terminal 10 performs a game process on the basis of the operation result information, and displays an image indicating a result of the game process, on the display device 14, or outputs a sound corresponding to the result of the game process, from the loudspeaker 18.

Then, the mobile terminal 10 transmits the result of execution of the predetermined process to the BLE terminal 20 (F). In the BLE terminal 20, output corresponding to the result of execution of the predetermined process by the mobile terminal 10 may be performed. For example, the BLE terminal 20 causes the LED 23 to emit light or vibrates the vibrator 24 in accordance with the result of execution of the predetermined process. In addition, in the case where a display device or a loudspeaker is provided to the BLE terminal 20, an image or a sound corresponding to the result of execution of the predetermined process by the mobile terminal 10 may be outputted.

Figure 9:
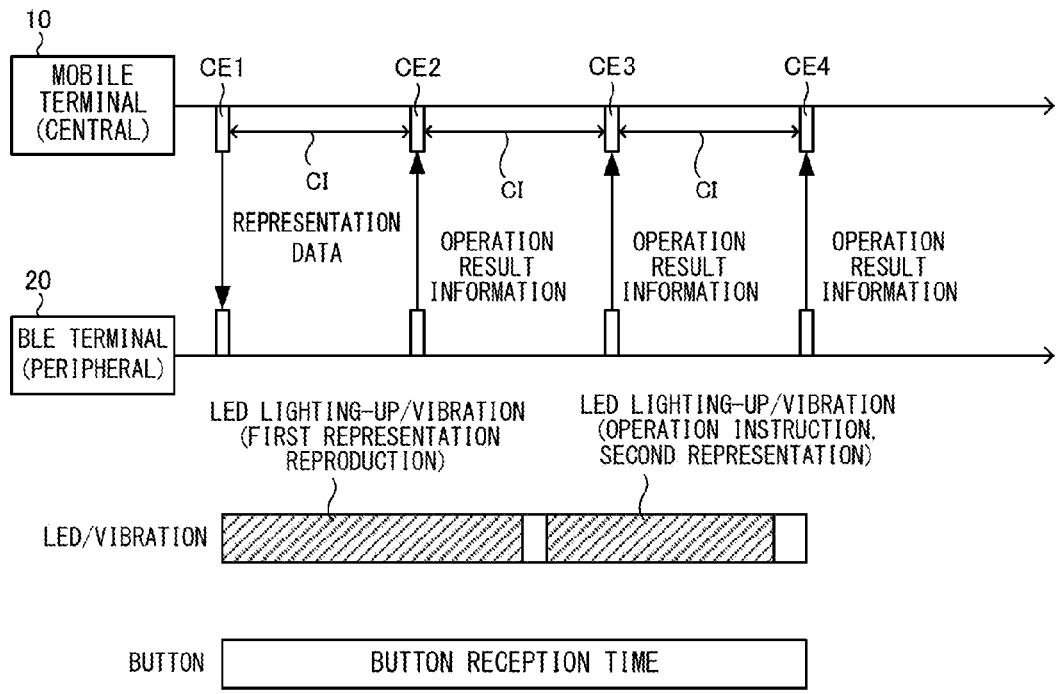
FIG. 9 is an example non-limiting diagram showing an example of flow of communication performed when the process shown in FIG. 8 is performed.

FIG. 9 is a diagram showing an example of flow of communication performed when the process shown in FIG. 8 is performed.

As shown in FIG. 9, the mobile terminal 10 transmits the representation data including the representation information, to the BLE terminal 20 at the timing of a connection event CE1. The representation data including the representation information may be transmitted from the mobile terminal 10 to the BLE terminal 20 in a single connection event, or may be divided and transmitted in a plurality of connection events. The structure of the representation data transmitted from the mobile terminal 10 to the BLE terminal 20 will be described in detail later with reference to FIG. 10.

Upon reception of the representation data in the connection event CE1, the BLE terminal 20 executes the first representation. Specifically, as the first representation, a representation using the LED 23 and a representation using the vibrator 24 are performed.

In addition, upon the reception of the representation data from the mobile terminal 10, the BLE terminal 20 sets a button reception time for receiving an operation on the input button 22. If an operation is performed on the input button 22 within the button reception time, the second representation is performed.

In addition, if an operation is performed on the input button 22 within the button reception time, operation result information indicating the content of the operation is transmitted from the BLE terminal 20 to the mobile terminal 10. Specifically, the BLE terminal 20 can accumulate a plurality of operations performed on the input button 22 in the connection interval (CI). Operation result information indicating the plurality of operations stored in the CI is transmitted from the BLE terminal 20 to the mobile terminal 10 in the next connection event. For example, when the BLE terminal 20 receives the representation data from the mobile terminal 10 in the connection event CE1, the BLE terminal 20 accumulates any operation performed on the input button 22, until the next connection event CE2 occurs. If the input button 22 is pressed, for example, twice before the next connection event CE2 occurs, the BLE terminal 20 transmits operation result information indicating that the input button 22 has been pressed twice, to the mobile terminal 10 in the next connection event CE2. Specifically, upon reception of a data packet from the mobile terminal 10 in the connection event CE2, the BLE terminal 20 includes, in a response packet to the packet, the operation result information indicating that the input button 22 has been pressed twice, and transmits the response packet. Furthermore, any operation performed on the input button 22 in the period from the connection event CE2 to the next connection event CE3 is transmitted from the BLE terminal 20 to the mobile terminal 10 in the connection event CE3. Similarly, any operation performed on the input button 22 in the period from the connection event CE3 to the next connection event CE4 is transmitted from the BLE terminal 20 to the mobile terminal 10 in the connection event CE4.

As described above, the BLE terminal 20 accumulates operations performed on the input button 22 in the predetermined time interval (CI), and transmits the accumulated operations to the mobile terminal 10 in the connection event performed at the predetermined time interval. That is, information about a plurality of operations including an operation performed on the input button 22 at a first timing and an operation performed on the input button 22 at a second timing different from the first timing, is accumulated in the BLE terminal 20. Then, the accumulated information about the plurality of operations is transmitted from the BLE terminal 20 to the mobile terminal 10. Accordingly, the power consumption can be reduced as compared to the case where, each time an operation is performed on the input button 22, information about this operation is transmitted from the BLE terminal 20 to the mobile terminal 10. In addition, in the case where, each time an operation is performed on the input button 22, information about this operation is transmitted, variation in the time taken until the information about the operation reaches the mobile terminal 10 occurs in some cases. If so, the mobile terminal 10 cannot accurately know the timing at which each operation is performed in the BLE terminal 20. However, in the present embodiment, the operation performed at the first timing and the operation performed at the second timing are accumulated, and the information about the plurality of operations accumulated is transmitted from the BLE terminal 20 to the mobile terminal 10. Therefore, the mobile terminal 10 can accurately know the time difference between the operation at the first timing and the operation at the second timing.

FIG. 10 is a diagram showing an example of the structure of representation data D transmitted from the mobile terminal 10 to the BLE terminal 20 in the connection event CE1 in FIG. 9.

As shown in FIG. 10, the representation data D transmitted from the mobile terminal 10 to the BLE terminal 20 includes basic information DA and first representation information DB.

The basic information DA is represented by four octets. The basic information DA includes a button reception time, second representation information, priority, and the number of representations.

The button reception time of the basic information DA is a time for receiving an operation on the input button 22 (see FIG. 9). The button reception time is an example of an operation condition. Here, the operation condition is a condition regarding an operation on the input button 22. The operation condition may be the content (the number of operations, the pattern of the operations, etc.) of an operation using the input button 22 and/or another input device, in addition to (or instead of) the time for receiving an button operation. If an operation that satisfies the operation condition is performed in the BLE terminal 20, the second representation is performed on the basis of the second representation information.

As shown in FIG. 10, the button reception time is represented at 256 levels (8 bits), and one level is defined as 50 milliseconds. Therefore, the button reception time is set within the range of 0 seconds to 12750 milliseconds. In the present embodiment, the button reception time is a time from a time point at which the BLE terminal 20 receives the representation data D to a time point at which a predetermined period elapses from end of the first representation. That is, if the input button 22 is operated in the predetermined period after the first representation ends, the second representation is performed on the basis of the second representation information. Reception of an operation on the input button 22 is started at the time point at which the representation data D is received. If the input button 22 is operated during execution of the first representation, this operation is ignored. That is, even if the input button 22 is operated during execution of the first representation, the second representation is not executed unless the input button 22 is operated in the predetermined period after end of the first representation. If the input button 22 is operated during execution of the first representation, this operation may be stored, and the second representation may be performed on the basis of the stored operation after end of the first representation.

The second representation information of the basic information DA is information indicating a representation (second representation) to be performed when the input button 22 is operated. The second representation information is represented by 16 bits. Specifically, the second representation information includes "LED" information and "vibration" information. The "LED" information is information indicating how the LED 23 is to be caused to emit light, and is represented by 12 bits (=3×4 bits). The LED 23 includes LEDs of three colors, that is, blue, green, and red, and the BLE terminal 20 can cause each LED to emit light at any intensity among 16 levels (4 bits). The intensities of the LEDs of the three colors are designated by the "LED" information, whereby the LED 23 can be caused to emit light in any color. In addition, the "vibration" information of the second representation information is information indicating how strongly the vibrator 24 is to be vibrated, and is represented by 3 bits (8 levels).

In the present embodiment, after the first representation is performed on the basis of the first representation information DB, the LED 23 emits light in a manner indicated by the "LED" information of the second representation information. Then, if an operation is performed on the input button 22 within the "button reception time", the vibrator 24 vibrates in a manner indicated by the "vibration" information of the second representation information.

The priority of the basic information DA is information for determining which representation based on the representation data D is prioritized, when the mobile terminal 10 further receives other representation data D while the BLE terminal 20 is executing the representation based on the representation data D. For example, it is assumed that the BLE terminal 20 receives representation data D1 in which priority 1 is set, from the mobile terminal 10 at a certain timing. The BLE terminal 20 executes a representation on the basis of the representation data D1 in which the priority 1 is set. While the BLE terminal 20 is executing the representation on the basis of the representation data D1, when the mobile terminal 10 further receives representation data D2 in which priority 2 (higher than the priority 1) is set, the BLE terminal 20 stops the currently executed representation based on the representation data D1 and executes a representation on the basis of the representation data D2.

The number of representations of the basic information DA indicates the number of representations included in the first representation information DB. The number of representations is represented by 5 bits. The number of the representations included in the first representation information DB is at most 30.

The first representation information DB is information indicating the first representation, and is, for example, information for performing a representation that prompts the user to perform a button operation. The first representation information DB includes at most 30 representation information from representation information sets DB1 to DB30. For example, in the case where the number of representations of the basic information DA is "2", the first representation information DB includes representation information sets DB1 and DB2. Each of the representation information sets DB1 to DB30 is represented by 3 octets. Specifically, the single representation information set DB1 includes "LED" information (12 bits) indicating a light-emitting manner of the LED 23, "vibration" information (4 bits) indicating a vibration manner using the vibrator 24, and "representation time" information (8 bits) indicating an execution time of a representation by the LED and vibration. The representation based on the single representation information DB is executed for at most 50 milliseconds×255=12750 milliseconds. In the case where the first representation information DB includes a plurality of representation information sets, the BLE terminal 20 executes representations in order from a small number (the representation information sets DB1, DB2, DB3, . . . ).

Since the number of representations is at most 30 and the single representation information set DB is represented by 3 octets, the maximum data length of the first representation information DB is 90 octets. For example, in the BLE standard, the maximum size of the payload of one packet is 27 octets. Thus, the mobile terminal 10 cannot transmit information regarding all the representations by a single packet in some cases. In such a case, the mobile terminal 10 may transmit a plurality of data packets in a single connection event. Specifically, in the case where the information regarding all the representations cannot be transmitted by a single packet, when the timing of a connection event has come, the mobile terminal 10 transmits a first data packet to the BLE terminal 20, receives a response packet from the BLE terminal 20, and further transmits a second data packet to the BLE terminal 20 in this connection event. In this case, the mobile terminal 10 includes, in the first data packet, information indicating that the second data packet is to be transmitted subsequent to the first data packet, and transmits the first data packet to the BLE terminal 20. Furthermore, after the mobile terminal 10 receives a response to the second data packet from the BLE terminal 20, the mobile terminal 10 transmits a third data packet to the BLE terminal 20 in this connection event. In this manner, in the case where the number of representations is too large so that all the representation data D cannot be included in a single data packet, the mobile terminal 10 may transmit a plurality of data packets to the BLE terminal 20 in a single connection event. The mobile terminal 10 may transmit the representation data D to the BLE terminal 20 over a plurality of connection events. In the case where the representation data D cannot be included in the payload of a single data packet, whether to divide the representation data D into segments in a plurality of packets and transmit the packets in a single connection event, or to transmit the representation data D over a plurality of connection events, is determined on the basis of the time to the next connection event. For example, on the basis of the connection interval and the amount of data to be transmitted, the mobile terminal 10 determines whether to transmit a plurality of packets in a single connection event or to transmit some of the packets in this connection event. If all the data cannot be transmitted even when the plurality of packets are transmitted in this connection event, the mobile terminal 10 transmits the remaining data in the next connection event.

Figure 11:
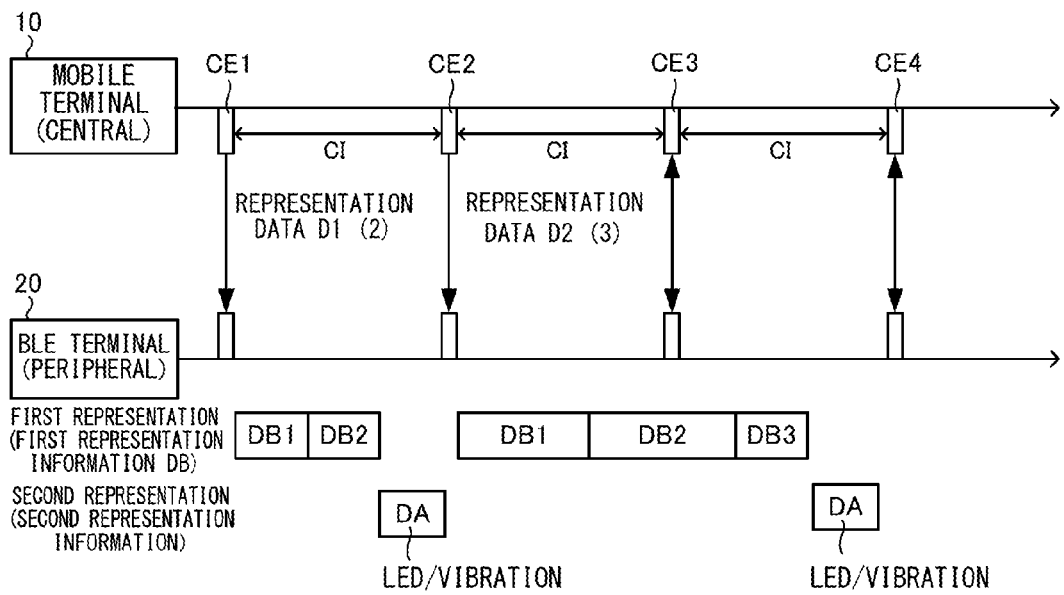
FIG. 11 is an example non-limiting diagram showing an example of a representation performed in the BLE terminal 20 after the representation data D is transmitted from the mobile terminal 10 to the BLE terminal 20.

FIG. 11 is a diagram showing an example of a representation performed in the BLE terminal 20 after the representation data D is transmitted from the mobile terminal 10 to the BLE terminal 20. As shown in FIG. 11, for example, when the representation data D1 including the two representation information sets DB1 and DB2 is transmitted from the mobile terminal 10 to the BLE terminal 20 in the connection event CE1, the BLE terminal 20 performs the first representation on the basis of the representation information sets DB1 and DB2 included in the representation data D1. Specifically, on the basis of the representation information set DB1, the BLE terminal 20 causes the LED 23 to emit light and vibrates the vibrator 24. The first representation based on the representation information set DB1 is performed for the "representation time" included in the representation information set DB1. After the first representation based on the representation information set DB1 ends, the BLE terminal 20 performs the first representation based on the representation information set DB2. When the first representation based on the representation information set DB2 ends, the BLE terminal 20 ends a series of the first representations based on the representation data D1. After the first representation ends, the LED 23 emits light in a manner indicated by the "LED" information of the second representation information. If the user presses the input button 22 while the LED 23 is emitting light (before the "button reception time" of the basic information DA elapses after the representation data D1 is received), the vibrator 24 vibrates in a manner indicated by the "vibration" information of the second representation information (the second representation is performed). If the input button 22 has not been pressed while the LED 23 is emitting light, the vibrator 24 does not vibrate (the second representation is not performed). If the input button 22 has not been pressed while the LED 23 is emitting light, the vibrator 24 may vibrate in a manner indicating an operation failure, or the LED 23 may emit light in a manner indicating an operation failure.

Next, when the representation data D2 including the three representation information sets DB1, DB2, and DB3 is transmitted from the mobile terminal 10 to the BLE terminal 20 in the connection event CE2, the BLE terminal 20 performs the first representation on the basis of each of the representation information sets DB1, DB2, and DB3. As shown in FIG. 11, a series of the first representations based on the representation data D2 are performed beyond the next connection event CE3. After the series of the first representations based on the representation data D2 are performed, the LED 23 emits light in a manner indicated by the "LED" information of the second representation information included in the representation data D2. If the user presses the input button 22, the vibrator 24 vibrates in a manner indicated by the "vibration" information of the second representation information.

Figure 12:
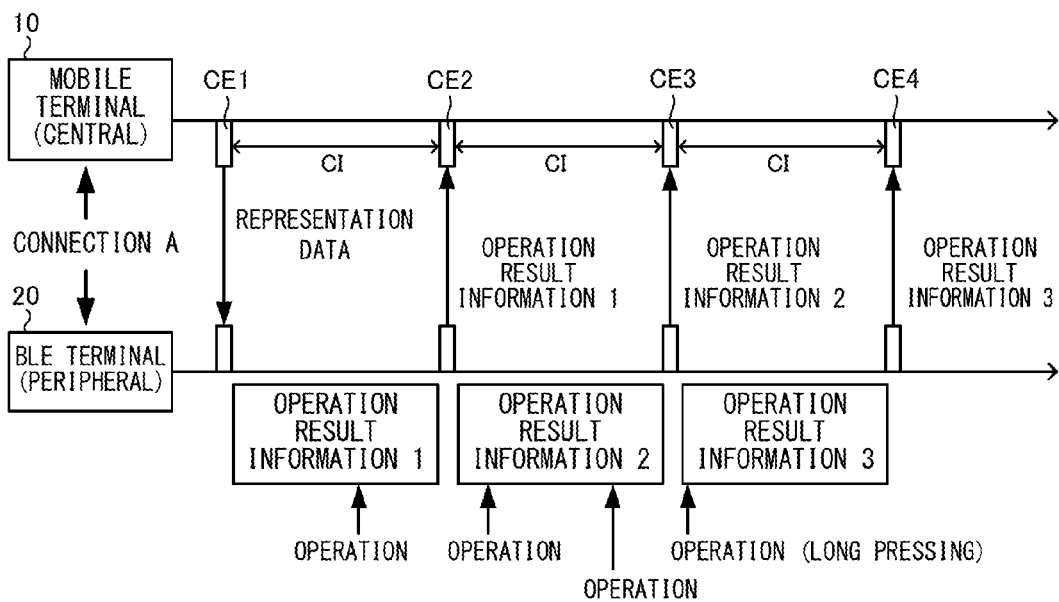
FIG. 12 is an example non-limiting diagram showing a state where operation result information indicating an operation performed on an input button 22 is transmitted from the BLE terminal 20 to the mobile terminal 10 when the operation is performed on the input button 22 in the BLE terminal 20.

FIG. 12 is a diagram showing a state where, when an operation is performed on the input button 22 in the BLE terminal 20, operation result information indicating the operation on the input button 22 is transmitted from the BLE terminal 20 to the mobile terminal 10.

As shown in FIG. 12, operation result information indicating an operation performed on the input button 22 between connection events (in the CI) is transmitted from the BLE terminal 20 to the mobile terminal 10 in a connection event that occurs next. Specifically, when the representation data D is transmitted from the mobile terminal 10 to the BLE terminal 20, the BLE terminal 20 receives an operation on the input button 22 on the basis of the "button reception time" included in this representation data D. The control circuit 21 of the BLE terminal 20 detects the operation state of the input button 22 at a time interval shorter than the CI and stores the operation state at each time point in a memory thereof. For example, in the case where the CI is 500 milliseconds, the control circuit 21 of the BLE terminal 20 detects the operation state of the input button 22 at an interval of 50 milliseconds. Then, operation result information stored in the memory and indicating the operation state at each time point is transmitted from the BLE terminal 20 to the mobile terminal 10 in the next connection event.

For example, if the input button 22 is pressed once between the connection events CE1 and CE2, the BLE terminal 20 transmits operation result information indicating that the button has been pressed only once, to the mobile terminal 10 in the connection event CE2. In addition, if the input button 22 is pressed twice between the connection events CE2 and CE3, the BLE terminal 20 transmits operation result information indicating that the button has been pressed twice, to the mobile terminal 10 in the connection event CE3. Similarly, if the input button 22 is continuously pressed between the connection events CE3 and CE4, the BLE terminal 20 transmits operation result information indicating that the button has been continuously pressed, to the mobile terminal 10 in the connection event CE4.

Figure 13A:
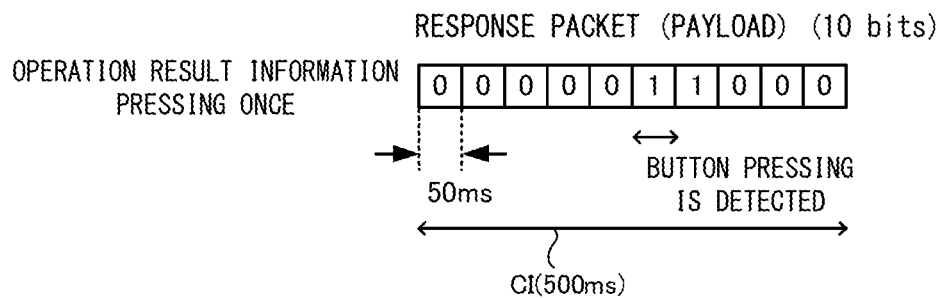
FIG. 13A is an example non-limiting diagram showing operation result information generated when the input button 22 is pressed only once in a connection interval.
Figure 13B:
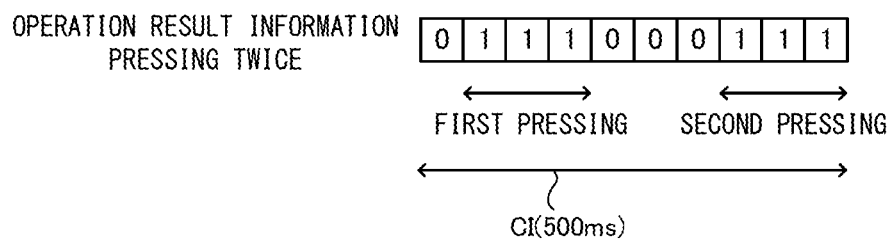
FIG. 13B is an example non-limiting diagram showing operation result information generated when the input button 22 is pressed twice in a connection interval.
Figure 13C:
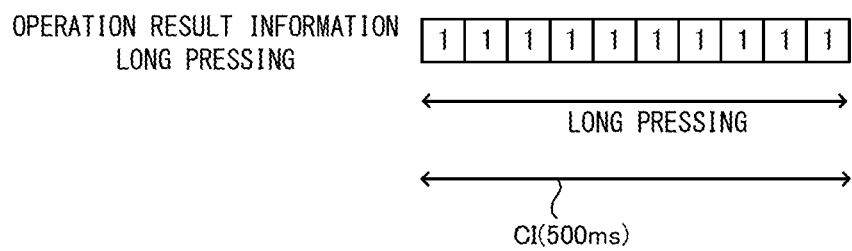
FIG. 13C is an example non-limiting diagram showing operation result information generated when the input button 22 is pressed long in a connection interval.

FIGS. 13A to 13C are diagrams each showing an example of operation result information. FIG. 13A is a diagram showing operation result information generated when the input button 22 is pressed only once in a connection interval. FIG. 13B is a diagram showing operation result information generated when the input button 22 is pressed twice in a connection interval. FIG. 13C is a diagram showing operation result information generated when the input button 22 is pressed long in a connection interval.

As shown in FIG. 13A, the operation result information is represented, for example, by 10 bits. Each bit of the operation result information indicates an operation state for every 50 milliseconds. Each bit of "1" indicates that an operation on the input button 22 has been detected, and each bit of "0" indicates that an operation on the input button 22 has not been detected. In FIG. 13A, the first to fifth bits are "0", and the sixth and seventh bits are "1". That is, FIG. 13A shows, as an example, the case where the input button 22 is pressed for a moment at a time point at which 250 milliseconds (=50 milliseconds×5 bits) elapses from a time point at which an operation on the input button 22 is received.

In FIG. 13B, the second to fourth bits are "1", and the eighth to tenth bits are "1". That is, FIG. 13B shows, as an example, the case where the input button 22 is pressed for a moment at a time point at which 50 milliseconds elapses from a time point at which an input to the input button 22 is received, then the state returns from the state where the input button 22 is pressed to the original state, and the input button 22 is pressed again.

Meanwhile, in FIG. 13C, all the bits are "1". This indicates that the input button 22 has been continuously pressed in the connection interval.

As is obvious from FIGS. 13A to 13C, the mobile terminal 10 can recognize whether the input button 22 of the BLE terminal 20 has been pressed in a CI, the number of times the input button 22 has been pressed, and a time for which the input button 22 has been pressed, by receiving the operation result information from the BLE terminal 20. The mobile terminal 10 performs a predetermined process (e.g., a process of performing game determination and displaying a result of the game determination) on the basis of the operation result information.

Next, an example of use of the mobile terminal 10 and the BLE terminal 20 will be described. FIG. 14 is a diagram showing an example of a game for which the mobile terminal 10 and the BLE terminal 20 are used. In the example shown in FIG. 14, when a certain event occurs in the mobile terminal 10, the above representation data D is transmitted from the mobile terminal 10 to the BLE terminal 20, and the game is started. The game shown in FIG. 14 is a game in which, after a representation is performed in the BLE terminal 20, the user is caused to operate the input button 22 in a specific period.

As shown in FIG. 14, a predetermined event occurs when a condition is satisfied. For example, the condition for occurrence of the predetermined event may be that, for example, a predetermined operation (an operation for instructing start of the game) is performed in the mobile terminal 10 by the user, a predetermined time comes, or the mobile terminal 10 moves to a predetermined position (a position detected by a GPS becomes a predetermined position). In addition, the condition for occurrence of the predetermined event may be that a game currently executed in the mobile terminal 10 satisfies a specific condition (e.g., a player character reaches a predetermined position in a game space, a certain scene in the game is cleared, an item is obtained, etc.).

In the connection event CE1 after the predetermined event occurs, the representation data D is transmitted from the mobile terminal 10 to the BLE terminal 20. The BLE terminal 20 performs the first representation by reproducing the first representation information DB included in the representation data D, in accordance with reception of the representation data D. For example, the first representation is performed over a plurality of connection events. Also while the first representation is performed, an operation on the input button 22 is received. For example, if the input button 22 is operated while the first representation is performed, operation result information E indicating a result of the operation is transmitted from the BLE terminal 20 to the mobile terminal 10 in a connection event. The vibrator 24 vibrates in the first representation. Thus, even if an operation on the input button 22 is performed while the first representation is performed, the second representation is not performed (the vibrator 24 does not vibrate) in accordance with this operation. When a predetermined time elapses after the BLE terminal 20 receives the representation data D, the first representation ends. In the game shown in FIG. 14, success or failure in the game is determined on the basis of whether the input button 22 has been operated within a specific period from the end of the first representation. Specifically, it is determined as "success" if the input button 22 has been operated within the specific period from the end of the first representation, and it is determined as "failure" if the input button 22 has not been operated within the specific period. If the input button 22 has been operated, the second representation (the representation based on the "vibration" information of the second representation information) is performed as shown in FIG. 14. After the first representation ends, the second representation is performed even if the input button 22 has been operated within the specific period or even if the input button 22 has been operated in a period other than the specific period. That is, since the success/failure determination for the game (determination as to whether the input button 22 has been operated within the specific period) is performed in the mobile terminal 10, if the input button 22 has been operated, the BLE terminal 20 executes the second representation, regardless of whether the input button 22 has been operated within the specific period.

Specifically, the BLE terminal 20 accumulates an operation on the input button 22 in the CI as the operation result information E as described above, and transmits the operation result information E to the mobile terminal 10 in the connection event. The mobile terminal 10 determines whether the input button 22 has been operated within the specific period from the end of the first representation, on the basis of a plurality of pieces of the operation result information E received in the connection events CE2 to CE5. The mobile terminal 10 determines "success" when determining that the input button 22 has been operated within the specific period, and determines "failure" when determining that the input button 22 has not been operated within the specific period. When it is determined as "success", the mobile terminal 10 may output an image indicating "success", on the display device 14 of the mobile terminal 10. In addition, when it is determined as "success", the mobile terminal 10 may transmit the representation data D to the BLE terminal 20 in the next connection event CE6, and the BLE terminal 20 may perform a representation indicating "success", on the basis of the representation data D.

When the result of the game shown in FIG. 14 is "success", a score may be increased. In a game (referred to as "main game") performed in the mobile terminal 10, a bonus that is advantageous for the user may be given in accordance with the score. For example, while the main game is executed in the mobile terminal 10, the above predetermined event occurs, and the game (referred to "sub-game") shown in FIG. 14 is started. A score is increased in accordance with a result of the sub-game, and a bonus that is advantageous for the user is given in the main game in accordance with the score. For example, an "item" that can be used in the main game may be given, the power of a player character in the main game may be increased, the level of the player character may be increased, or the main game may be able to be advanced to the next stage or scene.

Figure 15:
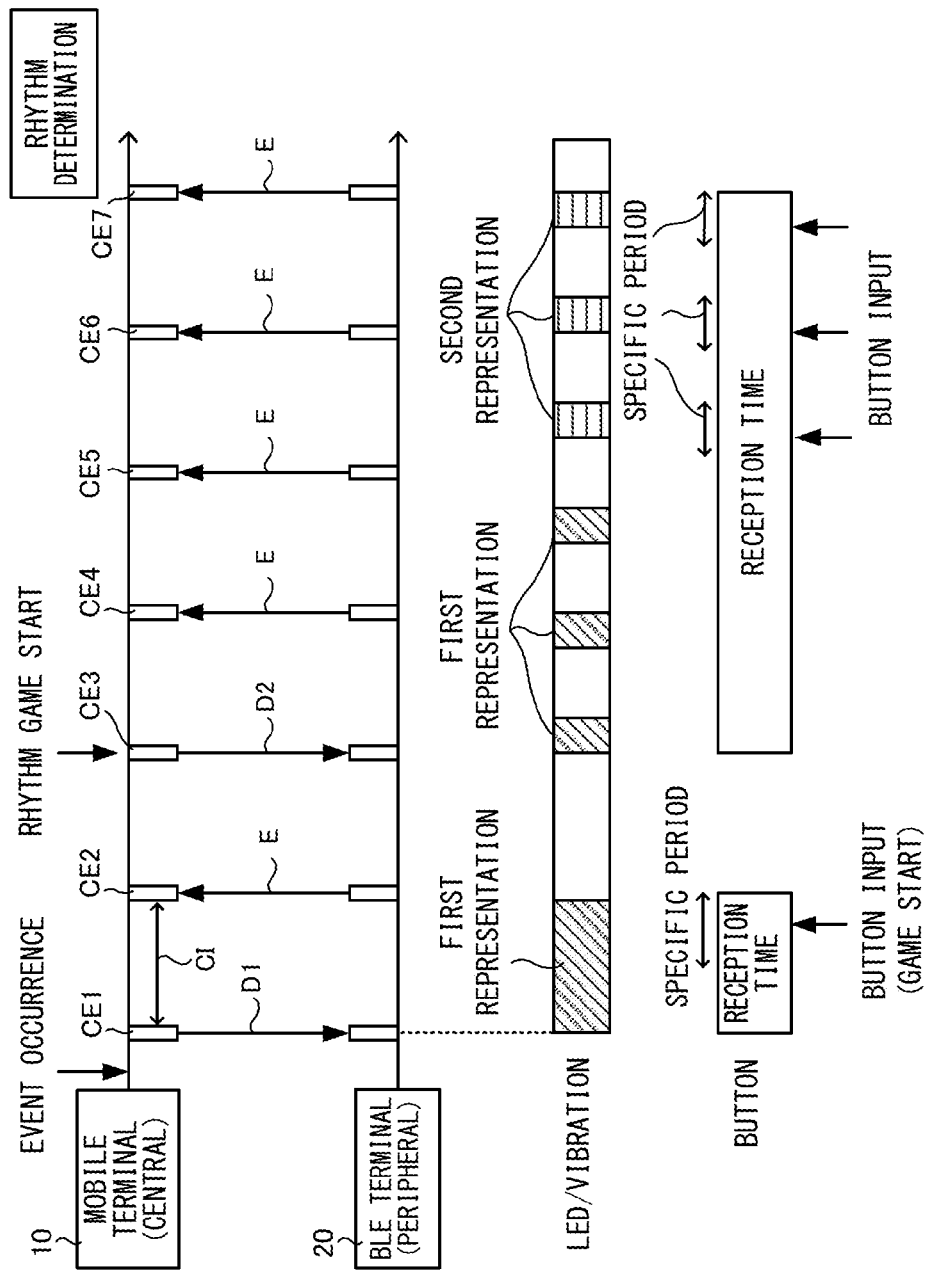
FIG. 15 is an example non-limiting diagram showing another example of the game for which the mobile terminal 10 and the BLE terminal 20 are used.

FIG. 15 is a diagram showing an example of another game for which the mobile terminal 10 and the BLE terminal 20 are used. The game shown in FIG. 15 is a rhythm game in which the user is caused to operate the input button 22 to a predetermined rhythm.

As shown in FIG. 15, in the connection event CE1 after a predetermined event occurs, the representation data D1 is transmitted from the mobile terminal 10 to the BLE terminal 20. On the basis of the representation data D1, the BLE terminal 20 performs the first representation. If the input button 22 is operated within a specific period during the first representation (or after the first representation), the rhythm game is started. Specifically, in the connection event CE2, the operation result information E is transmitted from the BLE terminal 20 to the mobile terminal 10. On the basis of the received operation result information E, the mobile terminal 10 determines whether the input button 22 has been operated within the specific period.

When the mobile terminal 10 determines that the input button 22 has been operated within the specific period, the mobile terminal 10 transmits the representation data D2 including a content of the rhythm game, to the BLE terminal 20 in the next connection event CE3. The priority of the representation data D2 may be higher than the priority of the representation data DB2. The BLE terminal 20 executes the first representation in accordance with reception of the representation data D2. When the representation based on the representation data D1 is being executed, the BLE terminal 20 ends the representation based on the representation data D1 and starts the first representation based on the representation data D2. Here, as the first representation, light emission of the LED 23 and vibration are repeated a plurality of times. For example, light emission and vibration may be performed at fixed time intervals. After the first representation is performed, the user operates the input button 22 to the same rhythm as that of the first representation. When the input button 22 is operated, the second representation (the representation indicated by the "vibration" information of the second representation information) is performed. The operation result information E about the operation on the input button 22 is transmitted from the BLE terminal 20 to the mobile terminal 10 in each connection event.

Then, after the rhythm game ends, the mobile terminal 10 performs a rhythm determination. Specifically, on the basis of a plurality of pieces of the operation result information E received in the connection events CE4 to CE7, the mobile terminal 10 determines whether the input button 22 has been operated within a specific period (three specific periods in FIG. 15) after the first representation ends. Each specific period is set so as to match the rhythm of the first representation. The mobile terminal 10 may calculate a score in accordance with a result of the rhythm determination and may display the score on the display device 14. In addition, in the case where a display device is provided to the BLE terminal 20, the mobile terminal 10 may transmit information about the score to the BLE terminal 20 in the next connection event, and the score may be displayed on the display device of the BLE terminal 20.

Figure 16:
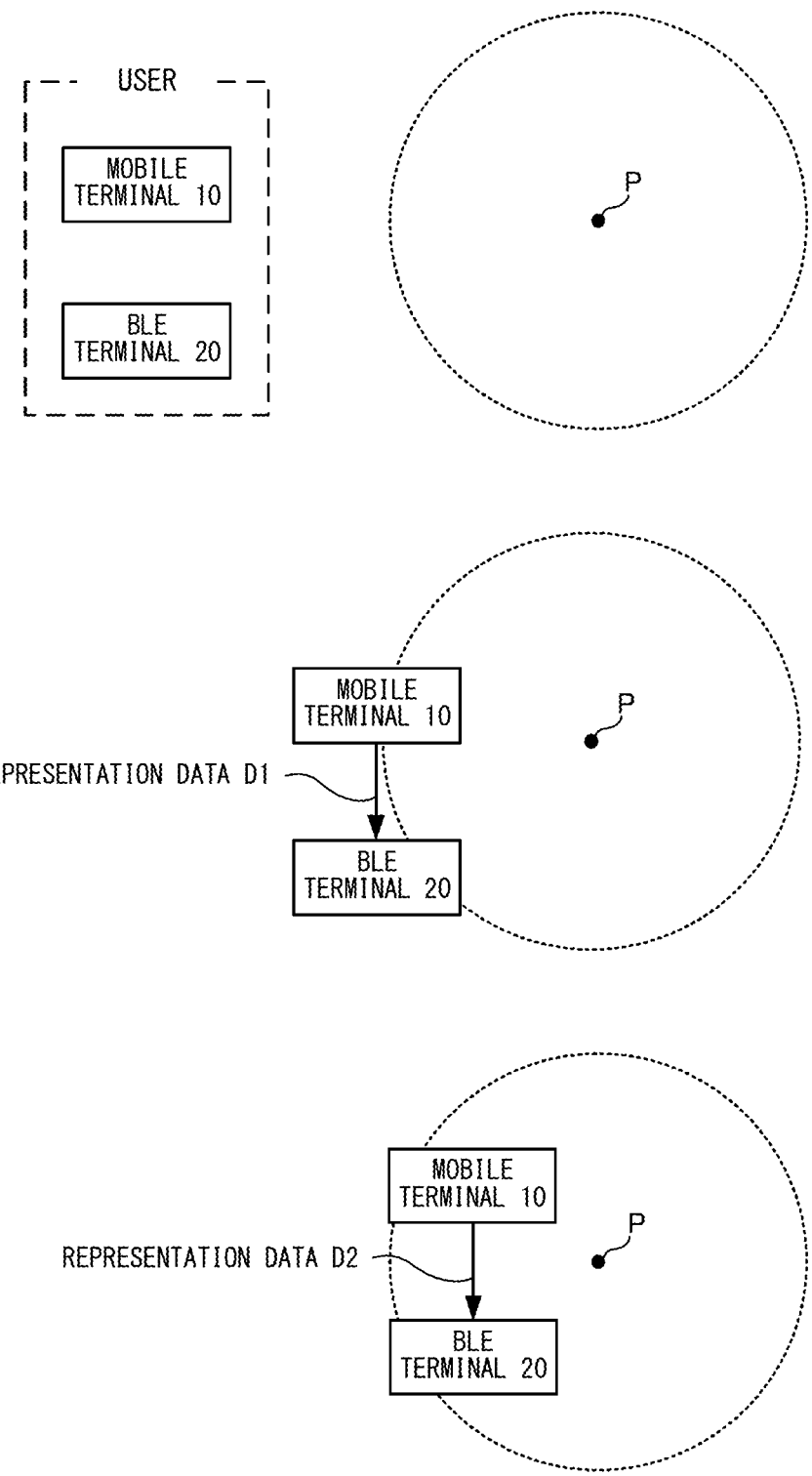
FIG. 16 is an example non-limiting diagram showing another application example in which the mobile terminal 10 and the BLE terminal 20 are used.

FIG. 16 is a diagram showing another application example in which the mobile terminal 10 and the BLE terminal 20 are used. In the application example shown in FIG. 16, when the user moves while carrying the mobile terminal 10 and the BLE terminal 20 and comes close to a predetermined position, the representation data D is transmitted from the mobile terminal 10 to the BLE terminal 20.

Specifically, as shown in FIG. 16, the user carries the mobile terminal 10 and the BLE terminal 20 and moves, for example, in an urban area. When the user comes close to a specific position P, the representation data D1 is transmitted from the mobile terminal 10 to the BLE terminal 20. In accordance with reception of the representation data D1, the BLE terminal 20 causes the LED 23 to blink, for example. As the mobile terminal 10 comes closer to the specific position P, an interval at which the LED 23 blinks may be shortened. When the user further moves and the mobile terminal 10 reaches the specific position P, the representation data D2 is transmitted from the mobile terminal 10 to the BLE terminal 20. The representation data D2 has higher priority than the representation data D1. In accordance with reception of the representation data D2, the BLE terminal 20 lights up the LED 23, for example. Then, if the input button 22 is operated, the BLE terminal 20 vibrates.

Figure 17:
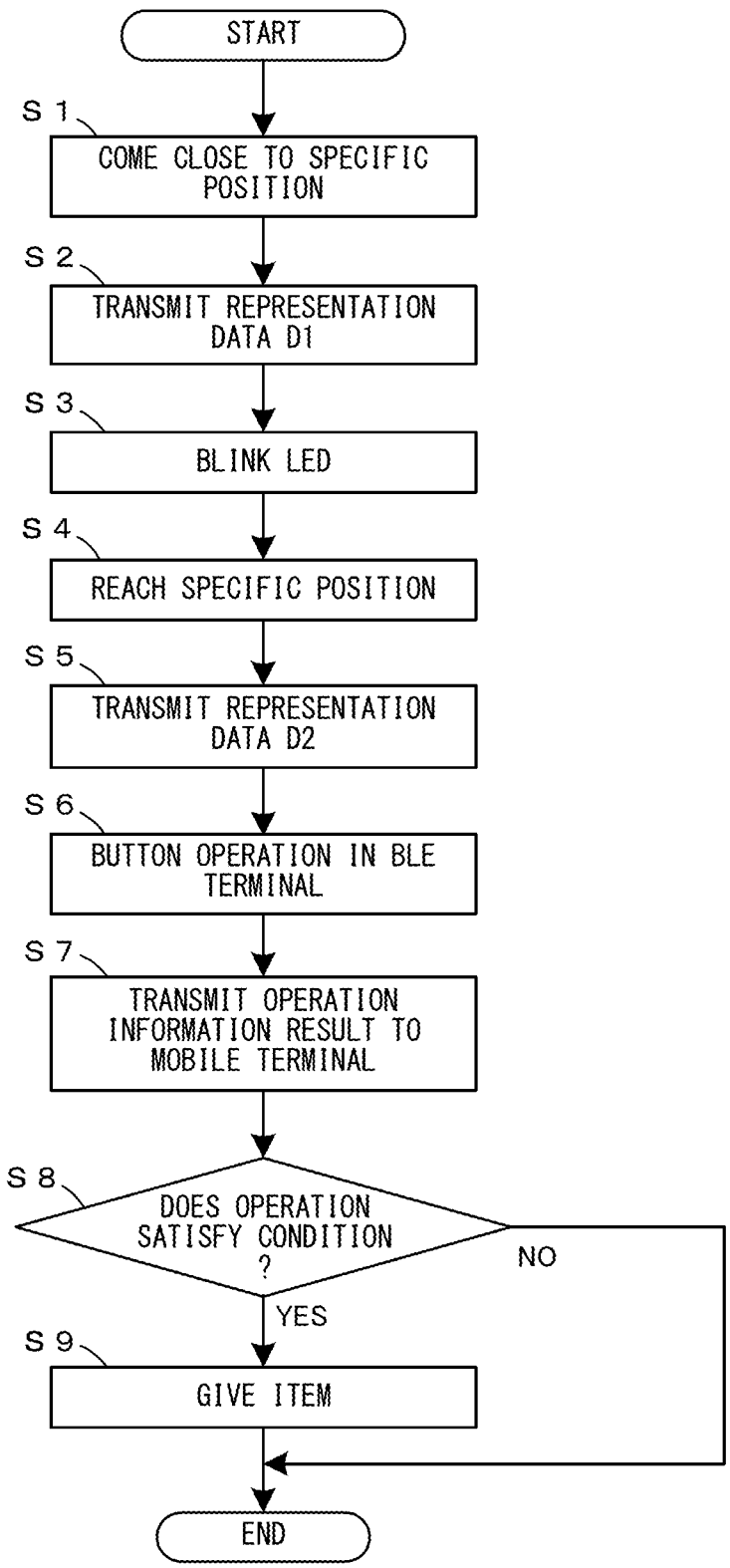
FIG. 17 is an example non-limiting diagram showing flow of a process in the application example shown in FIG. 16.

FIG. 17 is a diagram showing flow of a process in the application example shown in FIG. 16. As shown in FIG. 17, the user moves while carrying the mobile terminal 10 and the BLE terminal 20 and comes close to a specific position (step Si). Specifically, the mobile terminal 10 has a GPS function and can detect the position of the mobile terminal 10. When the position of the mobile terminal 10 is within a predetermined range including the predetermined specific position, the mobile terminal 10 determines that the mobile terminal 10 is close to the specific position. For example, the mobile terminal 10 includes a position detection section configured to detect position information regarding the position of the mobile terminal 10. In the present embodiment, the position detection section detects position information by using a GNSS (Global Navigation Satellite System). The position detection section is a so-called GNSS sensor, and is, for example, a GPS (Global Positioning System) sensor (GPS module) or the like. Here, the "position information regarding the position" may be information indicating a position, or may be information by which a position is identifiable. The position information may be, for example, information indicating a latitude and a longitude, or information by which a position is identifiable and which is transmitted from a satellite of the GPS (e.g., time information about a time of transmission of radio waves, orbit information of the satellite). A position detection method by the position detection section is any method, and, for example, the position detection section may detect a position on the basis of radio waves from a wireless communication facility. That is, the position detection section may detect a position on the basis of radio waves from a mobile phone base station or radio waves from a wireless access point. In addition, the position detection section may detect a position by acquiring information representing the position of the mobile terminal 10, from another device different from the mobile terminal 10. For example, the BLE terminal 20 may include the above position detection section, and the mobile terminal 10 may acquire the information representing the position, from the BLE terminal 20.

Next, the mobile terminal 10 transmits the representation data D1 to the BLE terminal 20 (step S2), and the BLE terminal 20 causes the LED 23 to blink in accordance with the representation data D1 (step S3). When the user further moves and the mobile terminal 10 reaches the specific position (step S4), the representation data D2 is transmitted from the mobile terminal 10 to the BLE terminal 20 (step S5). On the basis of the representation data D2, the BLE terminal 20 light up the LED 23.

Next, the input button 22 is operated in the BLE terminal 20 (step S6). On the basis of this operation, the BLE terminal 20 transmits operation result information to the mobile terminal 10 (step S7).

Next, on the basis of the received operation result information, the mobile terminal 10 determines whether the operation on the input button 22 satisfies a predetermined condition (step S8). When the mobile terminal 10 determines that the operation on the input button 22 satisfies the predetermined condition, an item that is used in the game is given, for example (step S9). For example, when the input button 22 has been pressed within a predetermined time or when the input button 22 has been pressed in a predetermined pattern, the mobile terminal 10 may determine that the predetermined condition is satisfied.

As described above, various games are performed by using the mobile terminal 10 and the BLE terminal 20. The mobile terminal 10 and the BLE terminal 20 are connected to each other, and the representation data D is transmitted from the mobile terminal 10 to the BLE terminal 20, and a representation is performed in the BLE terminal 20 on the basis of the representation data D. In addition, the operation result information indicating the result of the operation performed in the BLE terminal 20 is transmitted to the mobile terminal 10. The mobile terminal 10 performs a determination as to the game on the basis of the operation result information. Then, the mobile terminal 10 displays the result of the determination on the display device 14 or transmits the result of the determination to the BLE terminal 20.

As described above, in the present embodiment, an interactive game for which the mobile terminal 10 and the BLE terminal 20 are used is performed. The application to be executed is not limited to the game, and another application may be executed. For example, an application for exchanging messages between the mobile terminal 10 and the BLE terminal 20 may be executed.

(Details of Processes)

Next, the details of processes performed in the mobile terminal 10 and the BLE terminal 20 will be described. First, the process performed in the mobile terminal 10 will be described with reference to FIGS. 18 to 21.

(Main Process Performed by CPU 11 of Mobile Terminal 10)

Figure 18:
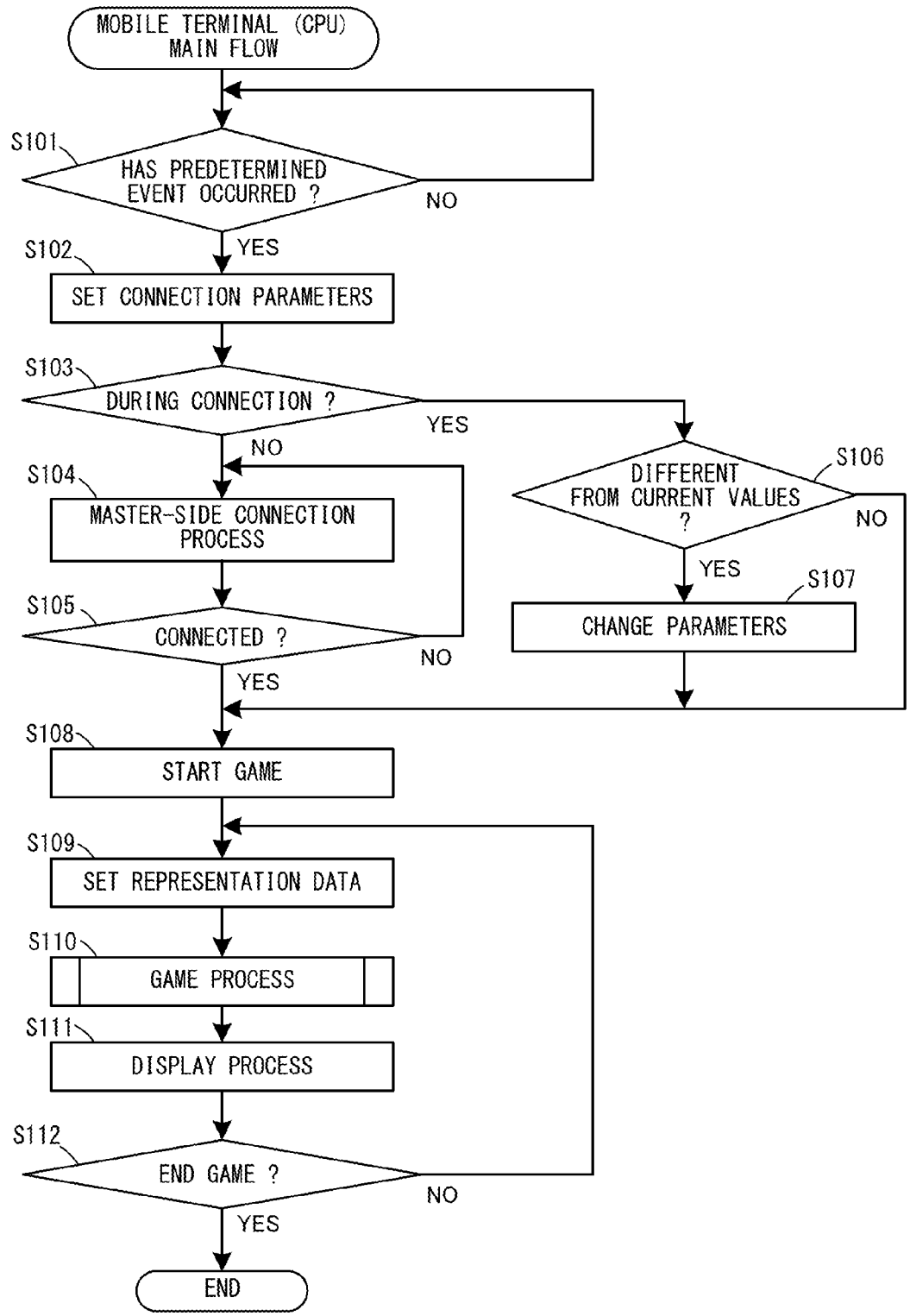
FIG. 18 is an example non-limiting flowchart showing the details of a main process performed by a CPU 11 of the mobile terminal 10.

FIG. 18 is a flowchart showing the details of a main process performed by the CPU 11 of the mobile terminal 10. The CPU 11 of the mobile terminal 10 performs the process shown in FIG. 18 by executing a predetermined application program stored in the storage device 13.

First, the CPU 11 determines whether a predetermined event has occurred (step S101). For example, when an instruction to start the game has been made by the user (e.g., when an instruction to start the game has been made on a menu screen displayed on the display device 14), the CPU 11 determines that the predetermined event has occurred. In addition, when a predetermined condition is satisfied in the currently executed application (e.g., the predetermined condition is satisfied in the currently executed main game) or when the mobile terminal 10 has moved to a specific position, the CPU 11 determines that the predetermined event has occurred.

When the CPU 11 determines NO in step S101, the CPU 11 executes the process in step S101 again.

When the CPU 11 determines YES in step S101, the CPU 11 sets a connection parameter (step S102). Specifically, the CPU 11 sets various parameters for a connection with the BLE terminal 20, in accordance with the type of a game (an example of an application) to be started in step S108 described later.

More specifically, the CPU 11 sets a connection interval (CI), a slave latency (SL), and a connection supervision timeout as the connection parameters. The CI, the SL, and the connection supervision timeout are different depending on the type of the application to be executed. For example, in the case where the type of the game to be started in step S108 is a type of a game that requires a relatively low latency (a game that requires a relatively quick response), the CPU 11 sets a relatively short time (e.g., 10 to 100 milliseconds) as the CI, and sets a relatively small value as the SL. In addition, in the case where the type of the game to be started in step S108 is a type of a game that requires relatively quick detection of termination, the CPU 11 sets a relatively short time (e.g., 1 second to several seconds) as the connection supervision timeout. As an example of the game that requires a relatively low latency, an action game (e.g., a game in which a character or the like moves in accordance with an operation by the user and the movement is reflected in a display, such as a racing game and a fighting game) is conceivable. That is, when a game that requires a quick response to an operation by the user is performed by using the BLE terminal 20 and the mobile terminal 10, communication between the mobile terminal 10 and the BLE terminal 20 needs to be frequently performed in a short time. Thus, when such a game is started, the CPU 11 shortens the CI and decreases the SL such that delay of communication between the mobile terminal 10 and the BLE terminal 20 is reduced. In addition, when a game (as an example, a quiz game, a role-playing game, etc.) in which there is a low possibility that a problem occurs even when delay of communication occurs is performed, the CPU 11 sets a relatively long time (e.g., 500 milliseconds or 1000 milliseconds) as the CI, and sets a relatively large value as the SL. In addition, when a game (as an example, a quiz game, a role-playing game, etc.) in which there is a low possibility that a problem occurs even when delay of communication occurs is performed, the CPU 11 sets a relatively long time (e.g., in the range of several seconds to 32 seconds) as the connection supervision timeout.

As described above, at least any one of the CI, the SL, and the connection supervision timeout may be set on the basis of the type of the application to be executed. In another embodiment, at least any one of the CI, the SL, and the connection supervision timeout may be set by the user.

The CPU 11 may set at least any one of the CI, the SL, and the connection supervision timeout in accordance with a status of execution of the game (an example of the application) performed in the mobile terminal 10 and the BLE terminal 20. Here, the "status of execution of the game" may be, for example, a scene, a stage, an area, a mission, or the like in the game. That is, when the game is divided into a plurality of portions (scenes, stages, areas, missions, etc.), the CI, the SL, and the connection supervision timeout may be set in accordance with the portion of the game to be executed. Programs for executing the respective portions of the game may be prepared, and the respective portions of the game may be executed by the mobile terminal 10 and/or the BLE terminal 20 executing the respective programs. Alternatively, data for executing the respective portions of the game may be prepared, and the respective portions of the game may be executed by processing the respective data with a shared program. That is, at least any one of the CI, the SL, and the connection supervision timeout may be set in accordance with the type of the program corresponding to the portion of the game to be executed by using the mobile terminal 10 and/or the BLE terminal 20, or the type of the data corresponding to the portion of the game to be executed. For example, when the game has been already executed, if the stage in the game shifts from a first stage to a second stage, at least any one of the CI, the SL, and the connection supervision timeout may be set newly.

Moreover, the "status of execution of the game" may be, for example, a state where the game is being executed, or a pause state. For example, when a shift is made from the state where the game is being executed to the pause state, at least any one of the CI, the SL, and the connection supervision timeout may be set newly. In the pause state, progress of the game temporarily stops, and, for example, a shift is made from a game screen to a menu screen (a screen for activating an application or changing settings of the device). In the pause state, the progress of the game is stored in a memory. When the game is restarted, the game is performed from the state that is a state immediately before shifting to the pause state. For example, when the game is being executed in the mobile terminal 10 and the BLE terminal 20, if the user activates another program, the currently executed game enters a pause state. In addition, for example, when the game is being executed in the mobile terminal 10 and the BLE terminal 20, if a button for temporary stop is operated by the user, the currently executed game enters a pause state. Moreover, for example, when the game proceeds to a scene in which the processing load is relatively low (e.g., a scene in which an operation from the user is not received), the game may enter a pause state. For example, in the pause state, the CI and/or the SL may be set so as to be greater (or smaller) than that during execution of the game. As described above, when a shift is made from the game screen to the menu screen or an instruction for temporary stop is made by the user during execution of the game, the game may shift to a pause state, and at least any one of the CI, the SL, and the connection supervision timeout may be changed in the pause state.

The CPU 11 may set at least any one of the CI, the SL, and the connection supervision timeout, for example, in accordance with the type of a device (slave) to be connected. In the case where the BLE terminals 20 include a device that does not include a display device (e.g., a touch display) and a device that includes a display device, the values of the CI, the SL, and the connection supervision timeout may be set on the basis of whether a display device is included. Furthermore, for example, in the case where the BLE terminals 20 include a device that includes a specific input device and a device that does not include a specific input device, the CI, the SL, and the connection supervision timeout may be set on the basis of whether a specific input device is included. That is, the values of the CI, the SL, and the connection supervision timeout may be set in accordance with the function of a device to be connected as a slave for the mobile terminal 10. Moreover, there are a plurality of types of mobile terminals as masters, and at least any one of the CI, the SL, and the connection supervision timeout may be set in accordance with the type of a device as a master (model, the function of the device, etc.).

As a method for identifying the type of the device to be connected, for example, the following methods are conceivable. The first method is a method in which, for example, a number indicating the type of the device is allocated to a device address for identifying the device. In executing advertising, the BLE terminal 20 transmits an advertising packet including the device address. The mobile terminal 10 receives the advertising packet including the device address, and the CPU 11 of the mobile terminal 10 can identify the type of the BLE terminal 20 on the basis of the above number included in the device address.

The second method for identifying the type of the device to be connected is a method in which, after a connection between the mobile terminal 10 and the BLE terminal 20 is established, information indicating the type of the device is transmitted from the BLE terminal 20 to the mobile terminal 10. Specifically, after the connection between the mobile terminal 10 and the BLE terminal 20 is established, a data packet is transmitted from the mobile terminal 10 to the BLE terminal 20 in a connection event, and a response packet is transmitted from the BLE terminal 20 to the mobile terminal 10 in response to the packet. For example, the BLE terminal 20 includes, in the payload of the response packet, information indicating the type of the BLE terminal 20, and transmits the response packet to the mobile terminal 10.

The third method for identifying the type of the device to be connected is a method in which a service or a characteristic is classified for each function of the BLE terminal 20 (the LED, the loudspeaker, the vibrator, the sensor, the input device, the display device, etc.). In the BLE standard, several standard services for connecting together devices manufactured by different manufacturers are defined, and the user is allowed to uniquely define a service. For example, a characteristic indicating presence/absence or type of the function of the BLE terminal 20 is added to the service defined uniquely by the user. The mobile terminal 10 can identify the type of the BLE terminal 20 by referring to the content of the characteristic.

The CPU 11 may set at least any one of the SL and the connection supervision timeout on the basis of the number of devices (slaves) to be connected. For example, the case is assumed in which each of a plurality of users has the BLE terminal 20, a plurality of the BLE terminals 20 are connected to the mobile terminal 10, and a game is played by the plurality of users. In this case, the respective devices are operated by different users, and the game is played by these users. In such a case where the game is played by a plurality of persons, the CI, the SL, and the connection supervision timeout may be set in accordance with the number of the persons who play the game (the number of the BLE terminals 20 to be connected to the mobile terminal 10, the number of devices in a system including the mobile terminal 10).

The CPU 11 sets a mode in accordance with the type of a device (slave) to be connected, and operates the mobile terminal 10 in the set mode. The mobile terminal 10 has a mode corresponding to the type of the device to be connected. Since the mode of the mobile terminal 10 is set in accordance with the type of the device to be connected, the mobile terminal 10 can perform communication with the device connected thereto, and also can perform a game process corresponding to the device connected thereto. For example, when the BLE terminal 20 shown in FIG. 3 is connected thereto, the mobile terminal 10 receives, from the BLE terminal 20, information for identifying the type of the BLE terminal 20, and sets a mode based on the information. Accordingly, the mobile terminal 10 can perform a game for which hardware of the BLE terminal 20 (an output device such as the LED 23 and the vibrator 24, and an input device such as the input button 22) is used, and a game for which the mobile terminal 10 and the BLE terminal 20 are used can be executed.

The CPU 11 sets a mode in accordance with the number of devices (slaves) to be connected. The mobile terminal 10 has a mode corresponding to the number of the devices to be connected (the number of playing persons, etc.), and executes a game corresponding to the mode. For example, the mobile terminal 10 executes a game in a two-persons-play mode or executes a game in a three-persons-play mode. By performing communication with a plurality of devices connected thereto, the mobile terminal 10 can execute a game that is played by a plurality of persons. In addition, when a plurality of devices (slaves) are connected to the mobile terminal 10, a one-person-play game can also be executed. One player is allowed to perform an input by using the plurality of the devices connected to the mobile terminal 10 (an input using a button, a touch panel, an inertial sensor such as an acceleration sensor or an angular velocity sensor, etc.) or to perform output using the plurality of the devices (display of letters or an image using a display device, output of a sound using a loudspeaker, output by vibration using a vibrator, output of light by causing an LED to emit light, etc.). As described above, even when a game is played by one person, a mode is set in accordance with the number of devices to be connected.

The CPU 11 may set at least any one of the CI, the SL, and the connection supervision timeout in accordance with a status of communication with another device. For example, CIs, SLs, and connection supervision timeouts may be set which are different between when the mobile terminal 10 performs communication based on the BLE standard with a third device different from the BLE terminal 20 (the communication with the third device may be performed in a connection state or may be performed in a non-connected state) and when the mobile terminal 10 does not perform communication with the third device. That is, the mobile terminal 10 may set the CI, the SL, and the connection supervision timeout for a connection with the BLE terminal 20, in accordance with presence/absence of communication with the third device. Moreover, when the mobile terminal 10 performs communication with the third device, the CI, the SL, and the connection supervision timeout for a connection with the BLE terminal 20 may be set in accordance with the frequency of the communication and a state of radio waves from the third device.

The CPU 11 may set at least any one of the CI, the SL, and the connection supervision timeout for a connection with the BLE terminal 20, in accordance with a status of communication with the BLE terminal 20 (the frequency of the communication, an amount of data to be transmitted and received, a state of radio waves, etc.).

At least any one of the CI, the SL, and the connection supervision timeout may be set by the BLE terminal 20 (slave). Specifically, the BLE terminal 20 (slave) may set at least any one of the CI, the SL, and the connection supervision timeout on the basis of the type of the application to be executed as described above, the status of execution of the application, the type of the BLE terminal 20 (the function of the BLE terminal 20), the type of the mobile terminal 10 as a connection partner, the number of other devices to be connected to the mobile terminal 10, or the like. For example, the BLE terminal 20 may set an SL, and may notify the mobile terminal 10 of the set SL. In addition, the BLE terminal 20 may set an SL, and the set SL may not be transmitted to the mobile terminal 10. Moreover, the BLE terminal 20 may set a CI, or may set a connection supervision timeout. The BLE terminal 20 may notify the mobile terminal 10 of the CI or connection supervision timeout that is set by the BLE terminal 20. After the mobile terminal 10 receives such a notification, the mobile terminal 10 sets, for example, its own CI, SL, or connection supervision timeout in accordance with the CI, SL, or connection supervision timeout included in the notification from the BLE terminal 20. In this case, when a CI, SL, or connection supervision timeout that is different from the CI, SL, or connection supervision timeout notified from the BLE terminal 20 is to be set in the mobile terminal 10, the setting in the master, that is, the mobile terminal 10, may be prioritized. When the setting in the master is prioritized, for example, the mobile terminal 10, which is the master, sends back a notification of the CI, SL, or connection supervision timeout that the mobile terminal 10 desires to set (and which is different from the CI, SL, or connection supervision timeout notified from the BLE terminal 20), to the BLE terminal 20, and the CI, SL, or connection supervision timeout that the mobile terminal 10 desires to set are forcedly set in the BLE terminal 20.

The phrase "set a CI, an SL, and a connection supervision timeout" includes setting a CI, an SL, and a connection supervision timeout in establishing a connection between the mobile terminal 10 and the BLE terminal 20 in a state where the mobile terminal 10 and the BLE terminal 20 are not connected to each other, and newly setting (changing) a CI, an SL, and a connection supervision timeout in a state where the mobile terminal 10 and the BLE terminal 20 are connected to each other.

After the process in step S102, the CPU 11 determines whether the mobile terminal 10 is currently in connection with the BLE terminal 20 (step S103). When the mobile terminal 10 is not currently in connection with the BLE terminal 20 (step S103: NO), the CPU 11 performs a master-side connection process (step S104). The process in step S104 is a process for establishing a connection between the mobile terminal 10 and the BLE terminal 20 with the mobile terminal 10 as a master. Specifically, the CPU 11 sends a command for establishing a connection with the BLE terminal 20, to the BLE communication module 16. The command of the CPU 11 includes the connection parameters (the CI, the SL, the connection supervision timeout) set in step S102. In accordance with the command of the CPU 11, the BLE communication module 16 attempts to connect to the BLE terminal 20 present around the mobile terminal 10. The details of the master-side connection process performed by the BLE communication module 16 will be described later with reference to FIG. 20.

Subsequent to step S104, the CPU 11 determines whether the mobile terminal 10 has become connected to the BLE terminal 20 (step S105). When the CPU 11 determines NO in step S105, the CPU 11 performs the process in step S104 again. When the CPU 11 determines YES in step S105, the CPU 11 executes a process in step S108.

On the other hand, when the CPU 11 determines that the mobile terminal 10 is currently in connection (step S103: YES), the CPU 11 determines whether the current connection parameters are different from the connection parameters that are set in step S102 (step S106). When the CPU 11 determines that the current connection parameters are different from the connection parameters that are set in step S102 (step S106: YES), the CPU 11 changes the current connection parameters (step S107). Specifically, the CPU 11 passes the connection parameters (the CI, the SL, the connection supervision timeout) set in step S102, to the BLE communication module 16. For example, when the BLE communication module 16 acquires new CI, SL, and connection supervision timeout from the CPU 11, the BLE communication module 16 transmits the new CI, SL, and connection supervision timeout to the BLE terminal 20 in step S144 described later. Accordingly, the CI, SL, and connection supervision timeout for a connection between the mobile terminal 10 and the BLE terminal 20 are changed. When the CI, SL, and connection supervision timeout that are set in step S102 are the same as the current values (step S106: NO), the CPU 11 does not change these values and subsequently executes the process in step S108.

For example, when execution of another application is started during execution of a certain application, the CPU 11 changes at least any one of the current CI, SL, and connection supervision timeout in accordance with the type of the other application in step S107. For example, when an action game is executed during execution of a quiz game, the CPU 11 shortens the CI.

For example, when an operation for returning to the menu screen is performed by the user during execution of a certain game, the CPU 11 stops the currently executed game and also displays the menu screen. In accordance with this, the CPU 11 may lengthen the CI, for example. That is, when the currently executed application enters a pause state, the CPU 11 changes at least any one of the CI, the SL, and the connection supervision timeout. When the game is restarted from the pause state, the changed at least any one of the CI, the SL, and the connection supervision timeout is returned to a value that is set before the change.

For example, when the game is divided into a plurality of portions, at least any one of the CI, the SL, and the connection supervision timeout may be changed in accordance with the portion of the game to be executed. For example, when one game is divided into a plurality of stages, at least any one of the CI, the SL, and the connection supervision timeout may be changed in accordance with a shift being made from a certain stage to another stage. In addition, when a shift is made from a certain area to another area in a game, at least any one of the CI, the SL, and the connection supervision timeout may be changed. When a plurality of missions (a small game for achieving a specific purpose) are carried out in one game, at least any one of the CI, the SL, and the connection supervision timeout may be changed in accordance with the mission game being performed.

When the CPU 11 determines YES in step S105, determines NO in step S106, or executes the process in step S107, the CPU 11 starts a game (e.g., the games shown in FIGS. 14 to 16) (step S108).

After the game is started, the CPU 11 sets the representation data D shown in FIG. 10 (step S109). The representation data D set here is transmitted to the BLE terminal 20 in a connection event in the connection between the mobile terminal 10 and the BLE terminal 20. Specifically, by the BLE communication module 16 executing step S144 in FIG. 21, the representation data D is transmitted from the mobile terminal 10 to the BLE terminal 20. When the representation data D to be transmitted to the BLE terminal 20 is present in step S109, the CPU 11 sets the representation data D; and when the representation data D to be transmitted to the BLE terminal 20 is not present in step S109, the CPU 11 does not perform anything and executes the next step S110.

After the CPU 11 executes the process in step S109, the CPU 11 executes a game process (step S110). In the game process in step S110, a process based on the operation result information about the input button 22 received from the BLE terminal 20 is performed. For example, in the game process in step S110, an image based on the operation result information is generated, and a content of a representation that the BLE terminal 20 is to be caused to perform is determined on the basis of the operation result information. Alternatively, in the game process in step S110, an image may be generated in accordance with an elapsed time from the start of the game in step S108. The details of the process in step S110 will be described later with reference to FIG. 19.

Subsequent to step S110, the CPU 11 performs a display process (step S111). Specifically, the CPU 11 displays an image corresponding to a result of the game process in step 5110, on the display device 14. Next, the CPU 11 determines whether to end the game (step S112). When the CPU 11 determines to end the game (step S112: YES), the CPU 11 ends the process shown in FIG. 18. When the CPU 11 does not determine to end the game (step S112: NO), the CPU 11 executes the process in step S109 again. By the processes in steps S109 to S112 being performed at a predetermined time interval (e.g., 1/60 seconds), the representation is performed in the BLE terminal 20, and also, for example, an image corresponding to the operation on the input button 22 of the BLE terminal 20 is displayed on the display device 14 of the mobile terminal 10.

The connection interval (CI) in the connection between the mobile terminal 10 and the BLE terminal 20 is set so as to be longer than an interval (1/60 seconds described above) at which display of the display device 14 of the mobile terminal 10 is updated. Thus, for example, even when an operation on the input button 22 of the BLE terminal 20 is performed, the button operation is not immediately reflected in the display of the display device 14 of the mobile terminal 10, and display corresponding to the button operation is performed after a slight delay. When the mobile terminal 10 further causes the BLE terminal 20 to perform a representation in accordance with the button operation, after the button operation is performed in the BLE terminal 20a, delay occurs before the representation is further performed. However, by the CI being determined, for example, in accordance with the type of the game application in step S102 described above, the delay can be controlled so as to be acceptable to the user.

(Game Process Performed by CPU 11 of Mobile Terminal 10)

Figure 19:
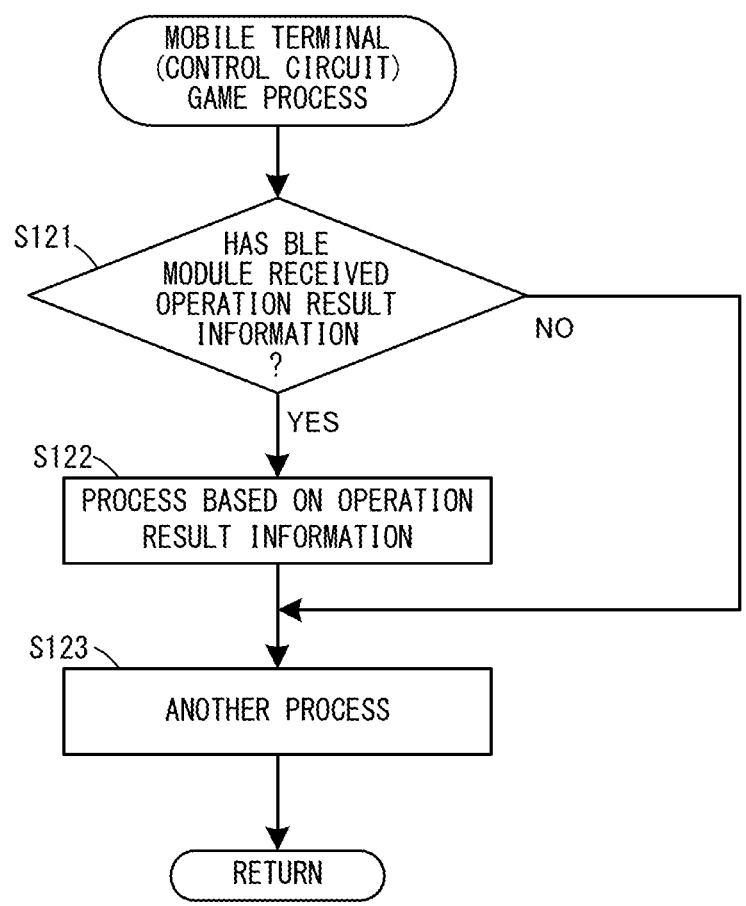
FIG. 19 is a flowchart showing the details of a game process in step S110 in FIG. 18.

FIG. 19 is a flowchart showing the details of the game process in step S110 in FIG. 18.

First, the CPU 11 determines whether the BLE communication module 16 has received operation result information (step S121). While the CPU 11 is performing the game process at a predetermined time interval (e.g., 1/60 seconds), the BLE communication module 16 performs communication with the BLE terminal 20 at the connection interval CI (e.g., 500 milliseconds). Data received through the communication with the BLE terminal 20 is passed from the BLE communication module 16 to the CPU 11. In step S121, the CPU 11 determines whether the BLE communication module 16 has received operation result information through the communication with the BLE terminal 20.

When the CPU 11 determines YES in step S121, the CPU 11 performs a process based on the received operation result information (step S122). Specifically, the CPU 11 determines whether an operation corresponding to the first representation information DB included in the representation data D that is set in step S109 has been performed on the input button 22 of the BLE terminal 20. As described above, the operation result information is represented, for example, by 10 bits, and each bit indicates, for example, the operation state of the input button 22 for every 50 milliseconds. Therefore, by determining whether each bit of the operation result information is "1", the CPU 11 can determine whether the input button 22 has been pressed in the connection interval, how many times the input button 22 has been pressed in the connection interval, and how long the input button 22 has been pressed in the connection interval. In addition, when operation result information is received in a plurality of connection events, the CPU 11 can determine what operation has been performed on the input button 22 in a period over the plurality of connection events, on the basis of a plurality of pieces of the operation result information.

For example, when the game shown in FIG. 14 is performed, the CPU 11 performs a success/failure determination for the game by determining whether the input button 22 has been operated within a specific period after the first representation, on the basis of the operation result information. Specifically, the CPU 11 determines whether the input button 22 has been operated within a preset specific period, on the basis of: an elapsed time from the time at which the representation data D that is set in step S109 is transmitted to the BLE terminal 20; and the operation result information received from the BLE terminal 20. When the input button 22 has been operated within the specific period, the CPU 11 determines "success". When the input button 22 has not been operated within the specific period, the CPU 11 determines "failure". Then, on the basis of the result of the success/failure determination, the CPU 11 increases (or decreases) a score, generates an image indicating a result of the game, outputs a sound, and vibrates the vibrator 17. In addition, for transmitting the result of the success/failure determination to the BLE terminal 20, the CPU 11 sets data indicating the result of the success/failure determination. The data indicating the result of the success/failure determination is transmitted to the BLE terminal 20 by the BLE communication module 16 in the next connection event. On the basis of the data indicating the result of the success/failure determination, a representation by light emission or vibration may be performed in the BLE terminal 20. In addition, in the case where a display device is provided to the BLE terminal 20, an image corresponding to the result of the success/failure determination may be displayed on the display device of the BLE terminal 20.

For example, when the game shown in FIG. 15 is performed, the CPU 11 determines whether an operation that matches a predetermined rhythm has been performed, on the basis of the operation result information and an elapsed time from the time at which the representation data D is transmitted to the BLE terminal 20. Then, on the basis of the result of the determination, the CPU 11 increase (or decrease) a score and generates an image indicating a result of the rhythm game. In addition, the CPU 11 may set data indicating the result of the rhythm game, in the mobile terminal 10. The set data is transmitted to the BLE terminal 20 by the BLE communication module 16 in the next connection event.

When the CPU 11 executes the process in step S122 or determines NO in step S121, the CPU 11 executes another process (step S123). For example, before operation result information is received, the CPU 11 may generate an image corresponding to the elapsed time from the time at which the representation data D is transmitted to the BLE terminal 20. The generated image is displayed on the display device 14 in step S111 described above. In addition, for example, the CPU 11 may detect an operation on the input device 15 of the mobile terminal 10 and may perform a process regarding the game (calculation of a score, generation of an image, and output of a sound) on the basis of this operation.

In step S123, the CPU 11 may change the parameters for a connection between the mobile terminal 10 and the BLE terminal 20 on the basis of the operation result information.

For example, the CPU 11 may calculate the frequency of operation on the input button 22 of the BLE terminal 20 on the basis of the operation result information. When the CPU 11 determines that the input button 22 of the BLE terminal 20 has been frequently operated, the CPU 11 may set the value of the CI to a value smaller than the current value in accordance with the frequency of operation. In addition, the CPU 11 may change the SL and the connection supervision timeout in accordance with the frequency of operation on the input button 22. Moreover, the CPU 11 may calculate the frequency of operation on the input device 15 of the mobile terminal 10, and at least any one of the CI, the SL, and the connection supervision timeout may be changed on the basis of the calculated frequency of operation. The changed CI, SL, or connection supervision timeout is notified the BLE terminal 20 of in the next connection event. After reception of the notification, the BLE terminal 20 sets its own CI, SL, or connection supervision timeout in accordance with the CI, SL, or connection supervision timeout notified from the mobile terminal 10, for example.

(Master-Side Connection Process Performed by BLE Communication Module 16 of Mobile Terminal 10)

Figure 20:
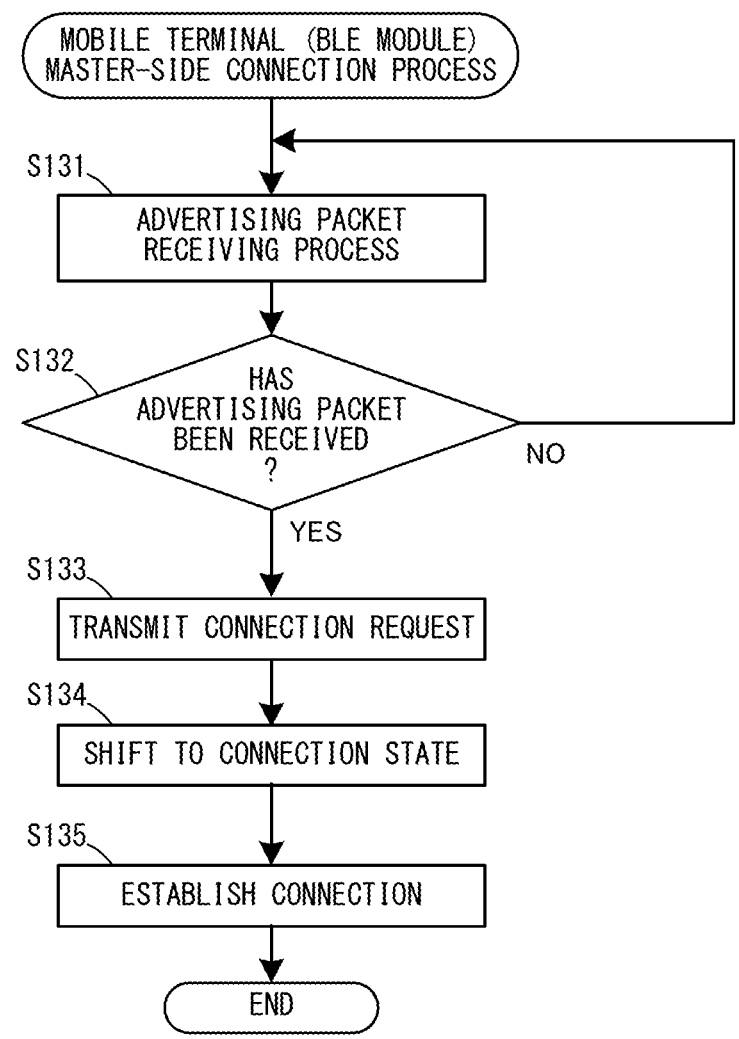
FIG. 20 is an example non-limiting flowchart showing the details of a master-side connection process performed by a BLE communication module 16.

Next, the process performed by the BLE communication module 16 of the mobile terminal 10 will be described. FIG. 20 is a flowchart showing the details of the master-side connection process performed by the BLE communication module 16. The BLE communication module 16 executes the process shown in FIG. 20 in accordance with step S104 described above being performed by the CPU 11. The process shown in FIG. 20 is a process for establishing a connection with the BLE terminal 20 present within the range where the mobile terminal 10 can perform communication (e.g., within several meters).

First, the BLE communication module 16 activates the reception circuit and performs an advertising packet receiving process (step S131). Specifically, the BLE communication module 16 attempts to receive an advertising packet from another device present around the mobile terminal 10 while switching between three channels. Subsequently, the BLE communication module 16 determines whether an advertising packet has been received (step S132). Specifically, the BLE communication module 16 determines whether an advertising packet for connection has been received.

When an advertising packet has not been received (step S132: NO), the BLE communication module 16 executes the process in step S131 again. By repeating the process in step S131, the BLE terminal 20 repeatedly executes a scan and a pause as shown in FIG. 4, to attempt to receive an advertising packet. If an advertising packet has not been received even when a predetermined time elapses, the BLE communication module 16 ends the process shown in FIG. 20.

When an advertising packet has been received (step S132: YES), the BLE communication module 16 transmits a connection request to the device that has transmitted a advertising packet (step S133). Here, it is assumed that the BLE communication module 16 has received an advertising packet from the BLE terminal 20.

Specifically, in step S133, the BLE communication module 16 transmits, to the BLE terminal 20, a connection request including the parameters (the CI and the SL) set in step S102 described above.

After the connection request is transmitted to the BLE terminal 20, the BLE communication module 16 shifts to a connection state (step S134), and a connection with the BLE terminal 20 is established (step S135). Here, the mobile terminal 10 becomes a master (central), and the BLE terminal 20 becomes a slave (peripheral). After the BLE communication module 16 shifts to the connection state, the BLE communication module 16 performs a process in the connection state shown in FIG. 21. Hereinafter, the process in the connection state will be described.

(Process in Connection State Performed by BLE Communication Module 16 of Mobile Terminal 10)

Figure 21:
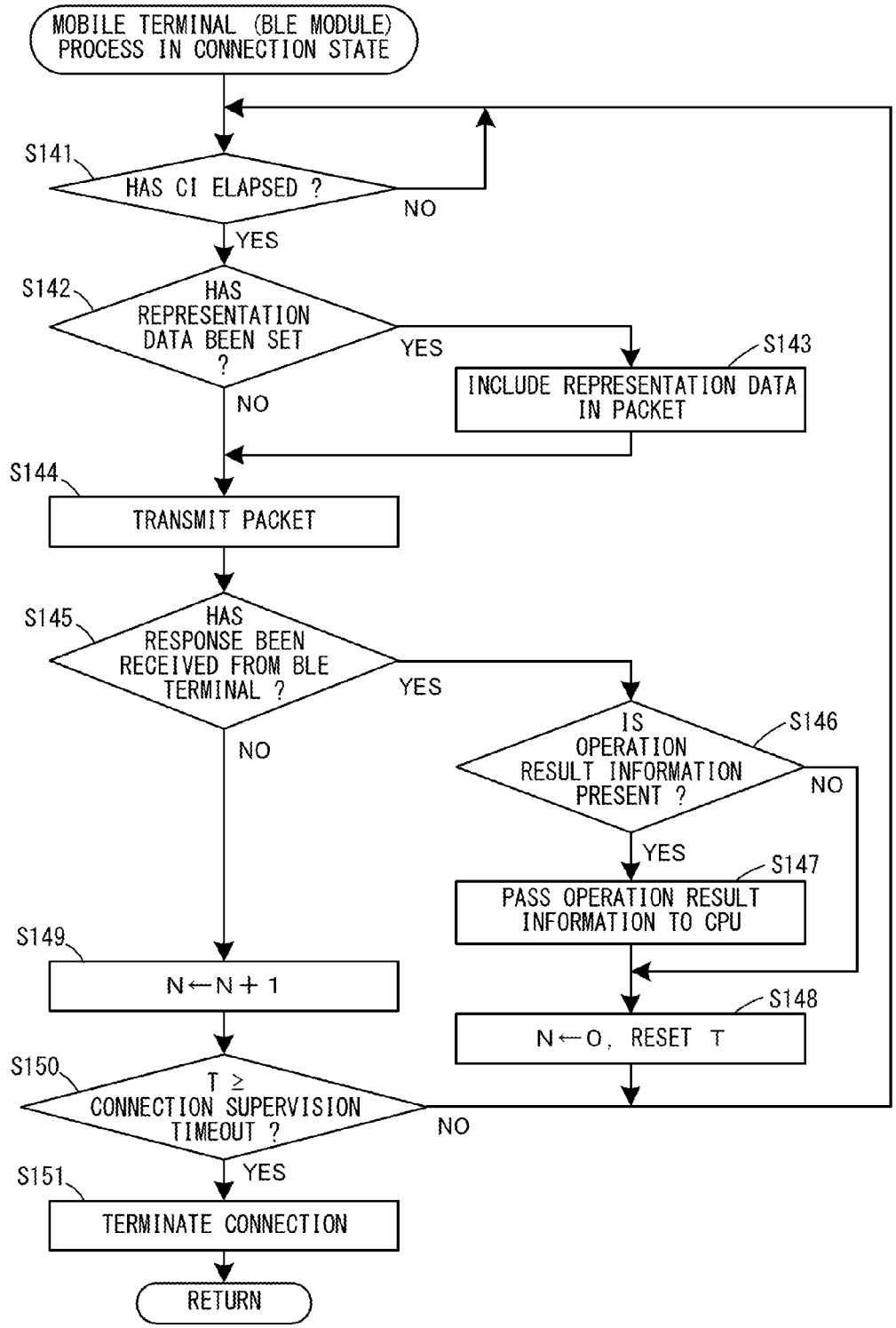
FIG. 21 is an example non-limiting flowchart showing the details of a process in a connection state performed by the BLE communication module 16 of the mobile terminal 10.

FIG. 21 is a flowchart showing the details of the process in the connection state performed by the BLE communication module 16 of the mobile terminal 10. As shown in FIG. 21, the BLE communication module 16 determines whether the CI (e.g., 500 milliseconds) has elapsed from the last connection event (step S141).

When the BLE communication module 16 determines that the CI has elapsed from the last connection event (step S141: YES), the BLE communication module 16 determines whether the representation data D has been set (step S142). The representation data D is set by the CPU 11 performing the process in step S109 as described above.

When the BLE communication module 16 determines that the representation data D has been set (step S142: YES), the BLE communication module 16 includes the representation data D in a data packet (step S143).

When the BLE communication module 16 executes the process in step S143 or determines NO in step S142, the BLE communication module 16 transmits a data packet to the BLE terminal 20 (step S144). Specifically, the BLE communication module 16 transmits the data packet to the BLE terminal 20 by using any of the data channels 0 to 36. The BLE communication module 16 uses, in this connection event, a channel having a numeral obtained by adding the numeral of hops to the number of the channel used in the last connection event. When the process in step S143 is executed, the representation data D is included in the payload of the data packet, and when the process in step S143 is not executed, data is not included in the payload.

When the CPU 11 changes the CI and/or SL in step S107 or S123 described above, the BLE communication module 16 includes information about the new CI and/or SL in a packet, and transmits the packet to the BLE terminal 20. Thereafter, a connection event is performed on the basis of the changed CI and SL.

Subsequent to step S144, the BLE communication module 16 determines whether a response packet has been received from the BLE terminal 20 (step S145). When a response packet has been received from the BLE terminal 20 (step S145: YES), the BLE communication module 16 determines whether operation result information is included in the response packet (step S146).

When operation result information is included in the response packet (step S146: YES), the BLE communication module 16 passes the operation result information to the CPU 11. The process in step S122 described above is performed on the basis of the operation result information.

When the BLE communication module 16 executes the process in step S147 or determines NO in step S146, the BLE communication module 16 sets "0" as a variable N and resets a variable T (step S148). Then, the BLE communication module 16 returns the process to step S141 again. Here, the variable "N" is a variable stored in an internal memory of the BLE communication module 16 and indicates the number of the connection events in which a response packet has not been received from the BLE terminal 20 in the connection between the mobile terminal 10 and the BLE terminal 20. That is, the variable "N" indicates the number of the connection events ignored (skipped) by the BLE terminal 20. In addition, the variable "T" is a variable stored in the internal memory of the BLE communication module 16 and indicates an elapsed time from the time at which the mobile terminal 10 receives a response packet from the BLE terminal 20. The BLE communication module 16 determines whether to terminate the connection with the BLE terminal 20, by using the variable "T". For example, the variable "T" may be increased in accordance with a time elapse, or may be increased by 1 each time the process in step S149 is performed.

On the other hand, when a response packet has not been received from the BLE terminal 20 (step S145: NO), the BLE communication module 16 adds 1 to the variable "N" (step S149).

Before the timing of the next connection event comes, the BLE communication module 16 of the mobile terminal 10 may execute the processes in steps S142 to S145 a plurality of times in this connection event. For example, when a response has been received from the BLE terminal 20 in step S145, if data to be transmitted is left, the BLE communication module 16 determines whether to further transmit a data packet in this connection event, on the basis of the time to the next connection event. When the BLE communication module 16 determines to further transmit a data packet in this connection event, the BLE communication module 16 executes steps S144 and S144 again, and executes step S145. Specifically, when the BLE communication module 16 executes the process in steps S144 and S145 a plurality of times in this connection event, the BLE communication module 16 transmits and receives packets by using the same data channel. That is, in a single connection event, the BLE communication module 16 transmits a plurality of data packets by using the same data channel.

When the BLE communication module 16 executes the process in step S149, the BLE communication module 16 determines whether the variable "T" is equal to or greater than the connection supervision timeout (step S150). When the BLE communication module 16 determines that the variable "T" is equal to or greater than the connection supervision timeout (step S150: YES), the BLE communication module 16 terminates the connection with the BLE terminal 20 to shift to a non-connected state (step S151), and ends the process shown in FIG. 21. On the other hand, when the BLE communication module 16 does not determine that the variable "T" is equal to or greater than the connection supervision timeout, the BLE communication module 16 returns the process to step S141. Here, the "connection supervision timeout" is a value greater than the effective connection interval ((SL+1)×CI) as described above. Specifically, the connection supervision timeout is set to a value that is equal to or greater than twice (SL+1)×CI. Thus, for example, even when the variable "N" is greater than the SL (i.e., even when the number of times a response packet is not received from the BLE terminal 20 is greater than the SL), if an elapsed time from the time at which the variable "T" is reset in step S148 (an elapsed time from the time at which the response packet is received from the BLE terminal 20) has not exceeded the connection supervision timeout, the BLE communication module 16 determines NO in step S150, and maintains the connection with the BLE terminal 20.

Even while the mobile terminal 10 is connected to the BLE terminal 20, the mobile terminal 10 may perform communication with another device different from the BLE terminal 20. For example, the mobile terminal 10 establishes a connection with another device and performs communication with the other device. In this case, the BLE communication module 16 performs the process in FIG. 21 for each terminal with which the connection has been established. In establishing connections, the BLE communication module 16 sets a connection interval for each connection and adjusts the timing of an initial connection event such that connection events for two or more devices do not occur simultaneously. In addition, the mobile terminal 10 may perform communication with another device without establishing a connection with the other device.

When the mobile terminal 10 performs communication with another device different from the BLE terminal 20 while the mobile terminal 10 is connected to the BLE terminal 20, at least any one of the CI, the SL, and the connection supervision timeout for a connection between the mobile terminal 10 and the BLE terminal 20 may be changed. For example, when the mobile terminal 10 performs communication with another device while the mobile terminal 10 is connected to the BLE terminal 20, the value of at least any one of the CI, the SL, and the connection supervision timeout for a connection between the mobile terminal 10 and the BLE terminal 20 may be changed to a value greater (or smaller) than the current value.

(Main Process Performed by Control Circuit 21 of BLE Terminal 20)

Figure 22:
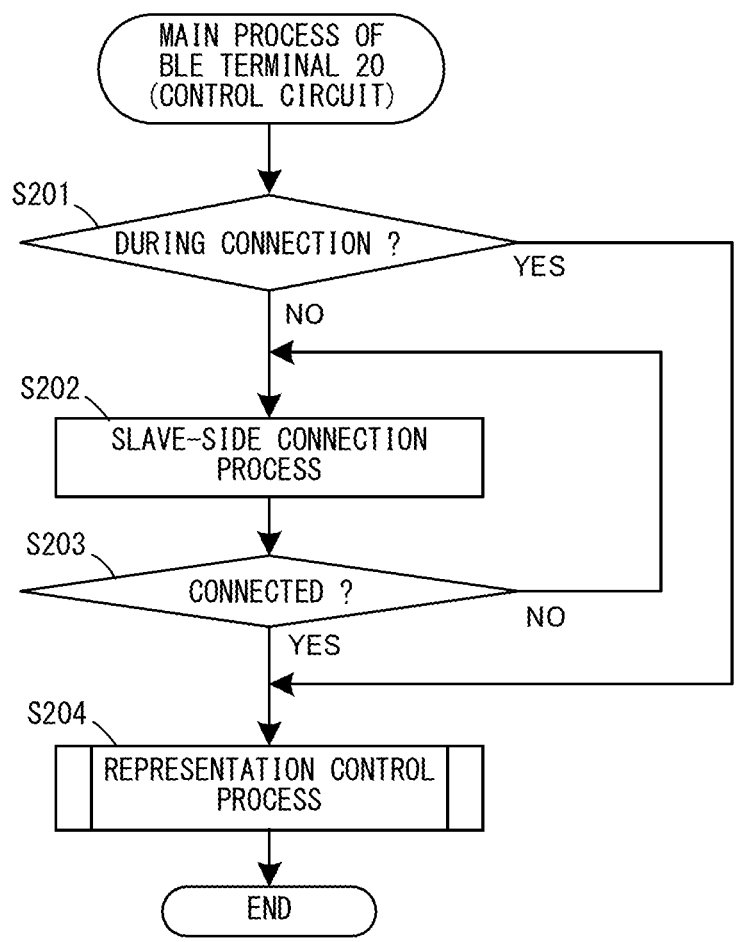
FIG. 22 is an example non-limiting flowchart showing the details of a main process performed by a control circuit 21 of the BLE terminal 20.

Next, a process performed in the BLE terminal 20 will be described. FIG. 22 is a flowchart showing the details of a main process performed by the control circuit 21 of the BLE terminal 20. The control circuit 21 executes the process shown in FIG. 22 at a predetermined time interval. For example, the control circuit 21 may execute the process shown in FIG. 22 at an interval (e.g., 50 milliseconds) shorter than the connection interval (e.g., 500 milliseconds) in the connection with the mobile terminal 10. For example, the BLE terminal 20 may perform the process shown in FIG. 22 at a frequency equal to a frequency at which the operation state of the input button 22 is detected. In addition, in the case where a display device is provided to the BLE terminal 20, the BLE terminal 20 may perform the process shown in FIG. 22 at a frequency equal to a frequency at which display of the display device is updated.

First, the control circuit 21 of the BLE terminal 20 determines whether the BLE terminal 20 is currently in connection with the mobile terminal 10 (step S201). When the control circuit 21 determines that the BLE terminal 20 is currently in connection with the mobile terminal 10 (step S201: YES), the control circuit 21 executes a process in step S204 next.

When the control circuit 21 determines that the BLE terminal 20 is not currently in connection with the mobile terminal 10 (step S201: NO), the control circuit 21 performs a slave-side connection process (step S202). Specifically, for establishing a connection with the mobile terminal 10, the control circuit 21 sends a command to the BLE communication module 25. The BLE communication module 25 executes a process shown in FIG. 24 in accordance with the command of the control circuit 21. FIG. 24 will be described in detail later.

Subsequently, the control circuit 21 determines whether the BLE terminal 20 has become connected to the mobile terminal 10 as a result of the process in step S202 (step S203). When the control circuit 21 determines YES in step S203, the control circuit 21 executes the process in step S204 next. When the control circuit 21 determines NO in step S203, the control circuit 21 executes the process in step S202 again.

Next, the control circuit 21 executes a representation control process in step S204. The representation control process in step S204 is a process for controlling a representation using the LED 23 and the vibrator 24, on the basis of the representation data D. Hereinafter, the representation control process in step S204 will be described in detail.

(Representation Control Process Performed by Control Circuit 21 of BLE Terminal 20)

Figure 23:
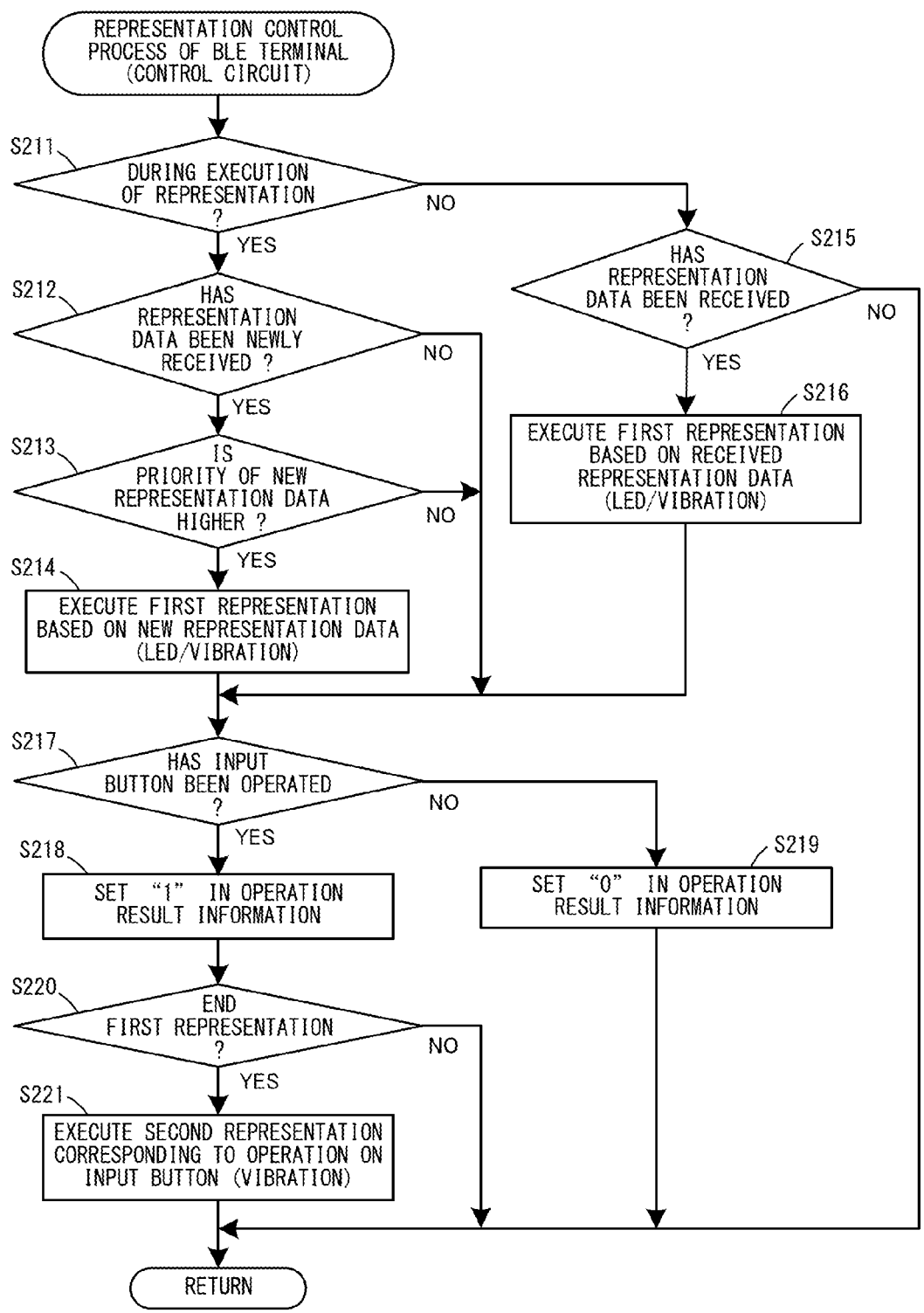
FIG. 23 is an example non-limiting flowchart showing the details of a representation control process in step S204 in FIG. 22.

FIG. 23 is a flowchart showing the details of the representation control process in step S204 in FIG. 22. As shown in FIG. 23, the control circuit 21 determines whether a representation based on the representation data D is being executed (step S211). In the present embodiment, the control circuit 21 determines YES in step S211 in the period from reception of the representation data D to the time at which the "button reception time" set in the representation data D elapses.

When the control circuit 21 determines that the representation based on the representation data D is being executed (step S211: YES), the control circuit 21 determines whether the representation data D has been newly received from the mobile terminal 10 (step S212). Specifically, when the BLE communication module 25 has received the representation data D in a connection event, the representation data D is passed to the control circuit 21. The control circuit 21 determines whether the BLE communication module 25 has received new representation data D.

When the representation data has been newly received (step S212: YES), the control circuit 21 determines whether the priority of the newly received representation data D is higher than the priority of the representation data D for the currently executed representation (step S213).

When the control circuit 21 determines that the priority of the newly received representation data D is higher than the priority of the representation data D for the currently executed representation (step S213: YES), the control circuit 21 executes the first representation based on the newly received representation data D (step S214). Specifically, the control circuit 21 performs a representation using the LED 23 and the vibrator 24, on the basis of the first representation information DB included in the representation data D. When the first representation information DB includes a plurality of representation information sets, the control circuit 21 reads the representation information sets in order from the representation information set at the head, and executes the first representation based on each representation information set.

On the other hand, when the control circuit 21 determines that the representation based on the representation data D is not being executed (step S211: NO), the control circuit 21 determines whether the representation data D has been received from the mobile terminal 10 (step S215). When the control circuit 21 determines that the representation data D has been received from the mobile terminal 10 (step S215: YES), the control circuit 21 executes the first representation based on the received representation data D (step S216). When the control circuit 21 does not determine that the representation data D has been received from the mobile terminal 10 (step S215: NO), the control circuit 21 ends the process shown in FIG. 23.

When the control circuit 21 determines NO in step S212, determines NO in step S213, executes the process in step S214, or executes the process in step S216, the control circuit 21 executes a process in step S217 next.

In step S217, the control circuit 21 determines whether the input button 22 has been operated.

When the input button 22 has been operated (step S217: YES), the control circuit 21 sets "1" as operation result information in the memory thereof (step S218). On the other hand, when the input button 22 has not been operated (step S217: NO), the control circuit 21 sets "0" as operation result information in the memory thereof (step S219).

For example, the memory of the control circuit 21 is provided with an operation storage area of 10 bits for storing operation result information. When the control circuit 21 sets "1" or "0" at the first bit of the operation storage area and then executes a process in step S218 or S219 next, the control circuit 21 sets "1" or "0" at the second bit of the operation storage area. When the control circuit 21 further then executes the process in step S218 or S219, the control circuit 21 sets "1" or "0" at the third bit of the operation storage area. Since the process shown in FIG. 22 is executed, for example, every 50 milliseconds as described above, the process in step S218 or S219 is performed every 50 milliseconds. Therefore, the operation state of the input button 22 for every 50 milliseconds ("1" or "0") is stored as operation result information in the memory of the control circuit 21.

Subsequent to step S218, the control circuit 21 determines whether the first representation has ended (step S220). Specifically, the control circuit 21 determines whether reproduction of all the representation information sets in the first representation information DB included in the representation data D has ended. After the first representation ends, the control circuit 21 determines YES in step S220. When the control circuit 21 determines that the first representation has not ended (step S220: NO), the control circuit 21 ends the process shown in FIG. 23.

When the control circuit 21 determines YES in step S220, the control circuit 21 executes the second representation corresponding to the operation on the input button 22 (step S221). Specifically, the control circuit 21 executes the second representation by vibrating the vibrator 24 on the basis of the "vibration" information of the second representation information included in the representation data D. The second representation performed in accordance with the operation on the input button 22 is performed only for a certain time.

When the control circuit 21 determines NO in step S215, performs the process in step S219, determines NO in step S220, or performs the process in step S221, the control circuit 21 ends the process shown in FIG. 23.

(Slave-Side Connection Process Performed by BLE Communication Module 25 of BLE Terminal 20)

Next, the process performed by the BLE communication module 25 of the BLE terminal 20 will be described. FIG. 24 is a flowchart showing the details of the slave-side connection process performed by the BLE communication module 25 of the BLE terminal 20. The BLE communication module 25 executes the process shown in FIG. 24 in accordance with step S202 described above being performed by the control circuit 21. The process shown in FIG. 24 is a process for establishing a connection with the mobile terminal 10 present within the range where the BLE terminal 20 can perform communication.

First, the BLE communication module 25 activates a transmission circuit and executes advertising (step S221). Specifically, the BLE communication module 25 transmits an advertising packet for connection, by broadcast, while switching between the three channels 37 to 39.

Next, the BLE communication module 25 determines whether the connection request transmitted by the mobile terminal 10 in step S133 described above has been received (step S222). When the connection request has not been received from the mobile terminal 10 (step S222: NO), the BLE communication module 25 executes the process in step S221 again.

When the connection request has been received (step S222: YES), the BLE communication module 25 sets the CI, the SL, the connection supervision timeout, the number of hops, the access address, etc. included in the connection request, and shifts to a connection state (step S223), and establishes a connection between the BLE terminal 20 and the mobile terminal 10 (step S224). Here, the mobile terminal 10 becomes a master (central), and the BLE terminal 20 becomes a slave (peripheral). When the BLE communication module 25 shifts to the connection state, the BLE communication module 25 performs a process in the connection state shown in FIG. 25. Hereinafter, the process in the connection state will be described.

(Process in Connection State Performed by BLE Communication Module 25 of BLE Terminal 20)

Figure 25:
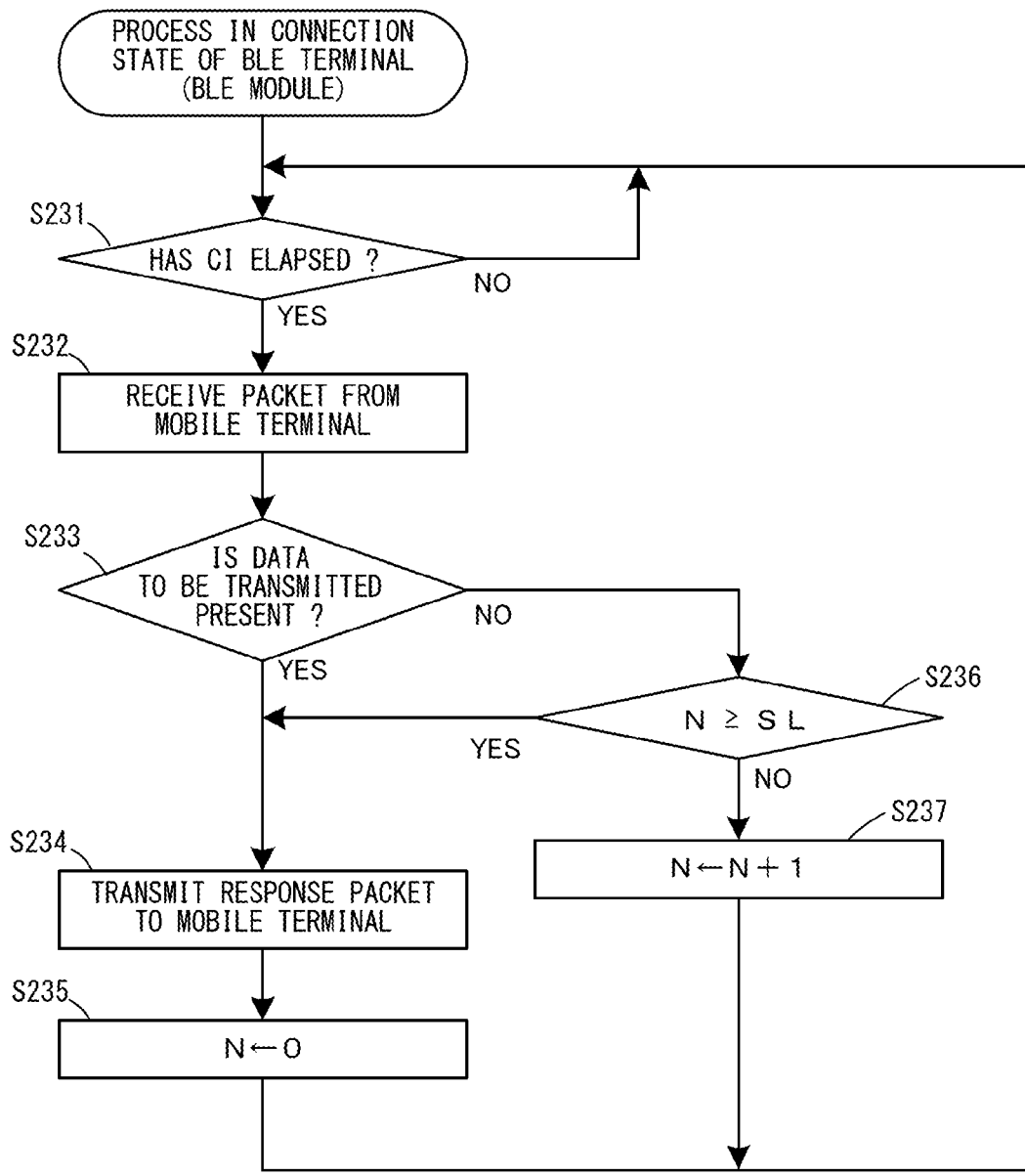
FIG. 25 is an example non-limiting flowchart showing the details of a process in a connection state performed by the BLE communication module 25 of the BLE terminal 20.

FIG. 25 is a flowchart showing the details of the process in the connection state performed by the BLE communication module 25 of the BLE terminal 20.

As shown in FIG. 25, the BLE communication module 25 determines whether the CI has elapsed from the last connection event (step S231). When the BLE communication module 25 determines that the CI has not elapsed (step S231: NO), the BLE communication module 25 executes the process in step S231 again. In step S231, the BLE communication module 25 actually determines whether a time shorter than the CI by a predetermined time (a time calculated in consideration of an error in time measurement) has elapsed from the last connection event.

When the BLE communication module 25 determines that the CI has elapsed from the last connection event (step S231: YES), the BLE communication module 25 receives the data packet transmitted by the mobile terminal 10 in step S144 described above (step S232). The BLE communication module 25 passes data included in the received packet to the control circuit 21. For example, when the above representation data D is included in the packet, the BLE communication module 25 passes the representation data D to the control circuit 21.

Next, the BLE communication module 25 determines whether data to be transmitted is present (step S233). Specifically, when the above operation result information is present, the BLE communication module 25 determines YES in step S233. Here, even when each bit of the operation result information is "0", the BLE communication module 25 determines YES in step S233. That is, even when the input button 22 has not been operated, the BLE communication module 25 transmits, to the mobile terminal 10, operation result information indicating that the input button 22 has not been operated.

When each bit of the operation result information is "0" (when the input button 22 has not been operated), the BLE communication module 25 may determine NO in step S233. That is, when the input button 22 has not been operated, operation result information indicating that the input button 22 has not been operated may not be transmitted to the mobile terminal 10. When a response packet including operation result information has not been received, the mobile terminal 10 can determine that the input button 22 has not been operated.

The BLE communication module 25 may perform the following process in step S233. Specifically, the BLE communication module 25 determines YES or NO in step S233 in accordance with the status of execution of the game. More specifically, when the game is performed by using the mobile terminal 10 and the BLE terminal 20 as a result of the above representation data D being transmitted from the mobile terminal 10 to the BLE terminal 20, the BLE communication module 25 determines YES in step S233 (that is, determines to return a response packet to the mobile terminal 10) in accordance with the status of execution of the game. For example, the control circuit 21 sets a button reception time (see FIGS. 14 and 15) on the basis of the received representation data D. Within the button reception time, the BLE communication module 25 may always determine YES in step S233. In addition, within the button reception time, only when an operation on the input button 22 is performed (when not all the bits of the operation result information are "0"), the BLE communication module 25 may determine YES in step S233.

When the BLE communication module 25 determines YES in step S233, the BLE communication module 25 transmits a response packet to the mobile terminal 10 by using any of the data channels 0 to 36 (step S234). Specifically, the BLE communication module 25 includes the operation result information (10-bit information) set in step S218 or S219 described above, in the response packet, and transmits the response packet. When data to be transmitted is not present (e.g., when the game is not being executed, when the game is in a pause state, when the current time is not within the button reception time even during execution of the game), the BLE communication module 25 transmits a response packet including no data in a payload thereof (an empty response packet) to the mobile terminal 10 in step S234.

The BLE communication module 25 can request the mobile terminal 10 to change the SL or the connection supervision timeout. The request for changing the SL or the connection supervision timeout is included in the above response packet and transmitted to the mobile terminal 10. For example, the BLE terminal 20 may transmit a request for changing the SL or the connection supervision timeout to the mobile terminal 10 in accordance with the status of execution of the game. When the mobile terminal 10 receives a request for changing the SL from the BLE terminal 20, the mobile terminal 10 changes the SL. When the mobile terminal 10 receives a request for changing the connection supervision timeout from the BLE terminal 20, the mobile terminal 10 changes the connection supervision timeout.

The BLE communication module 25 may include a change request for changing the CI in the above response packet, and transmits the response packet to the mobile terminal 10. For example, the BLE terminal 20 may transmit a request for changing the CI to the mobile terminal 10 in accordance with the status of communication with the mobile terminal 10. In addition, for example, the BLE terminal 20 may calculate the frequency of operation on the input button 22, and may transmit a request for changing the CI, the SL, and the connection supervision timeout to the mobile terminal 10 in accordance with the frequency of operation. As described above, in step S234, the BLE communication module 25 may transmit a request for changing at least any one of the CI, the SL, and the connection supervision timeout to the mobile terminal 10 in accordance with the status of execution of the game, the status of communication (the status of communication with the mobile terminal 10), the operation state of on the input button 22, or the like.

Subsequent to step S234, the BLE communication module 25 sets "0" as a variable N (step S235) and returns to step S231 again. Here, the variable "N" is a variable stored in an internal memory of the BLE communication module 25 and indicates the number of times the BLE communication module 25 has skipped the connection event (the number of the connection events in which a response packet has not been transmitted to the mobile terminal 10).

For example, before or after the process in step S231, the BLE communication module 25 determines whether an elapsed time from the last communication with the mobile terminal 10 is equal to or greater than the connection supervision timeout. For example, the BLE communication module 25 determines whether an elapsed time from the last reception of a packet from the mobile terminal 10 is equal to or greater than the connection supervision timeout. Alternatively, the BLE communication module 25 may determine whether an elapsed time from the last transmission of a response packet to the mobile terminal 10 is equal to or greater than the connection supervision timeout. When the elapsed time from the last communication with the mobile terminal 10 is equal to or greater than the connection supervision timeout, the BLE communication module 25 shifts from a connection state to a non-connected state and ends the process in FIG. 25. The connection supervision timeout is determined and notified by the mobile terminal 10 when the connection is established.

On the other hand, when the BLE communication module 25 determines NO in step S233, that is, when the BLE communication module 25 determines that data to be transmitted to the mobile terminal 10 is not present, the BLE communication module 25 determines whether the variable "N" is equal to or greater than the "SL" (step S236). When the BLE communication module 25 determines that the variable "N" is equal to or greater than the SL (step S236: YES), the BLE communication module 25 executes the process in step S234 next. That is, when the number of times the connection event is successively skipped exceeds the SL if this connection event is skipped, the BLE communication module 25 transmits a response packet to the mobile terminal 10 in this connection event. When the BLE communication module 25 determines that the variable "N" is less than the SL (step S236: NO), the BLE communication module 25 adds 1 to the variable "N" (step S237). Thereafter, the BLE communication module 25 executes the process in step S231 again.

By the processes in steps S231 to S237 being repeatedly performed, a data packet is receives from the mobile terminal 10, and also a response packet is transmitted to the mobile terminal 10, in the connection event. Accordingly, the BLE terminal 20 receives the above representation data D from the mobile terminal 10 and transmits the above operation result information to the mobile terminal 10.

As described above, in the present embodiment, in the connection event occurring at a predetermined time interval (CI), the representation data D is transmitted from the mobile terminal 10 to the BLE terminal 20 (S109, S144). The BLE terminal 20 receives a data packet including the representation data D from the mobile terminal 10 (S232), and executes a representation on the basis of the representation data D (S214, S216, S221). Specifically, the representation data D includes the first representation information DB, the operation condition (the "button reception time" in FIG. 10), and the second representation information. In addition, the first representation information DB includes information indicating a pattern of the first representation using the LED 23 and the vibrator 24. When an operation that satisfies the operation condition is performed in the BLE terminal 20, the second representation based on the second representation information is performed (S221), and also operation result information indicating the content of this operation is accumulated in the BLE terminal 20 (S218, S219). Then, in the connection event, the operation result information is transmitted from the BLE terminal 20 to the mobile terminal 10 (S234).

As described above, the first representation information indicating the pattern of the first representation, the operation condition, and the second representation information are transmitted from the mobile terminal 10 to the BLE terminal 20. By the BLE terminal 20 reproducing the first representation information, the first representation is performed in the BLE terminal 20. When an operation that satisfies the operation condition is performed in the BLE terminal 20, the second representation based on the second representation information is performed. In this manner, an interactive game can be performed between the mobile terminal 10 and the BLE terminal 20 connected via the BLE network.

In the present embodiment, communication between the mobile terminal 10 and the BLE terminal 20 is performed on the basis of the BLE standard. In a state where the mobile terminal 10 and the BLE terminal 20 are connected to each other, the connection event occurs at the predetermined time interval (CI), and data is exchanged between the mobile terminal 10 and the BLE terminal 20. The CI is variable, and is set, for example, on the basis of the type of the application to be executed or the status of execution of the application. In addition, the CI may be set on the basis of the frequency of operation on the input device of the BLE terminal 20 (and/or the mobile terminal 10), the type (function) of the BLE terminal 20, the number of users (the BLE terminals 20 or the mobile terminals 10) who participate in the application, or the like. Typically, the CI is longer than the interval (e.g., 1/60 seconds or 1/30 seconds) at which display of the display device (of the mobile terminal 10 or the BLE terminal 20) is updated. Moreover, the CI is longer than the interval (e.g., 50 milliseconds) at which an operation on the input device (of the mobile terminal 10 or the BLE terminal 20) is detected. Thus, a delay occurs to some extent in a response to an operation, but the power consumption of each device can be reduced.

For example, when an application that does not provide an uncomfortable feeling to the user even when a delay occurs to some extent is executed, the CI is set to be relatively long. Thus, the power consumption can be reduced more. In this case, the CI may be set so as to be longer than the interval of update of the display device or the interval of detection of an operation on the input device (the input button 22, the touch panel, etc.). When the CI is longer than the interval of detection of an operation on the input device, a plurality of operations on the input device in the CI are accumulated in the BLE terminal 20.

When an application that provides an uncomfortable feeling to the user when a delay occurs is executed, the CI is set to be relatively short. In this case, the CI may be set so as to be shorter than (or equal to) the interval of update of the display device or the interval of detection of an operation on the input device. When the CI is shorter or equal to the interval of detection of an operation on the input device, a plurality of operations on the input device are not accumulated in the BLE terminal 20, and each time an operation on the input device is performed, operation result information indicating the content of this operation is transmitted from the BLE terminal 20 to the mobile terminal 10. Accordingly, for example, even when an operation is frequently performed by the user as in an action game, an operation of the user can be immediately reflected in display, so that an uncomfortable feeling or stress can be prevented from being provided to the user.

The slave latency (SL) and the connection supervision timeout are also set, for example, on the basis of the type of the application. For example, when an application that does not provide an uncomfortable feeling to the user even when a delay occurs is executed, the SL and the connection supervision timeout are set to relatively large values. When an application that provides an uncomfortable feeling to the user when a delay occurs is executed, the SL and the connection supervision timeout are set to relatively small values.

For example, when a game for which only the BLE terminal 20 is used is performed while a game application is executed by using the mobile terminal 10 and the BLE terminal 20, the CI, the SL, and the connection supervision timeout may be changed. Specifically, while the game application is executed by using the mobile terminal 10 and the BLE terminal 20, the mobile terminal 10 and the BLE terminal 20 perform communication with each other, for example, at an interval of 500 milliseconds. During the game for which the mobile terminal 10 and the BLE terminal 20 are used, the game for which only the BLE terminal 20 is used is started. The game for which only the BLE terminal 20 is used may be performed, for example, for several tens of seconds. While the game for which only the BLE terminal 20 is used is performed, the mobile terminal 10 and the BLE terminal 20 do not need to perform communication with each other, and thus, for example, the CI is set to "1 second", and the SL is set to "15". Accordingly, for 15 seconds, the BLE terminal 20 does not need to return a response to the mobile terminal 10. Therefore, the BLE terminal 20 does not have to return a response to the mobile terminal 10, can concentrate on the game process, and can reduce wasted power consumption. When the game for which only the BLE terminal 20 is used is performed, the connection supervision timeout may be changed. For example, when the game for which the mobile terminal 10 and the BLE terminal 20 are used is performed, the connection supervision timeout may be set to 10 seconds; and when the game for which only the BLE terminal 20 is used is performed, the connection supervision timeout may be set to 30 seconds.

As described above, in the present embodiment, by making the CI, the SL, and the connection supervision timeout different depending on the type of the application to be executed, the power consumption of the BLE terminal 20 can be reduced, and a delay can be controlled such that an uncomfortable feeling or stress is not provided to the user.

The process in each step in the flowcharts described above is merely an example, the order of the processes in the respective steps may be changed, and some of the processes in the respective steps may not be executed. In addition, other processes may be added to the processes in the flowcharts described above. In addition, the values in the respective steps are merely an example, and other values may be used.

In the above embodiment, each device performs communication based on the BLE standard, but the communication is not limited to communication based on the BLE standard, and communication based on classic Bluetooth may be performed. In addition, communication based on another standard (e.g., IEEE802.11 series, etc.) may be performed. Moreover, communication based on any other standard may be performed. In communication based on the above BLE standard, in a connection state, communication is performed between two devices by using a shared access address generated when a connection is established. In communication based on another standard, for example, in a connection state after a connection is established, communication is performed by using an address unique to each device. That is, the transmitting device designates the address of the receiving device and transmits (unicasts) a packet.

In the above embodiment, the representation data D is transmitted from the mobile terminal 10, which is the master, to the BLE terminal 20, which is the slave, a representation is performed in the BLE terminal 20, and an operation performed in the BLE terminal 20 is transmitted to the mobile terminal 10. In another embodiment, a representation may be performed in the mobile terminal 10, which is the master, and an operation performed in the mobile terminal 10 may be transmitted to the BLE terminal 20, which is the slave. In addition, with the BLE terminal 20 as a master and with the mobile terminal 10 as a slave, the two devices may be connected to each other.

In the above embodiment, the example is shown in which a connection is established between the mobile terminal 10 and the BLE terminal 20, and, in a state where the mobile terminal 10 and the BLE terminal 20 are connected to each other, the above application (game) is performed by using the two devices. In another embodiment, the same processes as described above may be performed between the mobile terminals 10. For example, with a mobile terminal 10a as a master and with a mobile terminal 10b as a slave, these two devices may be connected to each other, the mobile terminal 10a as a master may perform the process of the above mobile terminal 10, and the mobile terminal 10b as a slave may perform the process of the above BLE terminal 20, thereby executing the above application between the mobile terminal 10a and the mobile terminal 10b.

In the above embodiment, the BLE terminal 20 includes the input button 22, a plurality of operations using the input button 22 (a plurality of pressing operations performed at a plurality of timings) in the connection interval are accumulated in the BLE terminal 20, and information about the plurality of operations using the input button 22 is transmitted to the mobile terminal 10 in the next connection event. In another embodiment, the BLE terminal 20 may include a touch panel, information about a plurality of operations performed on the touch panel in the connection interval may be transmitted to the mobile terminal 10 in the next connection event. That is, after a first operation is performed on the touch panel in the connection interval, when a second operation is subsequently performed on the touch panel, the first operation and the second operation may be transmitted to the mobile terminal 10 in the next connection event. The "first operation on the touch panel" may mean an operation from touch-on to touch-off. For example, a finger or pen is brought into contact with the touch panel (touch-on), a predetermined trajectory is drawn with the contact state maintained, and then the finger or pen is separated from the touch panel (touch-off). Such a series of operations from touch-on to touch-off is an "operation on the touch panel". While the user is performing the first operation, the touch panel detects a touch position at a predetermined time interval (e.g., an interval equal to or shorter than the frame rate of a display device). A trajectory drawn by a plurality of detected touch positions indicates the first operation performed by the user. In addition, the "second operation" is a series of operations in which, after the first operation ends, the finger or pen is brought into contact with the touch panel, and is later separated from the touch panel. As described above, a plurality of operations performed on the touch panel may be accumulated in the BLE terminal 20, and information indicating the plurality of accumulated operations may be transmitted to the mobile terminal 10 in the connection event.

Some or all of the processes described in this specification may be performed by the CPU of the mobile terminal or the BLE terminal and/or another processor executing a communication program. Alternatively, some or all of the above processes may be performed by an ASIC (Application Specific Integrated Circuit) provided in the mobile terminal or the BLE terminal.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A wireless system comprising:
a plurality of devices capable of performing wireless communication, the wireless system comprising a first device and a second device,
wherein the first device includes an input device configured to be operated by a user, the first device being configured to:
establish a connection with the second device;
accumulate operation data for a plurality of operations performed on the input device at different timings, wherein the operation data includes timing data that indicates when each respective one of the plurality of operations was performed; and
wirelessly transmit, to the second device and while the connection is established with the second device, operation result information that is based on the accumulated operation data,
wherein at least either one of the first device and the second device sets a time interval of communication between the first device and the second device,
the first device and the second device perform wireless communication with each other at the set time interval in a state where the first device and the second device are connected to each other,
the first device transmits the operation result information to the second device in the communication performed at the set time interval,
at least either one of the first device and the second device executes an application, and
at least either one of the first device and the second device sets the time interval in accordance with a type of the application to be executed and/or a status of execution of the application.

2. The wireless system according to claim 1, wherein the plurality of operations includes a first operation performed at a first timing and a second operation performed at a second timing different from the first timing, with the first and second timings represented by corresponding timing data of the operation data.

3. The wireless system according to claim 1, wherein at least either one of the first device and the second device sets the time interval when the connection between the first device and the second device is established.

4. The wireless system according to claim 1, wherein at least either one of the first device and the second device changes the time interval from a first time interval to a second time interval different from the first time interval.

5. The wireless system according to claim 4, wherein at least either one of the first device and the second device changes the time interval in a state where the first device and the second device are connected to each other.

6. The wireless system according to claim 1, wherein the application includes a plurality of portions,
at least either one of the first device and the second device changes the time interval in accordance with the portion of the application to be executed.

7. The wireless system according to claim 1, wherein at least either one of the first device and the second device changes the time interval when a shift is made from a state where the application is being executed to a pause state.

8. The wireless system according to claim 1, wherein a time interval between first and second established connections is set based on a frequency of operation of the input device of the first device.

9. The wireless system according to claim 1, wherein the second device includes another input device, and
at least either one of the first device and the second device sets the time interval in accordance with a frequency of operation on at least either one of the input device of the first device and the another input device of the second device.

10. The wireless system according to claim 1, wherein the second device is one of a plurality of different types of devices that have different functions, and
at least either one of the first device and the second device sets the time interval in accordance with the type of the second device.

11. The wireless system according to claim 1, wherein at least either one of the first device and the second device executes an application,
the application is executed by using a plurality of devices, and
at least either one of the first device and the second device sets the time interval in accordance with the number of the devices with which the application is executed.

12. The wireless system according to claim 1, wherein at least either one of the first device and the second device sets an allowable period in the connection between the first device and the second device,
the second device transmits a packet to the first device at a time interval in a state where the second device is connected to the first device, and
the first device determines whether to transmit a response to the packet from the second device, to the second device, on the basis of the allowable period in a state where the first device is connected to the second device.

13. The wireless system according to claim 12, wherein at least either one of the first device and the second device executes an application, and
at least either one of the first device and the second device sets the allowable period in accordance with a type of the application to be executed and/or a status of execution of the application.

14. The wireless system according to claim 1, wherein the second device transmits first representation information to the first device, and
the first device receives the first representation information from the second device and executes a first representation on the basis of the received first representation information.

15. The wireless system according to claim 14, wherein the second device determines whether an operation corresponding to the first representation has been performed in the first device, on the basis of the operation result information, and performs a process on the basis of a result of the determination as to whether the operation corresponding to the first representation has been performed in the first device.

16. A device comprising:
a wireless transmitter configured to wirelessly communicate with another device, wherein at least either one of the device and the another device is configured to set a time interval for performing wireless communication between the device and another device;
an input device configured to be operated by a user;
at least one hardware processor configured to:

accumulate operation data for a plurality of operations performed on the input device at different timings, wherein the operation data includes timing data that indicates when each respective one of the plurality of operations was performed; and wirelessly transmit, using the wireless transceiver and at the set time interval, operation result information that is based on the accumulated operation data, wherein at least either one of the device and the another device is configured to execute an application, wherein the time interval is set in accordance with a type of the application and/or a status of execution of the application.

17. A non-transitory computer-readable storage medium having stored therein a program to be executed by at least one hardware processor of a wireless device that includes a wireless transceiver, the program comprising instructions that case the at least one hardware processor to:

establish, using the wireless transceiver, a connection with another device, wherein at least either one of the device and the another device is configured to set a time interval for performing wireless communication when the wireless device and another device are connected;

accumulate operation data for a plurality of operations performed on an input device at different timings, wherein the operation data includes timing data that indicates when each respective one of the plurality of operations was performed; and wirelessly transmit, to the second device and while the connection is established with the second device, operation result information that is based on the accumulated operation data, wherein the operation result information is transmitted at the set time interval, wherein at least either one of the wireless device and the another device is configured to execute an application, wherein the time interval is set in accordance with a type of the application and/or a status of execution of the application.

18. The wireless system of claim 1, wherein:

the connection includes a plurality of connections that are each established at a different time, wherein each time one of the plurality of connections is established, operation data accumulated during a time period without an established connection is wirelessly transmitted to the second device.

19. The wireless system of claim 1, wherein the first device includes a memory device configured to store a data structure, wherein operation data for each one of the plurality of operations is stored at the different location within the data structure, wherein timing data for each one of the plurality of operations is represented by where the corresponding operation data is stored within the data structure.

20. The wireless system of claim 1, wherein the first device includes a memory device configured to store a bit data structure for a plurality of bits that are each settable to one of a first value and a second value, wherein each one of the plurality of bits represents a different time period, wherein the first value for at least one of the plurality of bits represents operation data that one operation of the plurality operations has been performed during a time period, and the second value represents that no operations have been performed for the time period, wherein setting a bit to a first value represents the timing data for a corresponding performed operation wherein the accumulated operation data is stored into the bit data structure.

21. The wireless system of claim 20, wherein multiple consecutive bits that are set to the first value within the bit data structure represent one of the plurality of operations that is performed over a time period represented by the multiple consecutive bits.

* * * * *